United States Patent
Harris et al.

(10) Patent No.: US 11,827,559 B2
(45) Date of Patent: Nov. 28, 2023

(54) FRANGIBLE GLASS ARTICLES AND METHODS OF MAKING THE SAME

(71) Applicant: CORNING INCORPORATED, Corning, NY (US)

(72) Inventors: Jason Thomas Harris, Horseheads, NY (US); Joshua James McCaslin, Beaver Dams, NY (US); Naveen Prakash, Corning, NY (US); Vitor Marino Schneider, Painted Post, NY (US); Charandeep Singh, Painted Post, NY (US); Ross Johnson Stewart, Corning, NY (US)

(73) Assignee: Corning Incorporated, Corning, NY (US)

( * ) Notice: Subject to any disclaimer, the term of this patent is extended or adjusted under 35 U.S.C. 154(b) by 199 days.

(21) Appl. No.: 17/354,149

(22) Filed: Jun. 22, 2021

(65) Prior Publication Data

US 2021/0395141 A1 Dec. 23, 2021

Related U.S. Application Data

(60) Provisional application No. 63/042,666, filed on Jun. 23, 2020.

(51) Int. Cl.
*C03C 21/00* (2006.01)
*B32B 17/06* (2006.01)
(Continued)

(52) U.S. Cl.
CPC ............ *C03C 21/002* (2013.01); *B32B 5/145* (2013.01); *B32B 7/12* (2013.01); *B32B 17/06* (2013.01);
(Continued)

(58) Field of Classification Search
None
See application file for complete search history.

(56) References Cited

U.S. PATENT DOCUMENTS 8,415,013 B2 4/2013 Barefoot et al.
8,854,623 B2 10/2014 Fontaine et al.
(Continued)

FOREIGN PATENT DOCUMENTS

WO 2019/108840 A1 6/2019
WO 2019/231967 A1 12/2019
WO 2021/091761 A1 5/2021

OTHER PUBLICATIONS

Bubsey, R.T. et al., "Closed-Form Expressions for Crack-Mouth Displacement and Stress Intensity Factors for Chevron-Notched Short Bar and Short Rod Specimens Based on Experimental Compliance Measurements", NASA Technical Memorandum 83796, Oct. 1992, pp. 1-30.
(Continued)

*Primary Examiner* — David Sample
(74) *Attorney, Agent, or Firm* — Jeffrey A. Schmidt

(57) ABSTRACT

Frangible glass articles having a fracture behavior that resists ejection of glass particles upon fracture. In some embodiments, the frangible glass articles can have a first surface region with a first elastic compressive stress energy per unit area of glass ($W_{el}^{comp1}$), a second surface region with a second elastic compressive stress energy per unit area of glass ($W_{el}^{comp2}$), and a central region with an elastic tensile stress energy per unit area of glass ($W_T$), where ($W_{el}^{comp1} + W_{el}^{comp2}) - W_T \leq 25$ J/m². In some embodiments, the frangible glass articles can have a total load ratio ($W_i/G_D$) less than 6.5 and a total elastic compressive stress energy per unit area of glass ($W_C$) less than 60% of a total load ($W_i$), where: $W_C = W_{el}^{comp1} + W_{el}^{comp2}$, $W_i = W_C + W_T$, $G_D = 4G_{1C}$, and (Continued)

$$G_{1C} = \frac{K_{1C}^2(1-v^2)}{E}.$$

In some embodiments, the frangible glass articles can have a differential load ratio ($W_d/G_{IC}$) less than $$72e^{\left(-12\frac{d1}{t}\right)}.$$

16 Claims, 45 Drawing Sheets

(51) Int. Cl.
    *B32B 5/14*         (2006.01)
    *B32B 7/12*         (2006.01)
    *G02F 1/1333*     (2006.01)

(52) U.S. Cl.
    CPC .. *G02F 1/133331* (2021.01); *B32B 2457/208* (2013.01); *C03C 2203/52* (2013.01)

(56) References Cited

U.S. PATENT DOCUMENTS

| | | |
|---|---|---|
| 9,499,431 B2 | 11/2016 | Barefoot et al. |
| 9,783,448 B2 | 10/2017 | Maschmeyer et al. |
| 9,977,470 B2 | 5/2018 | Demartino et al. |
| 2014/0087193 A1 | 3/2014 | Cites et al. |
| 2015/0368148 A1* | 12/2015 | Duffy ............... C03C 3/083 428/220 |
| 2016/0076135 A1* | 3/2016 | Cheah ............... C03C 17/245 423/625 |
| 2016/0122240 A1* | 5/2016 | Oram ............... C03C 3/097 501/63 |
| 2017/0300088 A1 | 10/2017 | Demartino et al. |
| 2018/0265397 A1 | 9/2018 | Murayama et al. |
| 2020/0056006 A1 | 2/2020 | Yokota et al. |
| 2021/0031493 A1* | 2/2021 | Benjamin ......... B32B 17/10743 |
| 2021/0061705 A1* | 3/2021 | Jin ................. C03C 21/002 |
| 2021/0130231 A1* | 5/2021 | Schneider ......... H05K 5/0017 |
| 2021/0355026 A1* | 11/2021 | Jin ................. C03C 3/085 |

OTHER PUBLICATIONS

Jeon B, et al., "Peridynamic simulations of brittle structures with thermal residual deformation: strengthening and structural reactivity of glasses under impacts", Proc. R. Soc. A471: Feb. 31, 2015, Oct. 2015, pp. 1-14.

Reddy, K.P.R. et al, "Fracture Toughness Measurement of Glass and Ceramic Materials Using Chevron-Notched Specimens", J. Am. Ceram. Soc., vol. 71 No. 6, Jun. 1988, pp. C-310-C-313.

Silling S, et al., "A meshfree method based on the peridynamic model of solid mechanics", Computers & Structures, vol. 83, Mar. 2005, pp. 1526-1535.

Silling SA, "Reformulation of elasticity theory for discontinuities and long-range forces", J Mech Phys Solids, vol. 48, 2000, pp. 175-209.

Tandon R., et al., "Controlling the Fragmentation Behavior of Stressed Glass", In: Bradt R.C., Munz D., Sakai M., White K.W. (eds) Fracture Mechanics of Ceramics. Fracture Mechanics of Ceramics (Active Materials, Nanoscale Materials, Composites, Glass and Fundamentals), vol. 14. Springer, Boston, MA—2005.

Tang, et al., "Methods for measurement and statistical analysis of the frangibility of strengthened glass", Frontiers in Materials, vol. 2, Article 50, Jun. 2015, pp. 1-8.

International Search Report and Written Opinion of the International Searching Authority; PCT/US2021/038325; dated Oct. 27, 2021; 12 pages; European Patent Office.

\* cited by examiner

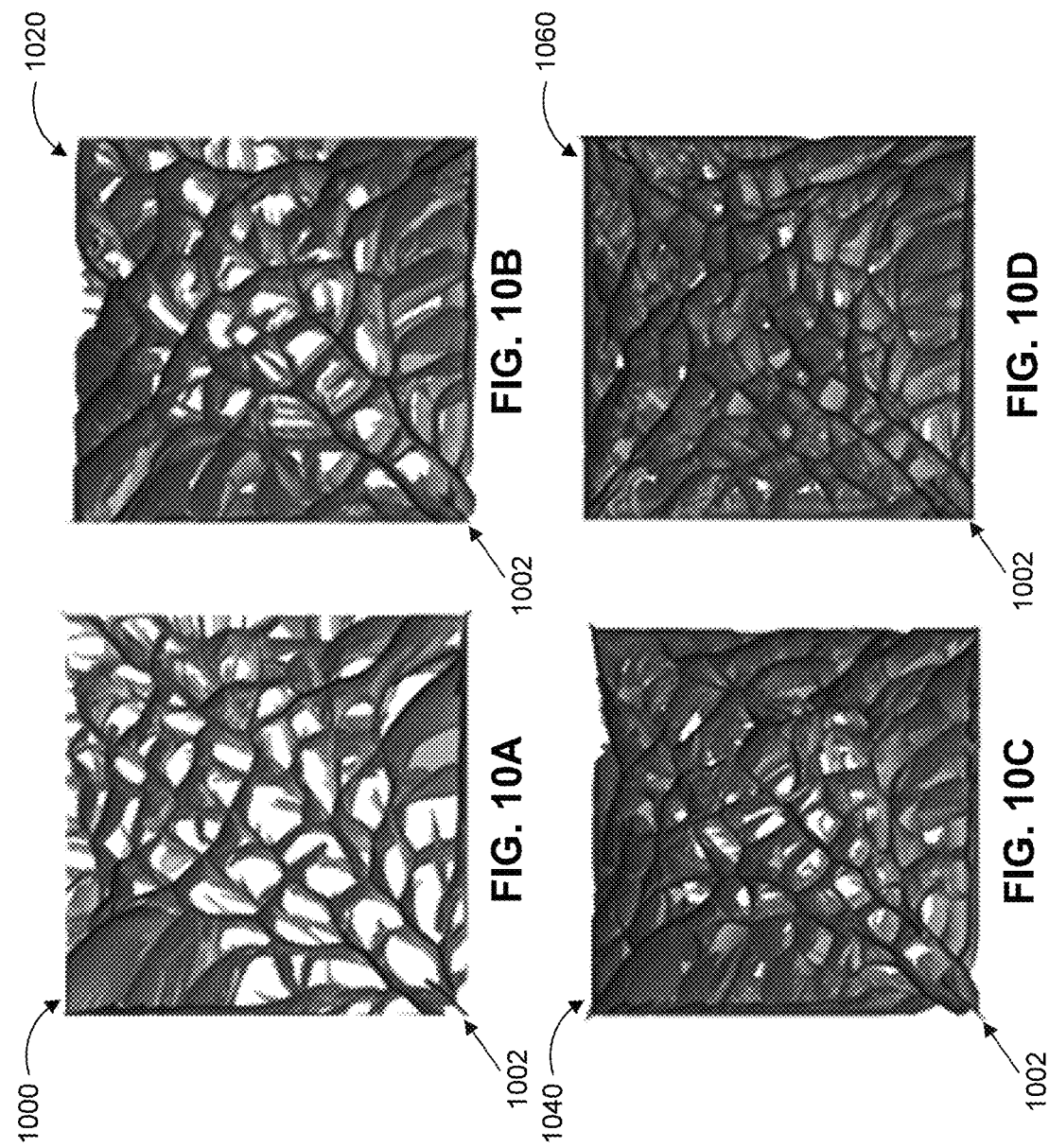

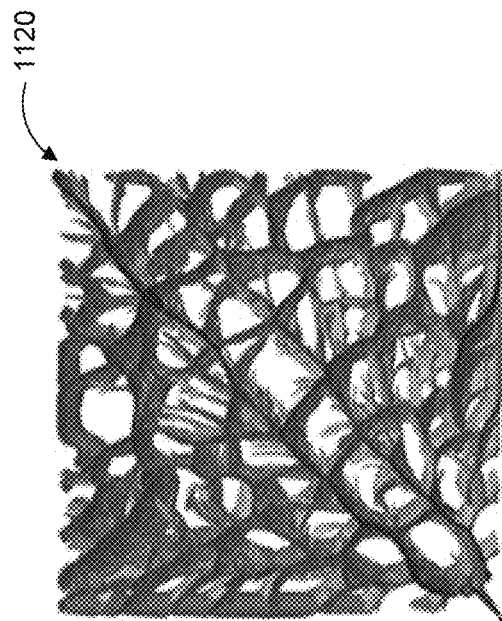
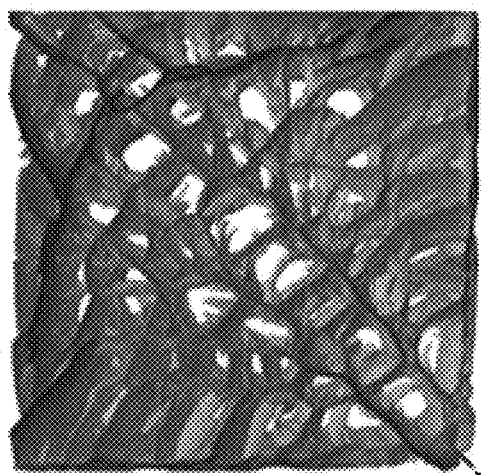
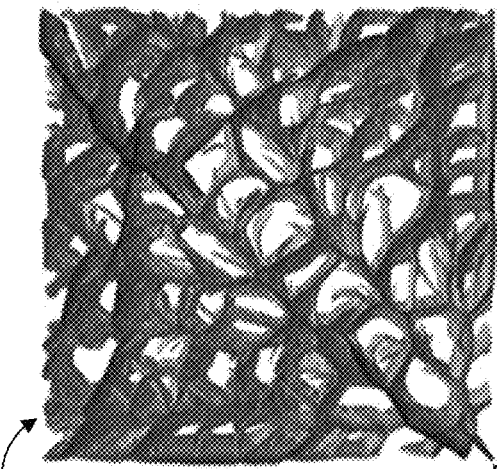
FIG. 11A  FIG. 11B  FIG. 11C  FIG. 11D

3650

3600

FRANGIBLE GLASS ARTICLES AND METHODS OF MAKING THE SAME

CROSS-REFERENCE TO RELATED APPLICATION

This application claims the benefit of priority under 35 U.S.C. § 119 of U.S. Provisional Application Ser. No. 63/042,666 filed on Jun. 23, 2020, the content of which is relied upon and incorporated herein by reference in its entirety.

FIELD

The present disclosure relates to frangible glass articles. Specifically, embodiments described herein relate to frangible glass articles for use in various industries, for example, consumer electronics, transportation, architecture, defense, medicine, and packaging. Even more specifically, the present disclosure relates to frangible glass articles for cover glass applications, for example, cover glass for an electronic display, for example an LED or OLED display.

BACKGROUND

Many consumer products, for example smart phones, tablets, portable media players, personal computers, and cameras, incorporate cover glasses that may function as display covers, and may incorporate touch functionality. Frequently, these devices are dropped by users onto hard surfaces. This can cause damage to the cover glasses, and may negatively affect the use of the devices, for example, the touch functionality may be compromised. Additionally, it is possible that, upon failure of a cover glass, glass particles could eject from the cover glass.

Therefore, a continuing need exists for glass articles having desirable mechanical and fracture properties for use in a variety of applications, including cover glass applications.

BRIEF SUMMARY

The present disclosure is directed to frangible glass articles designed to exhibit quasi-columnar or columnar fracture behavior. In particular embodiments, the present disclosure is directed to frangible glass articles designed to exhibit quasi-columnar or columnar fracture behavior when adhesively attached to an adhesive tape and/or adhesively attached to a substrate. In some embodiments, the frangible glass article can have a stress profile within the glass article having a differential energy less than or equal to 25 J/m². In some embodiments, the frangible glass article can have a stress profile within the glass article having a total load ratio less than 6.5, a total elastic compressive stress energy per unit area of glass less than 60% of a total load, and optionally, a compressive load ratio less than 3.9. In some embodiments, the frangible glass article can have a stress profile within the glass article having a differential load ratio less than $$72e^{\left(-12\frac{d1}{t}\right)}.$$

As discussed herein, by designing frangible glass articles with stress profiles having these energy parameters, the frangible glass articles can exhibit little to no glass particle ejection upon fracture when adhesively attached to an adhesive tape and/or adhesively attached to a substrate.

A first aspect (1) of the present application is directed to an article including a frangible glass article, the frangible glass article comprising: a first surface; a second surface opposite the first surface; a first surface region extending from the first surface of the frangible glass article to a first depth of compression, the first surface region comprising a first elastic compressive stress energy per unit area of glass ($W_{el}^{comp1}$); a second surface region extending from the second surface of the frangible glass article to a second depth of compression, the second surface region comprising a second elastic compressive stress energy per unit area of glass ($W_{el}^{comp2}$); and a central region between the first surface region and the second surface region, the central region comprising an elastic tensile stress energy per unit area of glass ($W_T$), where ($W_{el}^{comp1}+W_{el}^{comp2}$)−$W_T$≤25 J/m².

In a second aspect (2), the article according to the first aspect (1) is provided and ($W_{el}^{comp1}+W_{el}^{comp2}$)−$W_T$≤20 J/m².

In a third aspect (3), the article according to the first aspect (1) is provided and −100 J/m²≤($W_{el}^{comp1}+W_{el}^{comp2}$)−$W_T$≤25 J/m².

In a fourth aspect (4), the article according to any one of aspects (1)-(3) is provided and $W_T$ is in a range of 20 J/m² to 150 J/m².

In a fifth aspect (5), the article according to any one of aspects (1)-(3) is provided and $W_T$ is in a range of 40 J/m² to 150 J/m².

In a sixth aspect (6), the article according to any one of aspects (1)-(3) is provided and $W_T$ is in a range of 80 J/m² to 150 J/m².

In a seventh aspect (7), the frangible glass article according to any one of aspects (1)-(6) comprises a thickness (t) of 3 millimeters or less.

In an eighth aspect (8), the frangible glass article according to any one of aspects (1)-(6) comprises a thickness (t) in a range of 100 microns to 3 millimeters.

In a ninth aspect (9), the frangible glass article according to any one of aspects (1)-(8) is an ion-exchanged glass article.

In a tenth aspect (10), the article according to any one of aspects (1)-(9) further includes a substrate and an adhesive layer attaching a top surface of the substrate to the second surface of the frangible glass article.

In an eleventh aspect (11), the substrate according to the tenth aspect (10) includes an electronic display comprising a display surface defining at least a portion of the top surface of the substrate.

In a twelfth aspect (12), the adhesive layer according to either the tenth aspect (10) or the eleventh aspect (11) comprises a peel adhesive strength of 15 N/100 mm or more.

In a thirteenth aspect (13), the frangible glass article according to any one of aspects (1)-(12) comprises a percent mass loss of 0.09% or less, where the percent mass loss is measured according to a Glass Fracture Test.

In a fourteenth aspect (14), after a fracture event according to a Glass Fracture Test, the frangible glass article according to any one of aspects (1)-(13) comprises a fracture pattern having a columnar fragment percentage of 75% or more.

In a fifteenth aspect (15), the article according to any one of aspects (1)-(14) is provided and the frangible glass article comprises a thickness (t), a surface compressive stress at the first surface of the frangible glass article is in a range of 20 MPa to 500 MPa, the first depth of compression is in a range of 0.15t to 0.28t, and the central region comprises a central tension of greater than 120 divided by the square root of t.

In a sixteenth aspect (16), the article according to any one of aspects (1)-(14) is provided and the frangible glass article comprises a thickness (t), a surface compressive stress at the first surface of the frangible glass article is in a range of 50 MPa to 1200 MPa, the first depth of compression is in a range of 0.15t to 0.28t, and the central region comprises a central tension of greater than 120 divided by the square root of t.

In a seventeenth aspect (17), the article according to any one of aspects (1)-(14) is provided and the frangible glass article comprises a thickness (t), a surface compressive stress at the first surface of the frangible glass article is in a range of 20 MPa to 1000 MPa, the first depth of compression is in a range of 0.15t to 0.3t, and the central region comprises a central tension of greater than 120 divided by the square root of t.

In an eighteenth aspect (18), the central region of the frangible glass article according to any one of aspects (1)-(17) is substantially free of lithium oxide.

In a ninetieth aspect (19), the central region of the frangible glass article according to any one of aspects (1)-(17) comprises lithium oxide at a concentration of 0.2 mol % or more.

In a twentieth aspect (20), the frangible glass article according to any one of aspects (1)-(19) comprises a Young's modulus in a range of 60 GPa to 130 GPa and a Poisson's ratio in a range of 0.15 to 0.30.

A twenty-first aspect (21) of the present application is directed to an electronic device including an electronic display and the article of the first aspect (1) disposed over the electronic display.

In a twenty-second aspect (22), the electronic device according to the twenty-first aspect (21) further includes a housing comprising a front surface, a back surface, and side surfaces; and electrical components at least partially within the housing, the electrical components comprising a controller, a memory, and the electronic display, the electronic display at or adjacent the front surface of the housing, where the frangible glass article forms at least a portion of the housing.

A twenty-third aspect (23) of the present application is directed to a frangible glass article comprising a thickness of 3 millimeters or less; a total elastic compressive stress energy per unit area of glass ($W_C$); and an elastic tensile stress energy per unit area of glass ($W_T$), where $W_C - W_T \leq 25$ J/m$^2$.

In a twenty-fourth aspect (24), the frangible glass article according to the twenty-third aspect (23) is provided and $W_T$ is 40 J/m$^2$ or more.

In a twenty-fifth aspect (25), the frangible glass article according to either the twenty-third aspect (23) or the twenty-fourth aspect (24) is attached to a display surface of an electronic display with an adhesive layer.

A twenty-sixth aspect (26) of the present application is directed to a method of making a frangible glass article, the method comprising introducing a total elastic compressive stress energy per unit area of glass ($W_C$) and an elastic tensile stress energy per unit area of glass ($W_T$) into a glass article such that $W_C - W_T \leq 25$ J/m$^2$.

In a twenty-seventh aspect (27), introducing the total elastic compressive stress energy per unit area of glass ($W_C$) and the elastic tensile stress energy per unit area of glass ($W_T$) according to the twenty-sixth aspect (26) comprises immersing the glass article in an ion-exchange solution.

In a twenty-eighth aspect (28), introducing the total elastic compressive stress energy per unit area of glass ($W_C$) and the elastic tensile stress energy per unit area of glass ($W_T$) according to the twenty-sixth aspect (26) comprises: immersing the glass article in an ion-exchange solution, and annealing the glass article after removing the glass article from the ion-exchange solution.

In a twenty-ninth aspect (29), $W_C - W_T$ is greater than 25 J/m$^2$ before annealing the glass article according to the twenty-eight aspect (28).

A thirtieth aspect (30) of the present application is directed to an article including a frangible glass article formed of a glass material having a fracture toughness ($K_{1C}$) measured in MPa*m$^{1/2}$, a Young's modulus (E) measured in MPa, and a Poisson's ratio (v), the frangible glass article comprising a first surface; a second surface opposite the first surface; a first surface region extending from the first surface of the frangible glass article to a first depth of compression, the first surface region comprising a first elastic compressive stress energy per unit area of glass ($W_{el}^{comp1}$) measured in J/m$^2$; a second surface region extending from the second surface of the frangible glass article to a second depth of compression, the second surface region comprising a second elastic compressive stress energy per unit area of glass ($W_{el}^{comp2}$) measured in J/m$^2$; a central region between the first surface region and the second surface region, the central region comprising an elastic tensile stress energy per unit area of glass ($W_T$) measured in J/m$^2$; a total load ratio ($W_i/G_D$) less than 6.5; and a total elastic compressive stress energy per unit area of glass ($W_C$) less than 60% of a total load ($W_i$), where. $W_C = W_{el}^{comp1} + W_{el}^{comp2}$, $W_i = W_C + W_T$, $G_D = 4G_{1C}$, and $$G_{1C} = \frac{K_{1C}^2(1-v^2)}{E}.$$

In a thirty-first aspect (31), the frangible glass article according to the thirtieth aspect (30) comprises a compressive load ratio ($W_C/G_D$) less than 3.9.

In a thirty-second aspect (32), the compressive load ratio ($W_C/G_D$) according to the thirty-first aspect (31) is less than 3.5.

In a thirty-third aspect (33), the article according to any one of aspects (30)-(32) is provided and $W_C - W_T \leq 20$ J/m$^2$.

In a thirty-fourth aspect (34), the article according to any one of aspects (30)-(33) is provided and $W_T$ is in a range of 20 J/m$^2$ to 150 J/m$^2$.

In a thirty-fifth aspect (35), the article according to any one aspects (30)-(33) is provided and $W_T$ is in a range of 40 J/m$^2$ to 150 J/m$^2$.

In a thirty-sixth aspect (36), the frangible glass article according to any one of aspects (30)-(35) comprises a thickness (t) of 3 millimeters or less.

In a thirty-seventh aspect (37), the frangible glass article according to any one of aspects (30)-(35) comprises a thickness (t) in a range of 100 microns to 3 millimeters.

In a thirty-eighth aspect (38), the frangible glass article according to any one of aspects (30)-(37) is an ion-exchanged glass article.

In a thirty-ninth aspect (39), the article according to any one of aspects (30)-(38) further includes a substrate and an adhesive layer attaching a top surface of the substrate to the second surface of the frangible glass article.

In a fortieth aspect (40), the substrate according to the thirty-ninth aspect (39) comprises an electronic display comprising a display surface defining at least a portion of the top surface of the substrate.

In a forty-first aspect (41), the frangible glass article according to any one of aspects (30)-(40) comprises a modeled columnar fragment area of 75% or more.

A forty-second aspect (42) of the present application is directed to an electronic device including an electronic display; and the article of the thirtieth aspect (30) disposed over the electronic display.

In a forty-third aspect (43), the electronic device according to the forty-second aspect (42) further includes a housing comprising a front surface, a back surface, and side surfaces; and electrical components at least partially within the housing, the electrical components comprising a controller, a memory, and the electronic display, the electronic display at or adjacent the front surface of the housing, where the frangible glass article forms at least a portion of the housing.

A forty-fourth aspect (44) of the present application is directed to a frangible glass article including a thickness of 3 millimeters or less, a total load ratio ($W_i/G_D$) less than 6.5, and a total elastic compressive stress energy per unit area of glass ($W_C$) less than 60% of a total load ($W_i$), where: $W_C = W_{el}^{comp1} + W_{el}^{comp2}$, $W_i = W_C + W_T$, $G_D = 4G_{1C}$, and $$G_{1C} = \frac{K_{1C}^2(1-v^2)}{E},$$

d where $K_{1C}$ is the fracture toughness of the glass material forming the frangible glass article measured in MPa*m$^{1/2}$, E is the Young's modulus of the glass material forming the frangible glass article measured in MPa, and v is the Poisson's ratio of the glass material forming the frangible glass article.

In a forty-fifth aspect (45), the frangible glass article according to the forty-fourth aspect (44) comprises a compressive load ratio ($W_C/G_D$) less than 3.9.

In a forty-sixth aspect (46), a surface of the frangible glass article according to either the forty-fourth aspect (44) or the forty-fifth aspect (45) is attached to a display surface of an electronic display with an adhesive layer.

A forty-seventh aspect (47) of the present application is directed to a method of making a frangible glass article, the method including introducing a total elastic compressive stress energy per unit area of glass ($W_C$) and an elastic tensile stress energy per unit area of glass ($W_T$) to a glass article to transform the glass article into a frangible glass article comprising: a total load ratio ($W_i/G_D$) less than 6.5, and a total elastic compressive stress energy per unit area of glass ($W_C$) less than 60% of a total load ($W_i$), where: $W_C = W_{el}^{comp1} + W_{el}^{comp2}$, $W_i = W_C + W_T$, $G_D = 4G_{1C}$, and $$G_{1C} = \frac{K_{1C}^2(1-v^2)}{E},$$

and where $K_{1C}$ is the fracture toughness of the glass material forming the frangible glass article measured in MPa*m$^{1/2}$, E is the Young's modulus of the glass material forming the frangible glass article measured in MPa, and v is the Poisson's ratio of the glass material forming the frangible glass article.

In a forty-eighth aspect (48), the frangible glass article according to the forty-seventh aspect (47) comprises a compressive load ratio ($W_C/G_D$) less than 3.9.

In a forty-ninth aspect (49), introducing the total elastic compressive stress energy per unit area of glass ($W_C$) and the elastic tensile stress energy per unit area of glass ($W_T$) according to the forty-seventh aspect (47) or the forty-eighth aspect (48) comprises immersing the glass article in an ion-exchange solution.

In a fiftieth aspect (50), introducing the total elastic compressive stress energy per unit area of glass ($W_C$) and the elastic tensile stress energy per unit area of glass ($W_T$) according to the forty-seventh aspect (47) or the forty-eighth aspect (48) comprises: immersing the glass article in an ion-exchange solution, and annealing the glass article after removing the glass article from the ion-exchange solution.

A fifty-first aspect (51) of the present application is directed to an article including a frangible glass article formed of a glass material having a fracture toughness ($K_{1C}$) measured in MPa*m$^{1/2}$, a Young's modulus (E) measured in MPa, and a Poisson's ratio (v), the frangible glass article comprising: a first surface; a second surface opposite the first surface; a thickness (t) measured between the first surface and the second surface; a first surface region extending from the first surface of the frangible glass article to a first depth of compression ($d_1$), the first surface region comprising a first elastic compressive stress energy per unit area of glass ($W_{el}^{comp1}$) measured in J/m$^2$; a second surface region extending from the second surface of the frangible glass article to a second depth of compression ($d_2$), the second surface region comprising a second elastic compressive stress energy per unit area of glass ($W_{el}^{comp2}$) measured in J/m$^2$; a total elastic compressive stress energy per unit area of glass ($W_C$) equal to the sum of $W_{el}^{comp1}$ and $W_{el}^{comp2}$; a central region between the first surface region and the second surface region, the central region comprising an elastic tensile stress energy per unit area of glass ($W_T$) measured in J/m$^2$; and a differential load ratio ($W_d/G_{IC}$) less than $$72e^{\left(-12\frac{d1}{t}\right)},$$

where $W_d = W_C - W_T$, and $$G_{1C} = \frac{K_{1C}^2(1-v^2)}{E}.$$

In a fifty-second aspect (52), the article according to the fifty-first aspect (51) is provided and $W_d \leq 25$ J/m$^2$.

In a fifty-third aspect (53), the article according to the fifty-first aspect (51) is provided and $-100$ J/m$^2 \leq W_d \leq 25$ J/m$^2$.

In a fifty-fourth aspect (54), the frangible glass article according to any one of aspects (51)-(53) comprises a total load ratio ($W_i/G_D$) less than 6.5, where the total elastic compressive stress energy per unit area of glass ($W_C$) is less than 60% of a total load ($W_i$), and where $W_i = W_C + W_T$, and $G_D = 4G_{1C}$.

In a fifty-fifth aspect (55), the frangible glass article according to the fifty-fourth aspect (54) comprises a compressive load ratio ($W_C/G_D$) less than 3.9.

In a fifty-sixth aspect (56), the thickness (t) of the frangible glass article according to any one of aspects (51)-(55) is 3 millimeters or less.

In a fifty-seventh aspect (57), the thickness (t) of the frangible glass article according to any one of aspects (51)-(55) is in a range of 100 microns to 3 millimeters.

In a fifty-eighth aspect (58), the frangible glass article according to any one of aspects (51)-(57) is an ion-exchanged glass article.

In a fifty-ninth aspect (59), the article according to any one of aspects (51)-(58) further comprises a substrate and an adhesive layer attaching a top surface of the substrate to the second surface of the frangible glass article.

In a sixtieth aspect (60), the substrate according to the fifty-ninth aspect (59) comprises an electronic display comprising a display surface defining at least a portion of the top surface of the substrate.

In a sixty-first aspect (61), the adhesive layer according to the fifty-ninth aspect (59) or the sixtieth aspect (60) comprises a peel adhesive strength of 15 N/100 mm or more.

In a sixty-second aspect (62), the frangible glass article according to any one of the aspects (51)-(61) comprises a percent mass loss of 0.09% or less, wherein the percent mass loss is measured according to a Glass Fracture Test.

In a sixty-third aspect (63), after a fracture event according to a Glass Fracture Test, the frangible glass article according to any one of aspects (51)-(62) comprises a fracture pattern having a columnar fragment percentage of 75% or more.

In a sixty-fourth aspect (64), the central region of the frangible glass article according to any one of aspects (51)-(63) is substantially free of lithium oxide.

In a sixty-fifth aspect (65), the central region of the frangible glass article according to any one of aspects (51)-(63) comprises lithium oxide at a concentration of 0.2 mol % or more.

In a sixty-sixth aspect (66), the frangible glass article according to any one of aspects (51)-(65) comprises a Young's modulus in a range of 60 GPa to 130 GPa, and a Poisson's ratio in a range of 0.15 to 0.30.

A sixty-seventh aspect (67) of the present application is directed to an electronic device comprising an electronic display and the article according to the fifty-first aspect (51) disposed over the electronic display.

In a sixty-eighth aspect (68), the electronic device according to the sixty-seventh aspect (67) further comprises a housing comprising a front surface, a back surface, and side surfaces; and electrical components at least partially within the housing, the electrical components comprising a controller, a memory, and the electronic display, the electronic display being at or adjacent the front surface of the housing, and where the frangible glass article forms at least a portion of the housing.

A sixty-ninth aspect (69) of the present application is directed to a frangible glass article comprising a thickness (t) of 3 millimeters or less; a first surface region extending from the first surface of the frangible glass article to a first depth of compression ($d_1$), the first surface region comprising a first elastic compressive stress energy per unit area of glass ($W_{el}^{comp1}$) measured in $J/m^2$; a second surface region extending from the second surface of the frangible glass article to a second depth of compression ($d_2$), the second surface region comprising a second elastic compressive stress energy per unit area of glass ($W_{el}^{comp2}$) measured in $J/m^2$; a total elastic compressive stress energy per unit area of glass ($W_C$) equal to the sum of $W_{el}^{comp1}$ and $W_{el}^{comp1}$; a central region between the first surface region and the second surface region, the central region comprising an elastic tensile stress energy per unit area of glass ($W_T$) measured in $J/m^2$; and a differential load ratio ($W_d/G_{IC}$) less than $$72e^{\left(-12\frac{d1}{T}\right)},$$

where $W_d = W_C - W_T$, and $$G_{1C} = \frac{K_{1C}^2(1-v^2)}{E},$$

and where $K_{1C}$ is the fracture toughness of the glass material forming the frangible glass article measured in $MPa*m^{1/2}$, E is the Young's modulus of the glass material forming the frangible glass article measured in MPa, and v is the Poisson's ratio of the glass material forming the frangible glass article.

A seventieth aspect (70) of the present application is directed to a method of making a frangible glass article, the method comprising introducing a total elastic compressive stress energy per unit area of glass ($W_C$) and an elastic tensile stress energy per unit area of glass ($W_T$) to a glass article to transform the glass article into a frangible glass article comprising a differential load ratio ($W_d/G_{IC}$) less than $$72e^{\left(-12\frac{d1}{T}\right)},$$

where the total elastic compressive stress energy per unit area of glass ($W_C$) is equal to the sum of: a first elastic compressive stress energy per unit area of glass ($W_{el}^{comp1}$) measured in $J/m^2$ for a first surface region extending from a first surface of the frangible glass article to a first depth of compression ($d_1$) and a second elastic compressive stress energy per unit area of glass ($W_{el}^{comp2}$) measured in $J/m^2$ for a second surface region extending from a second surface of the frangible glass article to a second depth of compression ($d_2$), where $W_d = W_C - W_T$, and $$G_{1C} = \frac{K_{1C}^2(1-v^2)}{E},$$

and where $K_{1C}$ is the fracture toughness of the glass material forming the frangible glass article measured in $MPa*m^{1/2}$, E is the Young's modulus of the glass material forming the frangible glass article measured in MPa, and v is the Poisson's ratio of the glass material forming the frangible glass article.

In a seventy-first aspect (71), introducing the total elastic compressive stress energy per unit area of glass ($W_C$) and the elastic tensile stress energy per unit area of glass ($W_T$) according to the seventieth aspect (70) comprises immersing the glass article in an ion-exchange solution.

In a seventy-second aspect (72), introducing the total elastic compressive stress energy per unit area of glass ($W_C$) and the elastic tensile stress energy per unit area of glass ($W_T$) according to the seventieth aspect (70) comprises immersing the glass article in an ion-exchange solution, and annealing the glass article after removing the glass article from the ion-exchange solution.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIGS. 10A-10D illustrate modeled fracture patterns for a parabolic (non-annealed) stress profile at four different tensile load ratios.

FIGS. 11A-11D illustrate modeled fracture patterns for an offset error function (annealed) stress profile at four different tensile load ratios.

DETAILED DESCRIPTION

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Glasses articles described herein are frangible glass articles. Frangible glass articles described herein exhibit frangible behavior (also referred to herein as "frangibility"). Frangible behavior is the result of sufficient stored strain energy within the article that causes the glass article to break in multiple parts (for example, more than three) with several bifurcations. In some cases, this frangible behavior can result in forceful or energetic fragmentation of the glass article upon fracture. In thermally tempered, laminated, or chemically strengthened (for example, strengthened by ion-exchange) glass articles, frangible behavior can occur when the balancing of compressive stresses (CS) in a surface or outer region of the glass article with tensile stress in the center of the glass article provides sufficient energy to cause crack branching with ejection, expulsion, or "tossing" of small glass particles from the article. The velocity at which such ejection occurs is a result of the high amount of energy within the glass article, stored in central tension.

Figure 1:
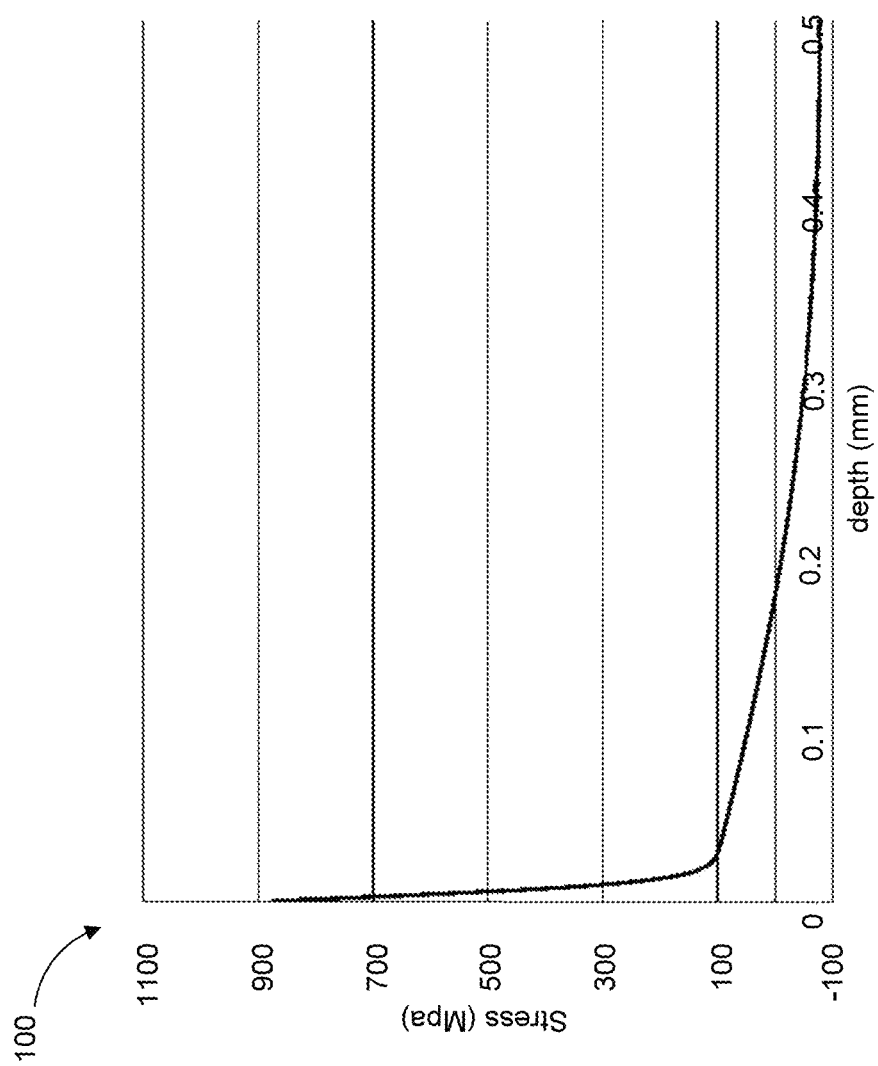
FIG. 1 is a graph illustrating a stress profile for a glass article.

Frangibility in glass is a known phenomenon. Not all glass articles are frangible. Graph 100 in FIG. 1 shows an exemplary stress profile containing a spike in compressive stress near the surface (depth=0 mm) of a glass article and a tail region deeper inside the glass article. Graph 100 shows a depth of compression (DOC) (where the stress in the glass article is zero and changes sign from compressive to tensile) at about 0.17 mm. A glass article having a stress profile similar to the one shown in FIG. 1 can be frangible or non-frangible. In general, if the amount of tensile energy inside the glass article exceeds a certain limit, the glass article can be frangible.

In some embodiments, stress profiles that are frangible can have a shape similar to the one shown in FIG. 1. For example, in some embodiments where a glass includes lithium (or another alkali element) in its base composition, the glass can have a stress profile similar to that show in FIG. 1.

In other embodiments, stress profiles that are frangible can have different shapes. The graph 200 in FIG. 2 shows an exemplary stress profile (referred to as "parabolic," due to its shape) having a DOC at about 0.17 mm.

In other embodiments, the stress profile can be designed to resemble more of an S-shaped stress profile with a decreasing slope in the region between the DOC and the surface. Such stress profiles can result from non-linear diffusion and stress relaxation that can occur in some glasses during diffusion at higher temperatures for long periods of time, or from an annealing process that can cause stress relaxation within the glass. Such stress profiles can have a larger DOC compared to a parabolic, non-annealed, or un-relaxed stress profile due to the stress relaxation.

Figure 2:
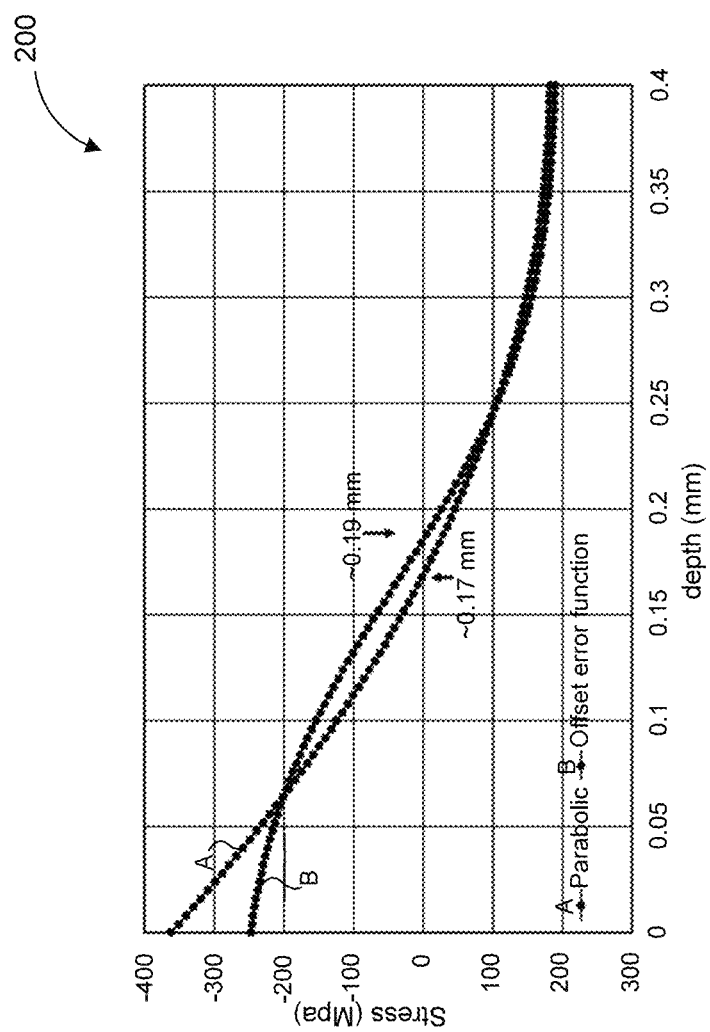
FIG. 2 is a graph comparing a parabolic (non-annealed, (A)) stress profile for a glass article to an offset error function (annealed, (B)) stress profile for a glass article.

Graph 200 in FIG. 2 shows an exemplary distorted error function stress profile (referred to as "offset error function") having a DOC at about 0.19 mm. The particular offset error function profile shown in FIG. 2 resembles the stress profile for a glass article formed of Composition #4 and subjected to the following processes: first, an ion-exchange process in an ion-exchange bath composed of 50 wt % potassium nitrate ($KNO_3$) and 50 wt % sodium nitrate ($NaNO_3$) at 400° C. for 4 hours; second, an annealing process in an oven at 400° C. for 1 hour.

As shown in FIG. 2, for the exemplary parabolic profile, approximately 62% of the total elastic energy is stored in compression and the remaining 38% is stored in tension. Comparatively, for the offset error function profile, approximately 55% of the total elastic energy is stored in compression and the remaining 45% is stored in tension. The stress profiles in FIG. 2 exemplify how an annealed (offset error function) profile can decrease the percentage of elastic energy stored in compression, which can thereby decrease energy parameters like Differential Elastic Energy and differential load ratio, as described herein.

Frangible glass articles described herein can have any of the above-described stress profile types. Energy parameters for the stress profiles are tailored to produce frangible glass articles having desired characteristics. In all cases, the frangibility of a glass article is related to the integration of the tensile strain energy density in the tensile region of the glass article's stress profile. As used herein, a frangible glass article is a glass article having one or more of the following four characteristics.

Characteristic #1: For a glass article having a DOC greater than 0.15(t), the glass article is frangible if:

$$CT > (E/68 \text{ GPa}) * 75 \text{ MPa} * 1 \text{ mm}^{0.5}/\text{sqrt}(t) \quad \text{(Equation 1a)}$$

where t is the thickness of the glass article measured in millimeters (mm) and E is the Young's modulus of the glass composition from which the glass article formed measured in gigapascals (GPa). In general, for glasses with higher Young's moduli, the CT limit at which the glass becomes frangible increases as the energy stored in the glass' tensile region is reduced. In general, for higher glass article thickness, the maximum CT allowed by the diffusion of a single ion during an ion-exchange process is reduced, as the total stress needs to be force balanced between tensile and compression. Characteristic #2: A glass article is frangible if it includes a total elastic energy stored in the article's tension region ($W_T$) greater than or equal to 20 J/m². Characteristic #3: For a glass article having a DOC/t value of 0 to 0.25, the glass article is frangible if:

$$\frac{W_T}{G_{1C}} > 4.35\left(\frac{1}{2} + \frac{1}{2}\left(\frac{DOC}{0.3t}\right)^2\right) \quad \text{(Equation 1b)}$$

where t is the thickness of the glass article measured in millimeters, $$G_{1C} = \frac{K_{1C}^2(1-v^2)}{E},$$

E is the Young's modulus of the glass composition from which the glass article formed measured in gigapascals (GPa), v is Poisson's ratio of the glass composition from which the glass article is formed, and $K_{1C}$ is the fracture toughness of the glass composition from which the glass article is formed measured in MPa*m$^{1/2}$ (megapascals times square root meter). Characteristic #4: A glass article is frangible if:

$$\frac{W_T}{G_{IC}} > 3.9\left[-1.50\left(\frac{DOC}{t}\right)^2 + 1.78\left(\frac{DOC}{t}\right) + 0.45\right] \quad \text{(Equation 1c)}$$

where t is the thickness of the glass article measured in millimeters, $W_T = W_{el}^{tens}$, and $$G_{1C} = \frac{K_{1C}^2(1-v^2)}{E},$$

E is the Young's modulus of the glass composition from which the glass article formed measured in gigapascals (GPa), In some embodiments, a frangible glass article can have characteristic #1. In some embodiments, a frangible glass article can have characteristic #2. In some embodiments, a frangible glass article can have characteristic #3. In some embodiments, a frangible glass article can have characteristic #4. In some embodiments, a frangible glass article can have characteristic #1 and characteristic #2. In some embodiments, a frangible glass article can have characteristic #1 and characteristic #3. In some embodiments, a frangible glass article can have characteristic #1 and characteristic #4. In some embodiments, a frangible glass article can have characteristic #2 and characteristic #3. In some embodiments, a frangible glass article can have characteristic #2 and characteristic #4. In some embodiments, a frangible glass article can have characteristic #1, characteristic #2, and characteristic #3. In some embodiments, a frangible glass article can have characteristic #1, characteristic #2, and characteristic #4. In some embodiments, a frangible glass article can have characteristic #1, characteristic #3, and characteristic #4. In some embodiments, a frangible glass article can have characteristic #2, characteristic #3, and characteristic #4. In some embodiments, a frangible glass article can have characteristic #1, characteristic #2, characteristic #3, and characteristic #4.

In some embodiments, a frangible glass article composed of a glass composition free or substantially free of lithium can have: a thickness (t), a first surface region extending from a first surface of the glass article, the first surface region having a surface compressive stress at the first surface in a range of 20 MPa to 500 MPa and a depth of compression in a range of 0.15t to 0.28t, and a central region having a central tension (CT) of greater than 120 divided by the square root of t.

In some embodiments, a frangible glass article composed of a glass composition comprising lithium can have: a thickness (t), a first surface region extending from a first surface of the glass article, the first surface region having a surface compressive stress at the first surface in a range of 50 MPa to 1200 MPa and a depth of compression in a range of 0.15t to 0.28t, and a central region having a central tension (CT) of greater than 120 divided by the square root of t.

In some embodiments, a frangible glass article composed of a glass composition comprising lithium can have: a thickness (t), a first surface region extending from a first surface of the glass article, the first surface region having a surface compressive stress at the first surface in a range of 20 MPa to 1000 MPa and a depth of compression in a range of 0.15t to 0.30t, and a central region having a central tension (CT) of greater than 120 divided by the square root of t.

The frangible glass articles described herein are designed to exhibit a desirable fracture pattern In particular embodiments, the frangible glass articles described herein are designed to exhibit a desirable fracture pattern when the glass articles are adhesively attached to an adhesive tape and/or adhesively attached to a substrate. In particular, the frangible glass articles are designed to exhibit a fracture pattern that reduces or eliminates ejection of glass particles from the glass article when the glass article. As discussed herein, a "columnar" or "quasi-columnar" fracture pattern for the glass articles adhesively attached to an adhesive tape and/or substrate is desirable for reducing or eliminating ejection of glass particles from the glass articles during fracture.

As used herein a "columnar" fracture pattern means that each fragment of a fractured glass article adhesively attached to an adhesive tape and/or adhesively attached to a substrate has a thickness equal to the thickness of the glass article. In other words, a "columnar" fracture pattern means that, for a glass article having a first surface that is free of adhesive and uncoated, and a second surface that is adhesively attached to an adhesive tape and/or adhesively attached to a substrate, each fragment has (i) a first surface that is free of adhesive and uncoated, (ii) a second surface that is adhesively attached to the tape and/or substrate, and (iii) a thickness equal to the thickness of the glass article. A "columnar" fracture pattern results in a very low probability of glass particles being ejected upon fracture of a glass article.

As used herein, a "quasi-columnar" fracture pattern means that at least 75% of the fragments of a fractured glass article adhesively attached to an adhesive tape and/or adhesively attached to a substrate have a thickness equal to the thickness of the glass article. A "quasi-columnar" fracture pattern results in a low probability of particles being ejected.

As used herein, a "non-columnar" fracture pattern means that greater than 25% of the fragments of a glass article have a thickness less than the thickness of the glass article. Accordingly, if these fragments are at the first surface of a glass article that is free of adhesive and uncoated, these fragments do not have a second surface that remains adhesively attached to an adhesive tape and/or substrate when the glass article fractures. And because of this, these fragments are capable of ejecting from the glass article in the form of glass particles. In other words, these fragments are free to move when the glass article fractures, and can thus be ejected from the first surface during fracture due to the release of stored energy within the glass article. A "non-columnar" fracture pattern is more likely to occur for a glass article having a high amount of total stored elastic strain energy. A "non-columnar" fracture patterns results in a significant probability of glass particles being ejected upon fracture of a glass article.

Glass particle ejection can be unwanted for a variety of reasons. For example, glass particle ejection can be unwanted because missing glass particles on a glass article can make it difficult for a user to view the substrate (for example, an OLED display) located below the glass article.

As discussed herein, columnar or quasi-columnar fracture patterns for a frangible glass article can be achieved by tailoring energy parameters for stress profiles of the glass articles. By tailoring energy parameters, the fracture pattern of a frangible glass article can be changed from a random (non-columnar) pattern to a columnar or quasi-columnar pattern. In particular embodiments, a frangible glass article with high amounts of stored tensile energy (for example, greater than or equal to 20 J/m$^2$) can be designed to exhibit a columnar or quasi-columnar fracture pattern. High amounts of stored tensile energy with a simultaneous increase in compressive stress and/or an increase in DOC can increase the impact resistance of a glass article. However, high amounts of stored tensile energy can result in a high degree of dynamic fracture and random fragmentation, and in some cases, ejection of glass particles from the surface a glass article. Tailoring energy parameters as discussed herein facilitates the formation of frangible glass articles with a high amount of stored tensile energy and columnar or quasi-columnar fracture pattern behavior. In other words, tailoring the energy parameters as discussed herein facilitates the formation of frangible glass articles having high impact resistance and fracture behavior that inhibits ejection of glass particles upon fracture when the frangible glass articles are adhered to an adhesive tape and/or a substrate.

In some embodiments, frangible glass articles described herein can have a differential energy in their stress profile less than or equal to 25 J/m$^2$. This differential energy in the stress profile is the difference between the total elastic energy stored in the article's compressive stress regions ($W_{el}^{comp1} + W_{el}^{comp2}$; $W_C$) and the elastic energy stored in the article's tension region ($W_T$) due to one or more strengthening processes (for example, an ion-exchange process).

In some embodiments, a frangible glass article described herein can have a total load ratio ($W_t/G_D$) less than 6.5 and a total compressive stress energy per unit area of glass ($W_C$) less than 60% of a total load ($W_t$). In some embodiments, the frangible glass article can have compressive load ratio ($W_C/G_D$) less than 3.9.

In some embodiments, a frangible glass article described herein can have a differential load ratio ($W_d/G_{IC}$) less than $$72e^{\left(-12\frac{d1}{t}\right)}.$$

These various energy parameters for a frangible glass article's stress profile can be achieved by controlling the strengthening process for a glass article, and thereby controlling the shape of the stress profile. In some embodiments, an annealing process can be utilized to control the shape of the stress profile to achieve energy parameters that result in columnar or quasi-columnar fracture patterns.

While the composition of a glass article can affect the stress profile that a particular strengthening process can impart on the glass article, achieving the energy parameters discussed herein is unique because they can be independent of glass composition. The energy parameters discussed herein can be achieved on various glass compositions by designing the appropriate strengthening steps. Accordingly, various glass compositions, for example, lithium-based and non-lithium-based compositions, can be used to achieve high impact resistance and columnar or quasi-columnar fracture behavior.

As used herein, the term "glass" is meant to include any material made at least partially of glass, including glass and glass-ceramics. "Glass-ceramics" include materials produced through controlled crystallization of glass. One or more nucleating agents, for example, titanium oxide ($TiO_2$), zirconium oxide ($ZrO_2$), sodium oxide ($Na_2O$), and phosphorus oxide ($P_2O_5$) can be added to a glass-ceramic composition to facilitate homogenous crystallization. In some embodiments, the glass articles described herein can exhibit an amorphous microstructure and can be substantially free of crystals or crystallites. In other words, the glass articles can exclude glass-ceramic materials in some embodiments. In some embodiments, the glass articles described herein can include glass-ceramic materials.

Frangible glass articles described herein can be made from glass compositions strengthened by one or more strengthening processes configured to impart a desired stress profile in the frangible glass article. In some embodiments, the strengthening processes can include one or more ion-exchange processes. In such embodiments, the glass composition from which the frangible glass articles are made is an ion-exchangeable glass composition. As used herein, "ion-exchangeable" means that a glass composition, or glass article comprising the composition, is capable of exchanging first cations located at or near the surface of the substrate with second cations of the same valence. The first ions can be ions of sodium. The second ions can be ions of one of potassium, rubidium, and cesium, with the proviso that the second ion has an ionic radius greater than the ionic radius of the first ion. The first ion is present in the glass composition as an oxide thereof (for example, $Na_2O$). As used herein, an "ion-exchanged glass article" or a "chemically strengthened glass article" means the glass article has been subject to at least one ion-exchange process that exchanges cations located at or near the surface of the glass with cations of the same valence. In some embodiments, the strengthening processes can include one or more thermal tempering processes. In some embodiments, the strengthening processes can include one or more annealing processes.

Figure 15:
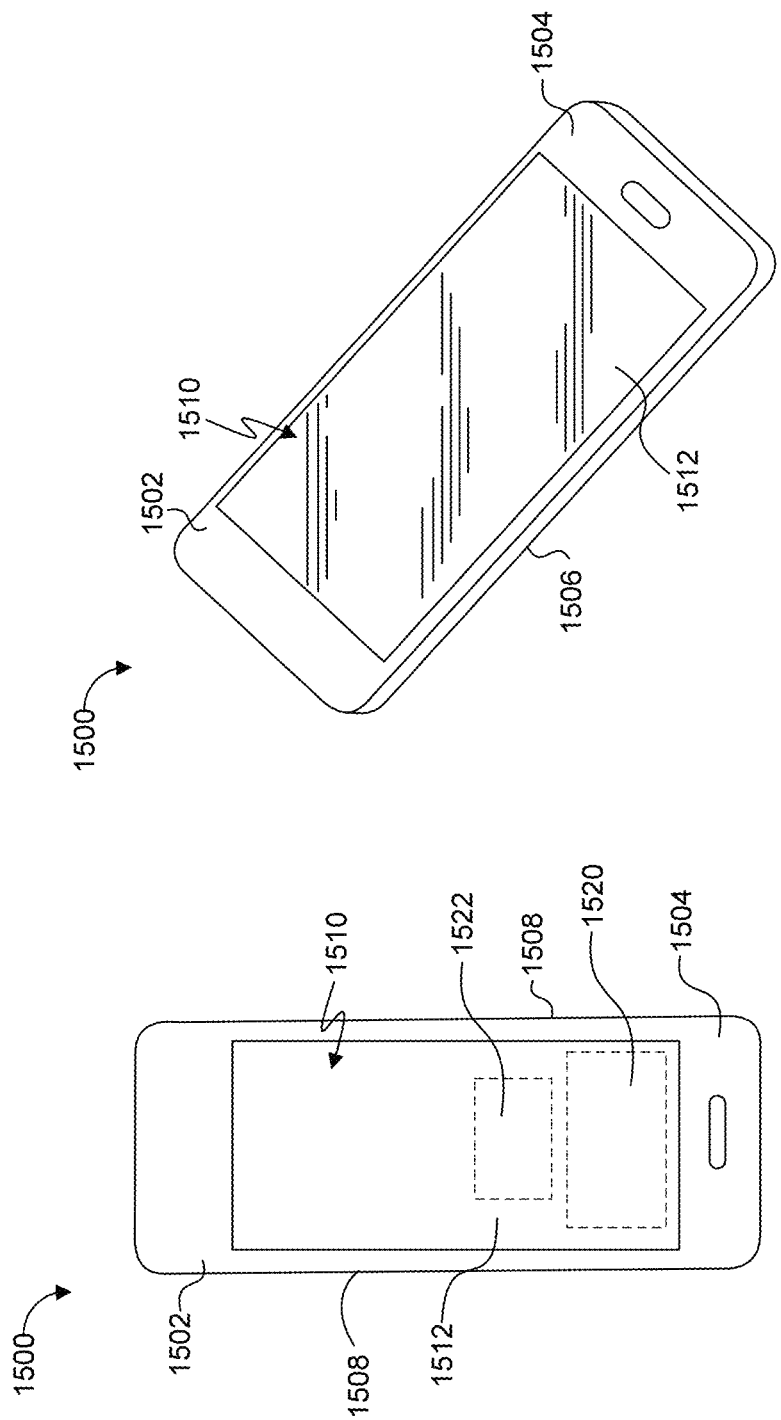
FIG. 15A is a plan view of an exemplary electronic device incorporating a glass article according to any of the glass articles disclosed herein.
FIG. 15B is a perspective view of the exemplary electronic device of FIG. 15A.

The frangible glass articles disclosed herein can be incorporated into another article for example an article with a display (or display articles) (for example, consumer electronics, including mobile phones, watches, tablets, computers, navigation systems, and the like), architectural articles, transportation articles (e.g., automobiles, trains, aircraft, sea craft, etc.), appliance articles, or any article that may benefit from some transparency, scratch-resistance, impact resistance, or a combination thereof. An exemplary article incorporating any of the frangible glass articles disclosed herein is shown in FIGS. 15A and 15B.

Figure 3:
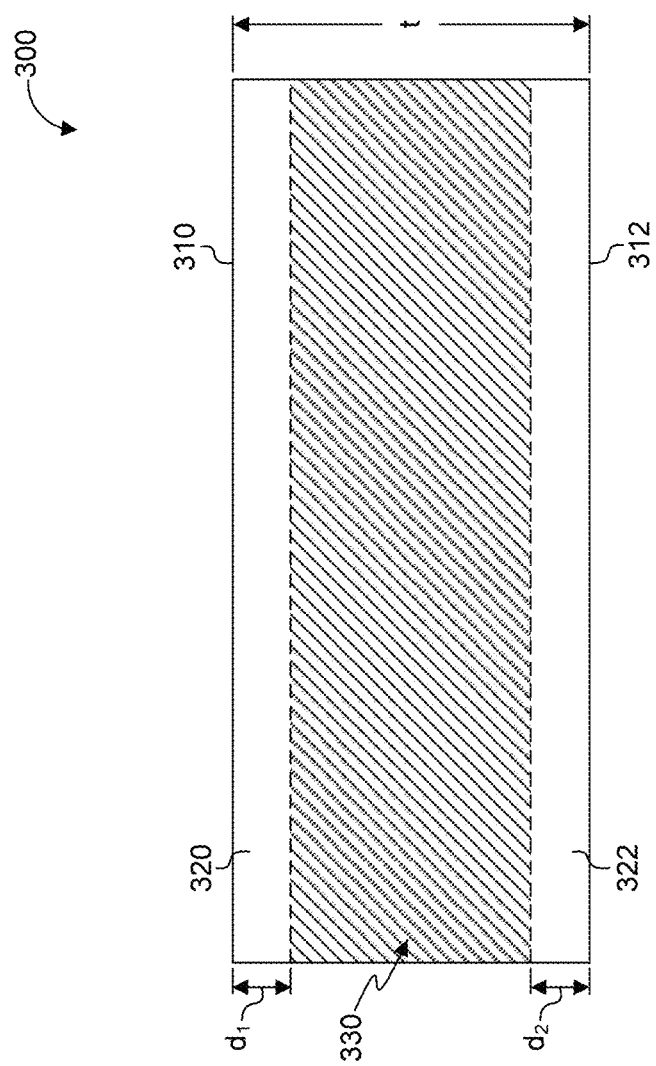
FIG. 3 illustrates a cross section of a glass article having compressive stress regions according to some embodiments.

FIG. 3 shows a frangible glass article 300 according to some embodiments. Frangible glass article 300 includes a first surface 310 and a second surface 312 opposite first surface 310. Frangible glass article 300 can have one or more surface regions under compressive stress. For example, frangible glass article 300 can have a first surface region 320 (also referred to as first compressive stress region 320) and/or a second surface region 322 (also referred to as second compressive stress region 322) extending from exterior surfaces of glass article 300 (for example, surfaces 310, 312) to a depth of compression (DOC, d1, d2). Frangible glass article 300 can also have a central region 330 between first surface region 320 and second surface region 322. Central region 330 can be under a tensile stress or CT extending from the DOC into the central or interior region of frangible glass article 300. In embodiments including ion-exchanged compressive stress regions 320, 322, regions 320, 322 have a concentration of a metal oxide that is different at two or more points through a thickness (t) of frangible glass article 300. In such embodiments, frangible glass article 300 is an ion-exchanged glass article.

As used herein, "depth of compression" (DOC) refers to the depth at which the stress within a glass article changes from compressive to tensile. At the DOC, the stress crosses from a compressive stress to a tensile stress and thus exhibits a stress value of zero.

According to the convention normally used in the art, compression or compressive stress (CS) is expressed as a negative (<0) stress and tension or tensile stress is expressed as a positive (>0) stress. But throughout this description, and unless otherwise specified, CS is expressed as a positive or absolute value—for example, as recited herein, CS=|CS|. CS can vary with distance d from an exterior surface of frangible glass article 300 according to a function. In some embodiments, the CS can have a maximum at an exterior surface of frangible glass article 300. Unless specified otherwise, CS values are reported herein are CS values at an exterior surface of frangible glass article 300.

Unless specified otherwise, a compressive stress (including surface CS) is measured by surface stress meter (FSM) using commercially available instruments for example the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient."

Referring again to FIG. 3, first compressive stress region 320 extends from first surface 310 to a depth $d_1$ and second compressive stress region 322 extends from second surface 312 to a depth $d_2$. Together, these compressive stress regions 320, 322 define the compression region or CS region of frangible glass article 300. The compressive stress of both regions 320 and 322 is balanced by stored tension in central region 330 of frangible glass article 300. Unless specified otherwise, CT values are reported as maximum CT values and CT values are reported as absolute values.

DOC can be measured by a surface stress meter or a scattered light polariscope (SCALP) depending on the ion-exchange treatment and the thickness of the article being measured. Where the stress in the substrate is generated by exchanging potassium ions into the substrate, a surface stress meter, for example, the FSM-6000 (Orihara Industrial Co., Ltd., Japan), is used to measure depth of compression. Where the stress is generated by exchanging sodium ions into the substrate, and the article being measured is thicker than about 400 microns, SCALP is used to measure the depth of compression and maximum central tension (CT). Where the stress in the substrate is generated by exchanging both potassium and sodium ions into the glass, and the article being measured is thicker than about 400 microns, the depth of compression and CT are measured by SCALP. Without wishing to be bound by theory, the exchange depth of sodium can indicate the depth of compression while the exchange depth of potassium ions can indicate a change in the magnitude of the compressive stress (but not necessarily the change in stress from compressive to tensile). As used herein, "depth of layer" (DOL) refers to the depth within a glass article at which an ion of a metal oxide (for example, sodium, potassium) diffuses into the glass article where the concentration of the ion reaches a minimum value. In embodiments where only potassium is ion-exchanged into a glass article, DOC can equal DOL. When the article being measured is thinner than about 400 microns, the maximum central tension can be measured using SCALP by sandwiching the article between two other glass articles with index oil to create an effectively thicker part and measuring the thickness of the part before the SCALP measurement to access the location of the center.

The refracted near-field (RNF) method may be used to derive a graphical representation of a glass article's stress profile. When the RNF method is utilized to derive a graphical representation of the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. The RNF method can be inaccurate over the first two microns of the glass article's depth. So the stress at the surface of the glass article can be measured with a surface stress meter, and extrapolated from the rest of the curve measured by RNF. The graphical representation of a glass article's stress profile may be used to calculate elastic energy values described in the present application.

When a SCALP measurement is performed, it is done using SCALP polariscope (e.g., SCALP-04 or SCALP-05), available from GlassStress Ltd., Talinn, Estonia. The precise sample speed SS and exposure times $t_E$ to reduce the measurement noise in the polarimeter to an acceptable level when measuring a sample to characterize at least one stress-related characteristic depends on a number of factors. These factors include the characteristics of the image sensing device (e.g., the gain, image capture rate (frames/second), pixel size, internal pixel average techniques, etc.), as well as the nature of the no-stress-related (NSR) scattering feature(s), the intensity of the input light beam, the number of polarization states used, etc. Other factors include the measurement wavelength of the light beam from the laser source and the intensity of the scattered light beam. Example measurement wavelengths can include 640 nanometers (nm), 518 nm and 405 nm. Example exposure times can range from 0.05 millisecond to 100 milliseconds. Example frame rates can range from 10 to 200 frames per second. Example calculations of the optical retardation can utilize from two to two-hundred frames over a measurement time $t_M$ of from 0.1 seconds to 10 seconds.

In some embodiments, frangible glass article 300 can have a maximum CT ranging from 50 MPa (megapascals) to 250 MPa, including subranges. For example, in some embodiments, frangible glass article 300 can have a maximum CT ranging from 50 MPa to 250 MPa, 50 MPa to 225 MPa, 50 MPa to 200 MPa, 50 MPa to 175 MPa, 50 MPa to 150 MPa, 50 MPa to 125 MPa, 50 MPa to 100 MPa, 50 MPa to 75 MPa, 75 MPa to 250 MPa, 100 MPa to 250 MPa, 125 MPa to 250 MPa, 150 MPa to 250 MPa, 175 MPa to 250 MPa, 200 MPa to 250 MPa, or 225 MPa to 250 MPa, or within a range having any two of these values as endpoints, inclusive of the endpoints.

In some embodiments, the DOC of region 320 and/or region 322 can range from 50 microns (μm, micrometers) to 250 microns, including subranges. For example, in some embodiments, the DOC of region 320 and/or region 322 can range from 50 microns to 250 microns, 50 microns to 225 microns, 50 microns to 200 microns, 50 microns to 175 microns, 50 microns to 150 microns, 50 microns to 125 microns, 50 microns to 100 microns, 50 microns to 75 microns, 75 microns to 250 microns, 100 microns to 250 microns, 125 microns to 250 microns, 150 microns to 250 microns, 175 microns to 250 microns, 200 microns to 250 microns, or 225 microns to 250 microns, or within a range having any two of these values as endpoints, inclusive of the endpoints.

In some embodiments, DOC can be reported as a portion of the thickness (t) of frangible glass article 300. In embodiments, frangible glass article 300 can have a depth of compression (DOC) ranging from 5% (0.05t) of the thickness of the glass article to 30% (0.30t) of the thickness of the glass article, including subranges. For example, in some embodiments, frangible glass article 300 can have a depth of compression (DOC) ranging from 0.05t to 0.30t, 0.05t to 0.25t, 0.05t to 0.20t, 0.05t to 0.15t, 0.05t to 0.10t, 0.10t to 0.30t, 0.10t to 0.25t, 0.10t to 0.20t, or 0.10t to 0.15t, or within a range having any two of these values as endpoints, inclusive of the endpoints.

Thickness (t) of frangible glass article 300 is measured between first surface 310 and second surface 312. In some embodiments, the thickness of frangible glass article 300 can be 3 millimeters (mm) or less. In some embodiments, the thickness of frangible glass article 300 can range from 100 microns to 3 mm, including subranges. For example, the thickness of frangible glass article 300 can range from 100 microns to 3 mm, 100 microns to 2.5 mm, 100 microns to 2 mm, 100 microns to 1.5 mm, 100 microns to 1 mm, 100 microns to 900 microns, 100 microns to 800 microns, 100 microns to 700 microns, 100 microns to 600 microns, 100 microns to 500 microns, 100 microns to 400 microns, 100 microns to 300 microns, 100 microns to 200 microns, 200 microns to 3 mm, 300 microns to 3 mm, 400 microns to 3 mm, 500 microns to 3 mm, 600 microns to 3 mm, 700 microns to 3 mm, 800 microns to 3 mm, 900 microns to 3 mm, 1 mm to 3 mm, 1.5 mm to 3 mm, 2 mm to 3 mm, or 2.5 mm to 3 mm, or within a range having any two of these values as endpoints, inclusive of the endpoints.

Compressive stress regions 320, 322 can be formed in frangible glass article 300 by exposing a glass article to one or more ion-exchange solutions. In some embodiments, compressive stress regions 320, 322 can be formed by exposing the glass article to a first ion-exchange solution at a first temperature for a first amount of time and then exposing the glass article to a second ion-exchange solution at a second temperature for a second amount of time. In some embodiments, the composition of the first ion-exchange solution can be the same as the composition of the second ion-exchange solution. In some embodiments, the composition of the first ion-exchange solution can be different from the composition of the second ion-exchange solution. In some embodiments, the first temperature can be the same as the second temperature. In some embodiments, the first temperature can be different from the second temperature. In some embodiments, the first amount of time can be the same as the second amount of time. In some embodiments, the first amount of time can be different from the second amount of time.

In some embodiments, an ion-exchange solution can be a molten salt, for example, the ion-exchange solution can include a molten potassium salt. In some embodiments, the ion-exchange solution can include 50 wt % or more potassium salt, 60 wt % or more potassium salt, 70 wt % or more potassium salt, 80 wt % or more potassium salt, 90 wt % or more potassium salt, or 100 wt % potassium salt, or a weight percent within a range having any two of these values as endpoints, inclusive of the endpoints. In some embodiments, the ion-exchange solution can include 50 wt % to 100 wt % potassium salt, 60 wt % to 100 wt % potassium salt, 70 wt % to 100 wt % potassium salt, 80 wt % to 100 wt % potassium salt, or 90 wt % to 100 wt % potassium salt. In some embodiments, the potassium salt can be potassium nitrate ($KNO_3$). In some embodiments, all or a portion of the remaining weight percent in an ion-exchange solution can be a molten nitrate salt, for example, sodium nitrate ($NaNO_3$).

In some embodiments, an ion-exchange solution can include a molten nitrite salt, for example $NaNO_3$. In some embodiments, the ion-exchange solution can include greater than 0 wt % to 50 wt % nitrate salt, including subranges. For example, in some embodiments, the ion-exchange solution can include greater than 0 wt % nitrate salt to 50 wt % nitrate salt, greater than 0 wt % nitrate salt to 40 wt % nitrate salt, greater than 0 wt % nitrate salt to 30 wt % nitrate salt, greater than 0 wt % nitrate salt to 20 wt % nitrate salt, greater than 0 wt % nitrate salt to 10 wt % nitrate salt, 10 wt % nitrate salt to 50 wt % nitrate salt, 20 wt % nitrate salt to 50 wt % nitrate salt, 30 wt % nitrate salt to 50 wt % nitrate salt, or 40 wt % nitrate salt to 50 wt % nitrate salt, or a weight percent within a range having any two of these values as endpoints, inclusive of the endpoints.

A glass article can be exposed to an ion-exchange solution by immersing the glass article into a bath of the ion-exchange solution, spraying the ion-exchange solution onto the glass article, or otherwise physically applying the ion-exchange solution to the glass article. Upon exposure to the glass article, the ion-exchange solution can, according to some embodiments, be at a temperature from greater than or equal to 350° C. to less than or equal to 550° C. and all ranges and sub-ranges between the foregoing values. For example, in some embodiments, the temperature can range from 350° C. to 550° C., 350° C. to 525° C., 350° C. to 500° C., 350° C. to 475° C., 350° C. to 450° C., 350° C. to 425° C., 350° C. to 400° C., 350° C. to 375° C., 375° C. to 550° C., 400° C. to 550° C., 425° C. to 550° C., 450° C. to 550° C., 475° C. to 550° C., 500° C. to 550° C., or 525° C. to 550° C., or within a range having any two of these values as endpoints, inclusive of the endpoints.

In some embodiments, an ion-exchange solution can include a molten sulfate salt, for example potassium sulfate ($K_2SO_4$), sodium sulfate ($Na_2SO_4$), or lithium sulfate ($Li_2SO_4$). In such embodiments, the temperature of the ion-exchange solution during exposure to a glass article can range from 500° C. to 1100° C. In some embodiments, an ion-exchange solution can include a molten chloride salt, for example potassium chloride (KCl), sodium chloride (NaCl), or lithium chloride (LiCl). In such embodiments, the temperature of the ion-exchange solution during exposure to a glass article can range from 450° C. to 950° C.

In some embodiments, a glass article can be exposed to an ion-exchange solution for a duration from greater than or equal to 30 minutes to less than or equal to 24 hours, and all ranges and sub-ranges between the foregoing values. For example, in some embodiments, the duration can range from 30 minutes to 24 hours, 30 minutes to 20 hours, 30 minutes to 16 hours, 30 minutes to 12 hours, 30 minutes to 10 hours, 30 minutes to 8 hours, 30 minutes to 6 hours, 30 minutes to 4 hours, 30 minutes to 2 hours, 30 minutes to 1 hour, 1 hour to 24 hours, 2 hours to 24 hours, 4 hours to 24 hours, 6 hours to 24 hours, 8 hours to 24 hours, 10 hours to 24 hours, 12 hours to 24 hours, 16 hours to 24 hours, 20 hours to 24 hours, or within a range having any two of these values as endpoints, inclusive of the endpoints.

The ion-exchange solution composition, temperatures, and durations for each of the one or more ion-exchange steps for a glass article can be selected based on the glass composition of the glass article. Examples 1-4 describe various exemplary ion-exchange processes for different glass articles according to some embodiments.

After one or more ion-exchange processes are performed, it should be understood that a composition at the surface of a glass article can be different than the composition of the as-formed glass article (for example, the glass article before it undergoes an ion-exchange process). This results from one type of alkali metal ion in the as-formed glass, for example Na+, being replaced with larger alkali metal ions, for example K+. However, the glass composition at or near the center of the depth of the glass article will, in some embodiments, still have the composition of the as-formed glass article. Unless specified otherwise, glass compositions disclosed in this application are compositions of the glass article near the center of the depth of the article where the composition is unaffected (or is least affected) by an ion-exchange process, i.e., the composition of the as-formed glass article before it undergoes an ion-exchange process. In other words, glass compositions disclosed in this application can be compositions of the glass article in the central region of the glass article.

In some embodiments, after exposing a glass article to one or more ion-exchange processes, the glass article can be annealed. Annealing a glass article can include exposing the glass article to an annealing temperature configured to change the stress profile within the glass article. In some embodiments, the annealing temperature can be from greater than or equal to 300° C. to less than or equal to 550° C. and all ranges and sub-ranges between the foregoing values. For example, in some embodiments, the temperature can range from 300° C. to 550° C., 300° C. to 500° C., 300° C. to 450° C., 300° C. to 400° C., 300° C. to 350° C., 350° C. to 550° C., 400° C. to 550° C., 450° C. to 550° C., or 500° C. to 550° C., or within a range having any two of these values as endpoints, inclusive of the endpoints. Examples 3 and 4 describe various exemplary annealing processes for different glass articles according to some embodiments.

According to embodiments described herein, elastic energy imparted and stored in compressive stress regions 320, 322, and central region 330 of frangible glass article 300 can be tailored to create desired fracture behavior for frangible glass article 300. The elastic energy stored by the stress profile over the entire thickness of glass article 300 is calculated according to the following equation:

$$W_{el} = \frac{(1-v)}{E} \int \sigma^2 dx \qquad \text{(Equation 2)}$$

where v is Poisson's ratio of the glass composition from which a glass article is formed, E is Young's modulus of the glass composition from which the glass article is formed measured in pascals, and σ is the stress measured in MPa. Unless specified otherwise, the stress and/or energy values for the Equations described herein are positive values. In other words, both compressive and tensile stress and energies are expressed as positive values, i.e., absolute values.

The elastic energy in compression (per unit area of glass article) measured in J/m² is for a symmetric profile is:

$$W_{el}^{comp} = 2\frac{1-v}{E}\int_0^{DOC} \sigma^2 dx \qquad \text{(Equation 3)}$$

The elastic energy in the tension region (per unit area of glass article) measured in J/m² from the compression depth to the center of the glass substrate is:

$$W_{el}^{tens} = 2\frac{1-v}{E}\int_{DOC}^{0.5t} \sigma^2 dx \qquad \text{(Equation 4)}$$

The t in Equation 4 is the thickness of frangible glass article 300 measured in millimeters. The factor of 2 in Equation 3 and Equation 4 assumes symmetry of the stress profile so integration only in the first half of a glass article is needed in this case. In some embodiments, $W_{el}^{comp}$ can be referred to as the sum of the elastic compressive stress energy per unit area of glass for first compressive stress region 320 ($W_{el}^{comp1}$) and the elastic compressive stress energy per unit area of glass for second compressive stress region 322 ($W_{el}^{comp2}$). $W_{el}^{tens}$ is the elastic tensile stress energy per unit area of glass for central region 330. Thus, the total elastic energy stored in frangible glass article 300 substrate is represented by the following equation:

$$W_{el} = (W_{el}^{comp} + W_{el}^{tens}) \qquad \text{(Equation 5)}$$

As used herein, $W_t = W_{el}$, $W_C = W_{el}^{comp}$, and $W_T = W_{el}^{tens}$. In some embodiments, $W_T$ can range from 20 J/m² to 150 J/m², including subranges. For example, in some embodiments, $W_T$ can range from 20 J/m² to 150 J/m², 20 J/m² to 140 J/m², 20 J/m² to 120 J/m², 20 J/m² to 100 J/m², 20 J/m² to 80 J/m², 20 J/m² to 60 J/m², 20 J/m² to 50 J/m², 20 J/m² to 40 J/m², 40 J/m² to 150 J/m², 40 J/m² to 140 J/m², 40 J/m² to 120 J/m², 40 J/m² to 100 J/m², 40 J/m² to 80 J/m², 40 J/m² to 60 J/m², or 40 J/m² to 50 J/m², or within a range having any two of these values as endpoints. In some embodiments, $W_T$ can range from 40 J/m² to 150 J/m². In some embodiments, $W_T$ can range from 80 J/m² to 150 J/m².

In some embodiments, $W_C$ can range from 25 J/m² to 100 J/m², including subranges. For example, in some embodiments, $W_C$ can range from 25 J/m² to 100 J/m², 25 J/m² to 90 J/m², 25 J/m² to 80 J/m², 25 J/m² to 75 J/m², 25 J/m² to 50 J/m², 50 J/m² to 100 J/m², 75 J/m² to 100 J/m², 80 J/m² to 100 J/m², or 90 J/m² to 100 J/m², or within a range having any two of these values as endpoints.

In some embodiments, $W_t$ can range from 50 J/m² to 200 J/m², 50 J/m² to 175 J/m², 50 J/m² to 150 J/m², 50 J/m² to 125 J/m², 50 J/m² to 100 J/m², 50 J/m² to 75 J/m², 75 J/m² to 200 J/m², 100 J/m² to 200 J/m², 125 J/m² to 200 J/m², 150

J/m² to 200 J/m², or 175 J/m² to 200 J/m², or within a range having any two of these values as endpoints, inclusive of the endpoints.

In some embodiments, frangible glass article 300 can have a normalized total energy ($W_{norm}^{tot}$), a normalized compressive energy ($W_{norm}^{comp}$), and a normalized tensile energy ($W_{norm}^{tens}$) defined according to the following questions:

$$W_{norm}^{tot} = \frac{W_{el}^{tot}}{\left(\frac{1-v}{E}\right)} = \int_0^{Thickness} \sigma^2 \quad \text{(Equation 6)}$$

$$W_{norm}^{comp} = 2\frac{W_{el}^{comp}}{\left(\frac{1-v}{E}\right)} = \int_0^{DOC} \sigma^2 \quad \text{(Equation 7)}$$

$$W_{norm}^{tens} = 2\frac{W_{el}^{tens}}{\left(\frac{1-v}{E}\right)} = \int_{DOC}^{0.5T} \sigma^2 \quad \text{(Equation 8)}$$

The use of a normalized energy has the advantage of being represented easily in units of MPa²·m, and being independent of the material parameters.

In some embodiments frangible glass article 300 can have a normalized tensile energy ranging from 3 MPa²·m to 8 MPa²·m, including subranges. For example, in some embodiments, frangible glass article 300 can have a normalized tensile energy ranging from 3 MPa²·m to 8 MPa²·m, 3 MPa²·m to 7 MPa²·m, 3 MPa²·m to 6 MPa²·m, 3 MPa²·m to 5 MPa²·m, 3 MPa²·m to 4 MPa²·m, 4 MPa²·m to 8 MPa²·m, 5 MPa²·m to 8 MPa²·m, 6 MPa²·m to 8 MPa²·m, or 7 MPa²·m to 8 MPa²·m, or within a range having any two of these values as endpoints, inclusive of the endpoints.

In some embodiments frangible glass article 300 can have a normalized compressive energy ranging from 3 MPa²·m to 10 MPa²·m, including subranges. For example, in some embodiments, frangible glass article 300 can have a normalized compressive energy ranging from 3 MPa²·m to 10 MPa²·m, 3 MPa²·m to 9 MPa²·m, 3 MPa²·m to 8 MPa²·m, 3 MPa²·m to 7 MPa²·m, 3 MPa²·m to 6 MPa²·m, 3 MPa²·m to 5 MPa²·m, 3 MPa²·m to 4 MPa²·m, 4 MPa²·m to 10 MPa²·m, 5 MPa²·m to 10 MPa²·m, 6 MPa²·m to 10 MPa²·m, 7 MPa²·m to 10 MPa²·m, 8 MPa²·m to 10 MPa²·m, or 9 MPa²·m to 10 MPa²·m, or within a range having any two of these values as endpoints, inclusive of the endpoints.

In some embodiments, the normalized energy can be renormalized by the square root of the thickness as a WT parameter according to the following equations:

$$WT_{norm}^{tot} = W_{norm}^{tot}/\sqrt{t} \quad \text{(Equation 9)}$$

$$WT_{norm}^{comp} = W_{norm}^{comp}/\sqrt{t} \quad \text{(Equation 10)}$$

$$WT_{norm}^{tens} = W_{norm}^{tens}/\sqrt{t} \quad \text{(Equation 11)}$$

These WT parameters have a unit of MPa²·m^0.5 and have embedded in them a variable thickness component.

In some embodiments, frangible glass article 300 can have a re-normalized tensile energy ranging from 125 MPa²·m^0.5 to 250 MPa²·m^0.5, including subranges. For example, in some embodiments, frangible glass article 300 can have a re-normalized tensile energy ranging from 125 MPa²·m^0.5 to 250 MPa²·m^0.5, 125 MPa²·m^0.5 to 200 MPa²·m^0.5, 125 MPa²·m^0.5 to 150 MPa²·m^0.5, 150 MPa²·m^0.5 to 250 MPa²·m^0.5, or 200 MPa²·m^0.5 to 250 MPa²·m^0.5, or within a range having any two of these values as endpoints.

In some embodiments, frangible glass article 300 can have a re-normalized compressive energy ranging from 100 MPa²·m^0.5 to 310 MPa²·m^0.5, including subranges. For example, in some embodiments, frangible glass article 300 can have a re-normalized compressive energy ranging from 100 MPa²·m^0.5 to 310 MPa²·m^0.5, 100 MPa²·m^0.5 to 300 MPa²·m^0.5, 100 MPa²·m^0.5 to 250 MPa²·m^0.5, 100 MPa²·m^0.5 to 200 MPa²·m^0.5, 100 MPa²·m^0.5 to 150 MPa²·m^0.5, 150 MPa²·m^0.5 to 310 MPa²·m^0.5, 200 MPa²·m^0.5 to 310 MPa²·m^0.5, or 250 MPa²·m^0.5 to 310 MPa²·m^0.5, or within a range having any two of these values as endpoints.

Frangible glass article 300 can have an elastic energy difference between the elastic energy in compression minus the elastic energy in tension according to the following equation.

$$\Delta W_{el} = W_{el}^{comp} - W_{el}^{tens} = W_C - W_T \quad \text{(Equation 12)}$$

This energy difference between the elastic energy in compression minus the elastic energy in tension is referred to herein as "Differential Elastic Energy." In some embodiments, frangible glass article 300 can have a Differential Elastic Energy value of less than or equal to 25 J/m² (i.e., $W_C - W_T \leq 25$ J/m²). At a Differential Elastic Energy value of 25 J/m² or less, frangible glass article 300 can exhibit a columnar or quasi-columnar fracture pattern when fractured according to the following "Glass Fracture Test."

In some embodiments, frangible glass article can have a ratio of Differential Elastic Energy to total elastic energy according to the following equation.

$$\frac{\Delta W_{el}}{W_{el}} = \frac{W_{el}^{comp} - W_{el}^{tens}}{W_{el}^{comp} + W_{el}^{tens}} \quad \text{(Equation 13)}$$

In some embodiments, frangible glass article 300 can have a Differential Elastic Energy to total elastic energy ratio ranging from −0.12 to 0.12, including subranges. For example, in some embodiments, frangible glass article 300 can have a Differential Elastic Energy to total elastic energy ratio ranging from −0.12 to 0.12, −0.12 to 0.10, −0.12 to 0.05, −0.12 to 0.01, −0.12 to −0.01, −0.01 to 0.12, 0.01 to 0.12, 0.05 to 0.12, or 0.10 to 0.12, or within a range having any two of these values as endpoints, inclusive of the endpoints.

Figure 4:
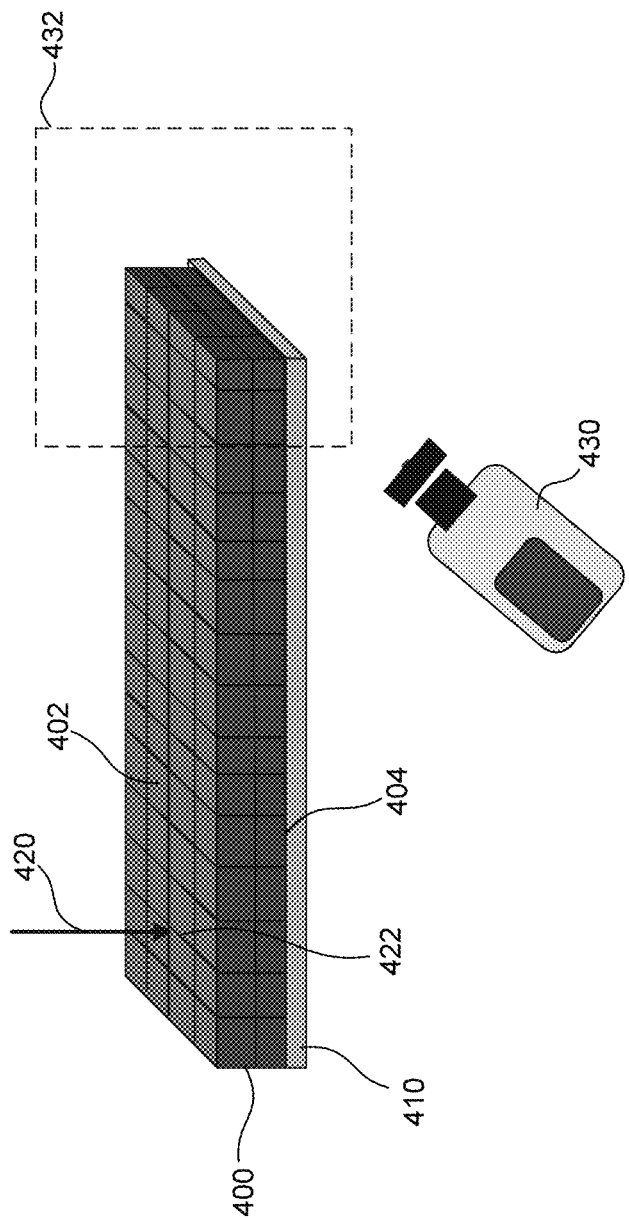
FIG. 4 is a schematic of a glass fracture test according to some embodiments.

As described and referred to herein, a "Glass Fracture Test" is a test to evaluate fracture characteristics of a glass article. FIG. 4 shows a schematic of the "Glass Fracture Test" and it is performed as follows. Single-sided 3M™ OCA 471 optically clear adhesive tape, or an adhesive tape having equivalent adhesive strength, is attached to the bottom surface 404 of a 2 inch by 2 inch glass article 400. The dimensions of the tape are such that the tape overhangs edges of glass article 400 by up to 5 mm to ensure the edges are constrained similar to the rest of glass article 400. After attaching the tape to bottom surface 404 of glass article 400, article 400 is placed top-side-up on a steel plate 410. The top surface 402 of the glass article 400 is free of adhesive and uncoated. A sharp scribe 420 is used to fracture glass article 400 at a fracture initiation point 422 by dropping it on top surface 402 from a height of approximately 1 meter. A high-speed camera 430 can be utilized to detect the ejection of any glass particles from glass article 400 in a region 432 adjacent glass article 400 upon fracture with scribe 420. The sharp scribe 420 has a weight of 33 grams and a tip diameter of about 20-40 microns. For purposes of measuring a percent mass loss resulting from a "Glass Fracture Test," the mass of glass article 400 adhered to the adhesive tape is measured before and after the "Glass Fracture Test." The percent mass loss is the equal to: (m1/m2)×100, wherein m1 is the mass of fractured glass article attached to the adhesive tape and m2 is the mass of the glass article and adhesive tape adhered to the glass article before the "Glass Fracture Test." The mass lost from a glass article due to the "Glass Fracture Test" is attributed to the mass of glass particles ejected from the glass article during the test.

In some embodiments, frangible glass article 300 can have a Differential Elastic Energy value of less than or equal to 25 J/m$^2$ (i.e., $W_C-W_T \leq 25$ J/m$^2$). In some embodiments, frangible glass article 300 can have a Differential Elastic Energy value of less than or equal to 20 J/m$^2$ (i.e., $W_C-W_T \leq 20$ J/m$^2$). In some embodiments, frangible glass article 300 can have a Differential Elastic Energy value of less than or equal to 15 J/m$^2$ (i.e., $W_C-W_T \leq 15$ J/m$^2$). In some embodiments, frangible glass article 300 can have a Differential Elastic Energy value of greater than or equal to −100 J/m$^2$ to less than or equal to 25 J/m$^2$ (i.e., −100 J/m$^2 \leq (W_C-W_T) \leq 25$ J/m$^2$). In some embodiments, frangible glass article 300 can have a Differential Elastic Energy value of greater than or equal to −100 J/m$^2$ to less than or equal to 20 J/m$^2$ (i.e., −100 J/m$^2 \leq (W_C-W_T) \leq 20$ J/m$^2$). In some embodiments, frangible glass article 300 can have a Differential Elastic Energy value of greater than or equal to −100 J/m$^2$ to less than or equal to 15 J/m$^2$ (i.e., −100 J/m$^2 \leq (W_C-W_T) \leq 15$ J/m$^2$). In some embodiments, frangible glass article 300 can have a Differential Elastic Energy value of greater than or equal to −50 J/m$^2$ to less than or equal to 25 J/m$^2$ (i.e., −50 J/m$^2 \leq (W_C-W_T) \leq 25$ J/m$^2$). In some embodiments, frangible glass article 300 can have a Differential Elastic Energy value of greater than or equal to −50 J/m$^2$ to less than or equal to 20 J/m$^2$ (i.e., −50 J/m$^2 \leq (W_C-W_T) \leq 20$ J/m$^2$). In some embodiments, frangible glass article 300 can have a Differential Elastic Energy value of greater than or equal to −50 J/m$^2$ to less than or equal to 15 J/m$^2$ (i.e., −50 J/m$^2 \leq (W_C-W_T) \leq 15$ J/m$^2$).

Desirable fracture behavior can be achieved by designing frangible glass article 300 to have a Differential Elastic Energy value or range as described herein. In particular, by designing frangible glass article 300 to have a Differential Elastic Energy value or range as described herein, frangible glass article 300 can exhibit a fracture pattern that reduces or eliminates ejection of glass particles from frangible glass article 300 when frangible glass article is adhesively attached to an adhesive tape and/or adhesively attached to a substrate. Relatedly, by designing frangible glass article 300 to have a Differential Elastic Energy value or range as described herein, frangible glass article 300 can exhibit a columnar or quasi-columnar fracture pattern and, thus exhibit desirable fracture behavior when adhesively attached to an adhesive tape and/or attached to a substrate, which is desirable for reducing or eliminating ejection of glass particles from frangible glass article 300 during fracture.

In some embodiments, frangible glass article 300 can have a percent mass loss of 0.09% or less, when the percent mass loss is measured according to a Glass Fracture Test. In some embodiments, frangible glass article 300 can have a percent mass loss ranging from 0.001% to 0.09%. In some embodiments, frangible glass article 300 can have a percent mass loss of 0.02% or less, when the percent mass loss is measured according to a Glass Fracture Test. In some embodiments, frangible glass article 300 can have a percent mass loss range from 0.001% to 0.02%.

In some embodiments, after a fracture event according to a Glass Fracture Test, frangible glass article 300 can have a fracture pattern having a columnar fragment percentage of 75% or more. In some embodiments, after a fracture event according to a Glass Fracture Test, frangible glass article 300 can have a fracture pattern having a columnar fragment percentage of 75% to 100%, 80% to 100%, or 90% to 100%. In such embodiments, the columnar fragment percentage is measured by counting the number of fracture surfaces at one of the two-inch edges of the fractured glass article as viewed with a microscope at 100× magnification, or another suitable magnification based on the thickness of the article being evaluated. The number of the fracture surfaces that extend from the top surface of the glass article to the bottom surface of the glass article is divided by the total number of fracture surfaces and multiplied by 100 to get the columnar fragment percentage.

In some embodiments, frangible glass article 300 can be made by a method that includes introducing, into a glass article, a total elastic compressive stress energy per unit area of glass ($W_C$) and an elastic tensile stress energy per unit area of glass ($W_T$) such that $W_C-W_T \leq 25$ J/m$^2$. In some embodiments, the method can include introducing $W_C$ and $W_T$ such that $W_C-W_T \leq 20$ J/m$^2$. In some embodiments, the method can include introducing $W_C$ and $W_T$ such that $W_C-W_T \leq 15$ J/m$^2$. In some embodiments, the method can include introducing $W_C$ and $W_T$ such that −100 J/m$^2 \leq (W_C-W_T) \leq 25$ J/m$^2$. In some embodiments, the method can include introducing $W_C$ and $W_T$ such that −100 J/m$^2 \leq (W_C-W_T) \leq 20$ J/m$^2$. In some embodiments, the method can include introducing $W_C$ and $W_T$ such that −100 J/m$^2 \leq (W_C-W_T) \leq 15$ J/m$^2$. In some embodiments, the method can include introducing $W_C$ and $W_T$ such that −50 J/m$^2 \leq (W_C-W_T) \leq 25$ J/m$^2$. In some embodiments, the method can include introducing $W_C$ and $W_T$ such that −50 J/m$^2 \leq (W_C-W_T) \leq 20$ J/m$^2$. In some embodiments, the method can include introducing $W_C$ and $W_T$ such that −50 J/m$^2 \leq (W_C-W_T) \leq 15$ J/m$^2$.

In some embodiments, introducing $W_C$ and $W_T$ can include immersing the glass article in one or more ion-exchange solutions. In embodiments that include immersing the glass article in two or more ion-exchange solutions, the glass article can be; (i) immersed in a first ion-exchange solution at a temperature and for a time sufficient to cause ion-exchange in surface regions of the glass article, (ii) removed from the first ion-exchange solution, (iii) the immersed in a second ion-exchange solution at a temperature and for a time sufficient to cause ion-exchange in surface regions of the glass article, (iv) removed from the second ion-exchange solution, and so on.

In some embodiments, introducing $W_C$ and $W_T$ can include immersing the glass article in one or more ion-exchange solutions, and annealing the glass article after removing the glass article from the one or more ion-exchange solutions. In embodiments that include immersing the glass article in two or more ion-exchange solutions, the glass article can be annealed after being removed from the last ion-exchange solution. In such embodiments, $W_C-W_T$ can greater than 25 J/m$^2$, or greater than 20 J/m$^2$, or greater than 15 J/m$^2$, before annealing the glass article.

Frangible glass article 300 can have a fracture toughness ($K_{1C}$) measured in MPa*m$^{1/2}$, a Young's modulus (E) measured in pascals, and a Poisson's ratio (v). Unless specified otherwise, a fracture toughness ($K_{1C}$) value, a Young's modulus (E) value, and a Poisson's ratio (v) value for a glass article is the value measured for the glass composition from which the frangible glass article 300 is made. Values of these properties reported here are measured before the composition or glass article is subjected to any ion-exchange process, thermal tempering process, annealing process, or any other strengthening process. The glass composition of a glass article subjected to an ion-exchange process can be determined by measuring the composition of the glass article in the central region, where the composition of the glass article is unaffected (or is least affected) by the ion-exchange process.

In some embodiments, the Young's modulus (E) of frangible glass article 300, or the glass composition from which frangible glass article 300 is made, can range from 60 gigapascals (GPa) or more to 130 GPa or less, including subranges. For example, in some embodiments, the Young's modulus of the glass composition can range from 60 GPa to 130 GPa, 60 GPa to 120 GPa, 60 GPa to 100 GPa, 60 GPa to 80 GPa, 80 GPa to 130 GPa, or 100 GPa to 130 GPa, or 120 GPa to 130 GPa, or within a range having any two of these values as endpoints, inclusive of the endpoints.

In some embodiments, the Poisson's ratio (v) of frangible glass article 300, or the glass composition from which frangible glass article 300 is made, can range from 0.15 or more to 0.30 or less, including subranges. For example, in some embodiments, the Poisson's ratio (v) can range from 0.15 to 0.30, 0.15 to 0.28, 0.15 to 0.26, 0.15 to 0.25, 0.15 to 0.24, 0.15 to 0.22, 0.15 to 0.20, 0.15 to 0.18, 0.18 to 0.30, 0.20 to 0.30, 0.22 to 0.30, 0.24 to 0.30, 0.25 to 0.30, 0.26 to 0.30, or 0.28 to 0.30, or within a range having any two of these values as endpoints, inclusive of the endpoints.

Unless specified otherwise, the Young's modulus values and Poisson's ratio values disclosed in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Nonmetallic Parts." A Poisson's ratio value (v) is calculated based on the Young's modulus value (E) and shear modulus value (G) obtained from the ASTM E2001-13 test using the following formula: $E=2G(1+v)$.

In some embodiments, the fracture toughness of frangible glass article 300, or the glass composition from which frangible glass article 300 is made can be 0.67 MPa*m$^{1/2}$ or more. In some embodiments, the fracture toughness of frangible glass article 300, or the glass composition from which frangible glass article 300 is made, can range from 0.67 MPa*m$^{1/2}$ to 1.1 MPa*m$^{1/2}$.

Unless specified otherwise, a $K_{1C}$ value is measured by the chevron notched short bar method, and is reported in MPa*m$^{1/2}$ (megapascals times square root meter). The chevron notched short bar (CNSB) method utilized to measure the $K_{1C}$ value is disclosed in Reddy, K. P. R. et al, "Fracture Toughness Measurement of Glass and Ceramic Materials Using Chevron-Notched Specimens," J. Am. Ceram. Soc., 71 [6], C-310-C-313 (1988) except that Y*m is calculated using equation 5 of Bubsey, R. T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (October 1992).

In some embodiments, frangible glass article 300 can have a total load ratio ($W_i/G_D$) less than 6.5 and a total elastic compressive stress energy per unit area of glass ($W_C$) less than 60% of a total load ($W_i$), where $W_i=W_C+W_T$, $G_D=4G_{1C}$, and $$G_{1C} = \frac{K_{1C}^2(1-v^2)}{E}.$$

$G_D$ is the dynamic fracture energy of frangible glass article 300.

In some embodiments, frangible glass article 300 can have (iii) a compressive load ratio ($W_C/G_D$) less than 3.9. In some embodiments, frangible glass article 300 can have a compressive load ratio ($W_C/G_D$) less than 3.5.

Desirable fracture behavior can be achieved by designing frangible glass article 300 to have a (i) total load ratio ($W_i/G_D$) less than 6.5 and (ii) a total elastic compressive stress energy per unit area of glass ($W_C$) less than 60% of a total load ($W_i$) and, optionally, also (iii) a compressive load ratio ($W_C/G_D$) less than 3.9. In particular, by designing frangible glass article 300 to have (i) and (ii), and optionally (iii), frangible glass article 300 can exhibit a fracture pattern that reduces or eliminates ejection of glass particles from frangible glass article 300 when frangible glass article is adhesively attached to an adhesive tape and/or adhesively attached to a substrate. Relatedly, by designing frangible glass article 300 to have (i) and (ii), and optionally (iii), frangible glass article 300 can exhibit a columnar or quasi-columnar fracture pattern which, when adhesively attached to an adhesive tape and/or a substrate, is desirable for reducing or eliminating ejection of glass particles from frangible glass article 300 during fracture.

These three characteristics (i)-(iii) of frangible glass article 300 incorporate a certain mechanical property of frangible glass article 300 (namely dynamic fracture energy) related to the fracture behavior of frangible glass article 300. Thus, they are related to the ability of frangible glass article 300 to exhibit a fracture pattern that reduces or eliminates ejection of glass particles upon fracture when frangible glass article 300 is adhesively attached to an adhesive tape and or adhesively attached to a substrate.

The following discussion explains how the desirable fracture behavior can be achieved by designing frangible glass article 300 to have (i) and (ii), and optionally (iii). Frangible glass article 300 can have a differential load ratio defined by the difference between the compressive load ratio $$\left(\frac{W_C}{G_D}\right)$$

and the tensile load ratio $$\left(\frac{W_T}{G_D}\right)$$

of the article, according to the following equation.

$$DLR = \frac{W_C}{G_D} - \frac{W_T}{G_D} \qquad \text{(Equation 14)}$$

This differential load ratio (DLR) can also be expressed in terms of $G_{IC}$ as $W_d/G_{IC}$, where $W_d=W_C-W_T$.

Frangible glass article 300 can have a total load ratio defined by the following equation.

$$TLR = \frac{W_i}{G_D} = \frac{W_C}{G_D} + \frac{W_T}{G_D}$$ (Equation 15)

Various glass articles where tested according to the "Glass Fracture Test" to evaluate the fracture behavior of the glass articles. For each test, a PHANTOM® v2511 high-speed camera was used to evaluate how many, if any, glass particles ejected from the surface of the glass articles. Based on the amount of, or lack of, glass particles ejected from the surface of the glass article, each glass article was given a "probability of ejection" score on a scale of 0 to 100. A score of 0 means that no ejected glass particles were observed. A score of less than 20 means that little to no ejected glass particles were observed. A glass article with a score of less than 20 is considered to have "low" particle ejection and means the fracture pattern of the glass article was columnar or that it was quasi-columnar with a small degree of non-columnar fracture. A score of 20 to less than 50 means that some ejected glass particles were observed. A glass article with a score of 20 to less than 50 is considered to have "moderate" particle ejection and means that the fracture pattern of the glass article was quasi-columnar with a significant degree of non-columnar fracture. A score of 50-100 means that a significant number of ejected glass particles were observed. A glass article with a score of 50-100 is considered to have "high" particle ejection and means that the fracture pattern of the glass article was non-columnar.

During the tests, it was known that the number of estimated fragments per unit surface area for a frangible glass sheet can be estimated according to the following equation.

$$N_e = \frac{m}{4t^2}\left[\left(\frac{W_i}{G_D}\right)^2 - \left(\frac{W_o}{G_D}\right)^2\right]$$ (Equation 16)

where $$\left(\frac{W_o}{G_D}\right)$$

is the frangibility limit of the glass article, t is the thickness of the glass article and m is a constant. So, based on this known equation for estimating the number of particles ejected, it was discerned that the degree of particle ejection observed in the Glass Fracture Tests was indirectly or directly dependent on the total load ratio.

With these relationships established, and the ejection scores assigned to the various glass articles, the correlation between the probability of glass particle ejection and various stress or energy parameters for the glass articles was analyzed. The various stress or energy parameters evaluated for correlation included the compressive stress at the surface, maximum central tension stress, Differential Elastic Energy, differential load ratio, and total load ratio. Based on the analysis, it is found that, among all the stress or energy parameters reviewed for correlation, Differential Elastic Energy gave the second best correlation and the differential load ratio gave the best correlation.

Figure 5:
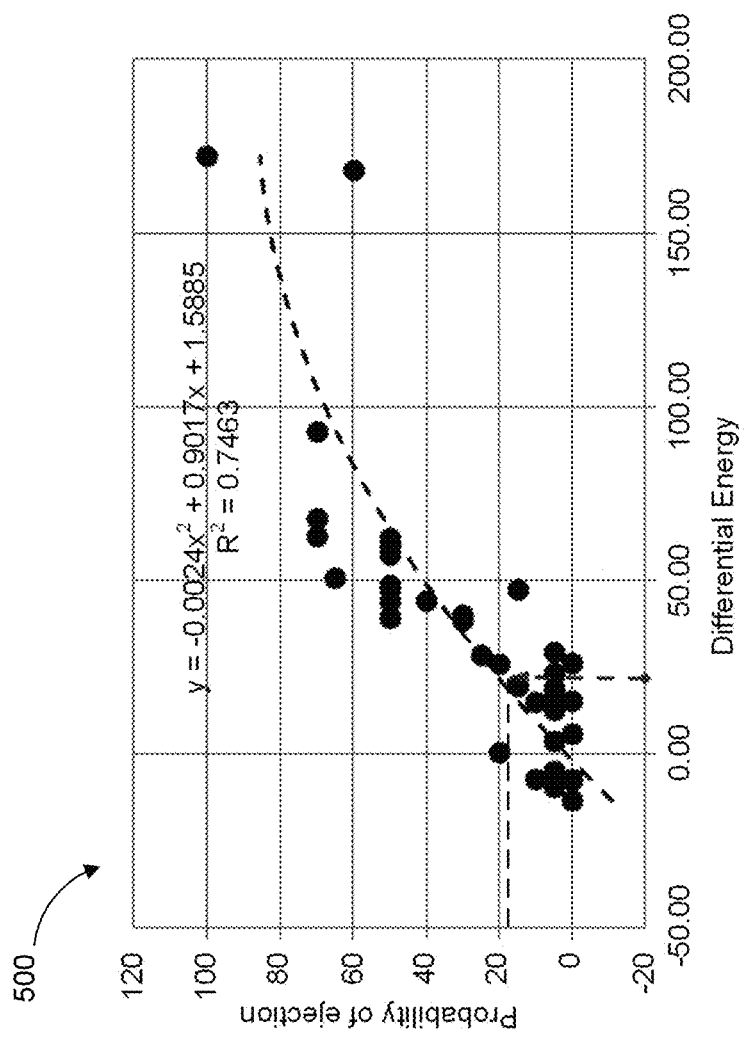
FIG. 5 is a graph of probability of glass particle ejection versus differential energy.
Figure 6:
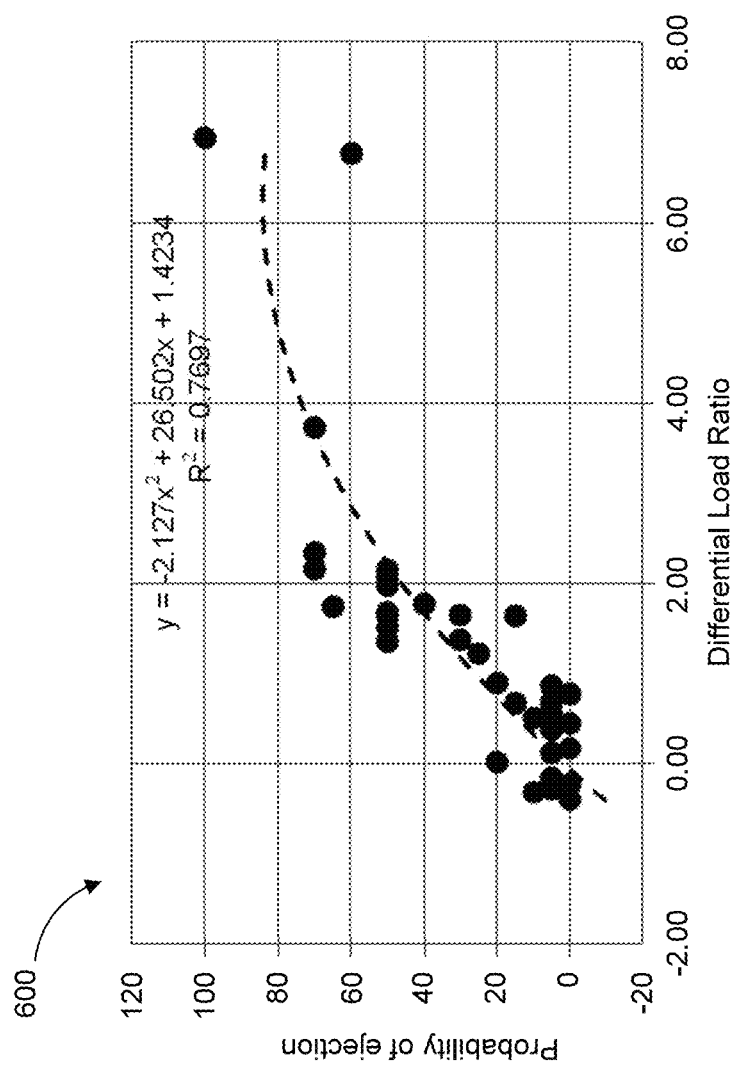
FIG. 6 is a graph of probability of glass particle ejection versus differential load ratio.

As shown in graph 600 of FIG. 6, the $R^2$ for probability of ejection vs. differential load ratio is higher than the $R^2$ for probability of ejection vs. Differential Elastic Energy ("differential energy") in graph 500 of FIG. 5. The higher $R^2$ indicates a better correlation. Without wishing to be bound by theory, this appears to agree with the physical understanding of the fracture process—if the same differential energy exists in two glass articles with different fracture properties, one would expect more fragmentation and higher probability of ejection in the glass with a lower critical strain energy release rate ($G_{1C}$) (i.e., the amount of energy per unit area to create a new crack within a glass article).

To check the viability of the scoring system, the ejection score for a Differential Elastic Energy of 20 J/m² was checked based on the data fit and was found to be about 18.66, as shown in FIG. 5. Per the scoring system, a probability of ejection score less than 20 is "low" and indicates negligible or no particle ejection. Thus, the results of the analysis agree with the discussion herein regarding the ability to achieve desirable fracture behavior by designing frangible glass article 300 to have a Differential Elastic Energy value or range as described herein.

Figure 7:
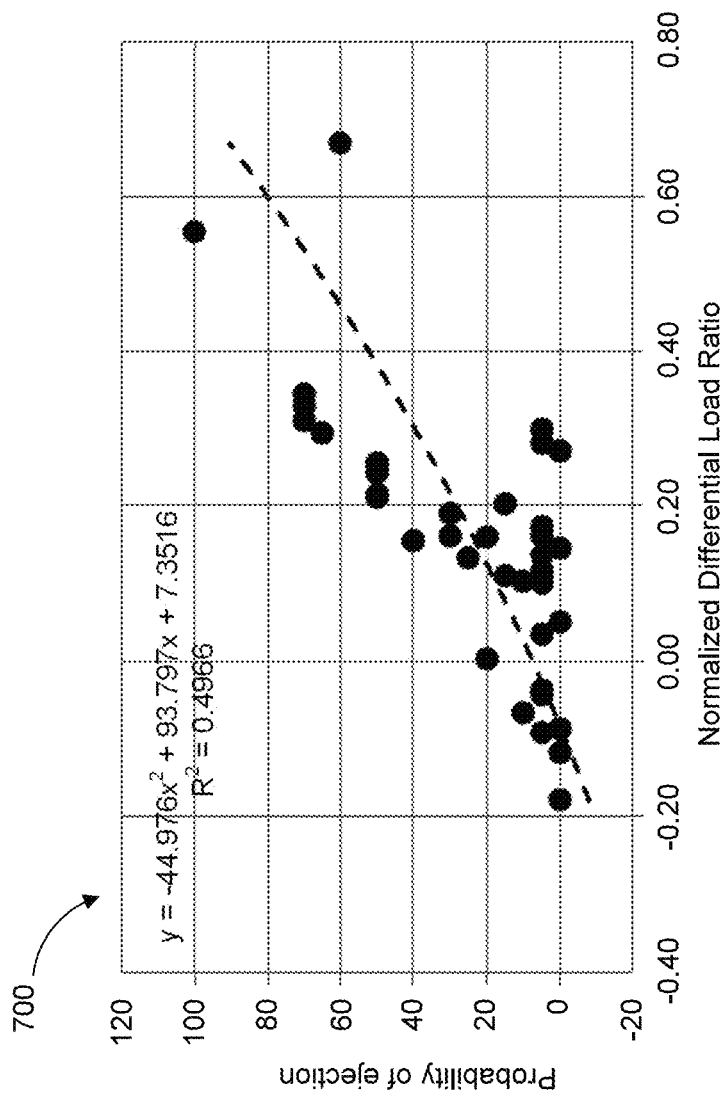
FIG. 7 is a graph of probability of glass particle ejection versus normalized differential load ratio.

In an attempt to create a parameter that normalizes the differential load ratio by the total load ratio, an analysis was performed to see if there was a correlation between the particle ejection and the differential load ratio as a fraction of the total load ratio. The results of this attempt are shown in the graph 700 of FIG. 7. The resulting low $R^2$ value indicates the correlation is poor. This was not surprising because this ratio negates the effect of the fracture energy from Equations 14 and 15.

Figure 8:
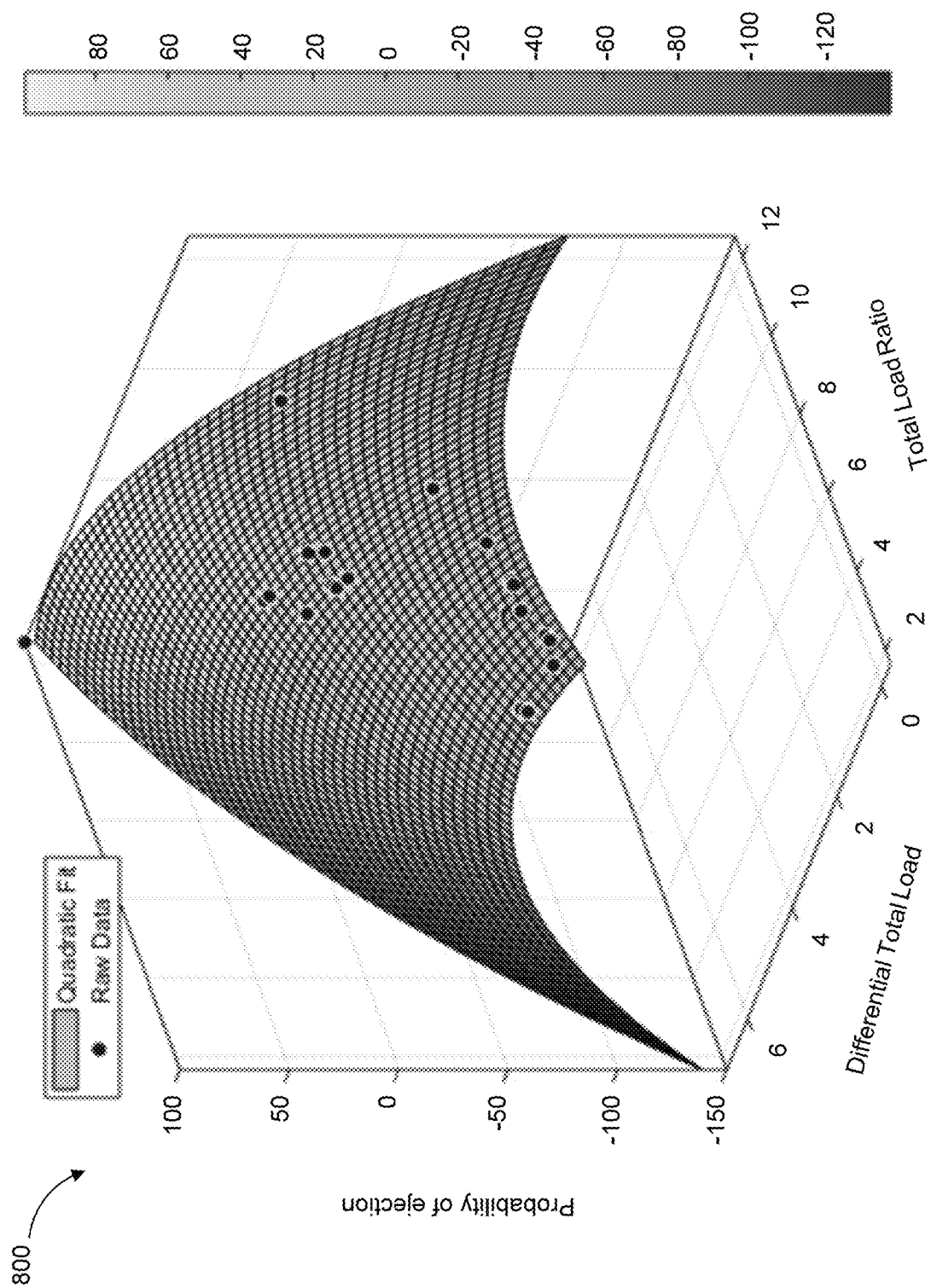
FIG. 8 is a multivariable graph of probability of glass particle ejection versus differential load ratio and total load ratio.

The poor correlation between probability of particle ejection and normalized differential load ratio also indicates that the total load ratio can be a parameter of significance independent of the differential load ratio. To confirm this hypothesis, a multivariate regression analysis was used to correlate the probability of ejection scores to the differential load ratios and total load ratios of the glass articles, treating both of them as independent parameters. This was done in MATLAB® using the built-in nonlinear regression function "fitnlm." The following equation was used to estimate the correlation between the probability of ejection scores and differential load ratio and total load ratio.

$$E = b_1 + b_2 x + b_3 y + b_4 xy + b_5 x^2 + b_5 y^2$$ (Equation 17)

where E is the probability of ejection score, x represents the differential load ratio, and y represents the total load ratio. The fit obtained had an $R^2$ value of 0.828, which indicates a strong correlation. The two variable fit is visualized in graph 800 in FIG. 8. Graph 800 shows the individual data points and the multivariable fit.

Figure 9A:
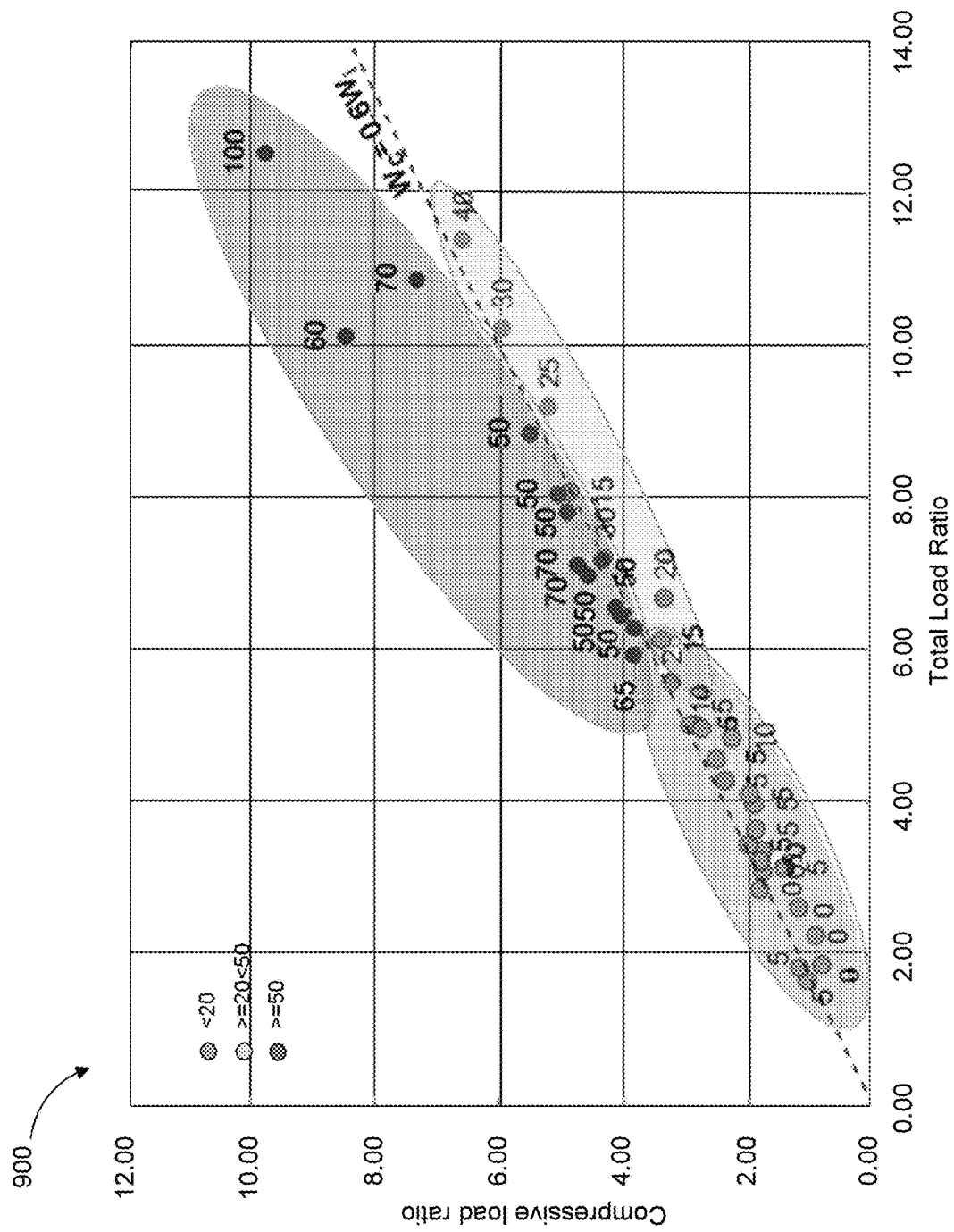
FIG. 9A is a graph of compressive load ratio versus total load ratio populated with probability of glass particle ejection scores categorized into groups.

As previously discussed, the probability of ejection scores were classified into three categories: (1) "low," meaning a probability of ejection score of less than 20, (2) "moderate," meaning a probability of ejection score of 20 to less than 50, and (3) "high," meaning a probability of rejection score of 50-100. These categories are presented on graph 900 of compressive load ratio versus total load ratio in FIG. 9. Each data point in graph 900 represents the probability of ejection score of a tested glass article plotted in the compressive load ratio-total load ratio space.

Glass articles with a probability of ejection score that falls into the "high" category consistently have a compressive load ratio that is approximately 60% of the total load ratio (represented by the dashed line labeled "$W_c = 0.6 W_i$"). Glass articles with a probability of ejection that falls into the "moderate" category with a compressive load ratio below 60% (i.e., below the $W_c=0.6W_t$ line) of the total load ratio consistently have an increasing probability of ejection with increasing total load ratio, particularly at a load ratio above 12. The results show that, at a load ratio above 12, the probability of ejection score for glass articles with a compressive load ratio below 60% would be above 50.

Figure 9B:
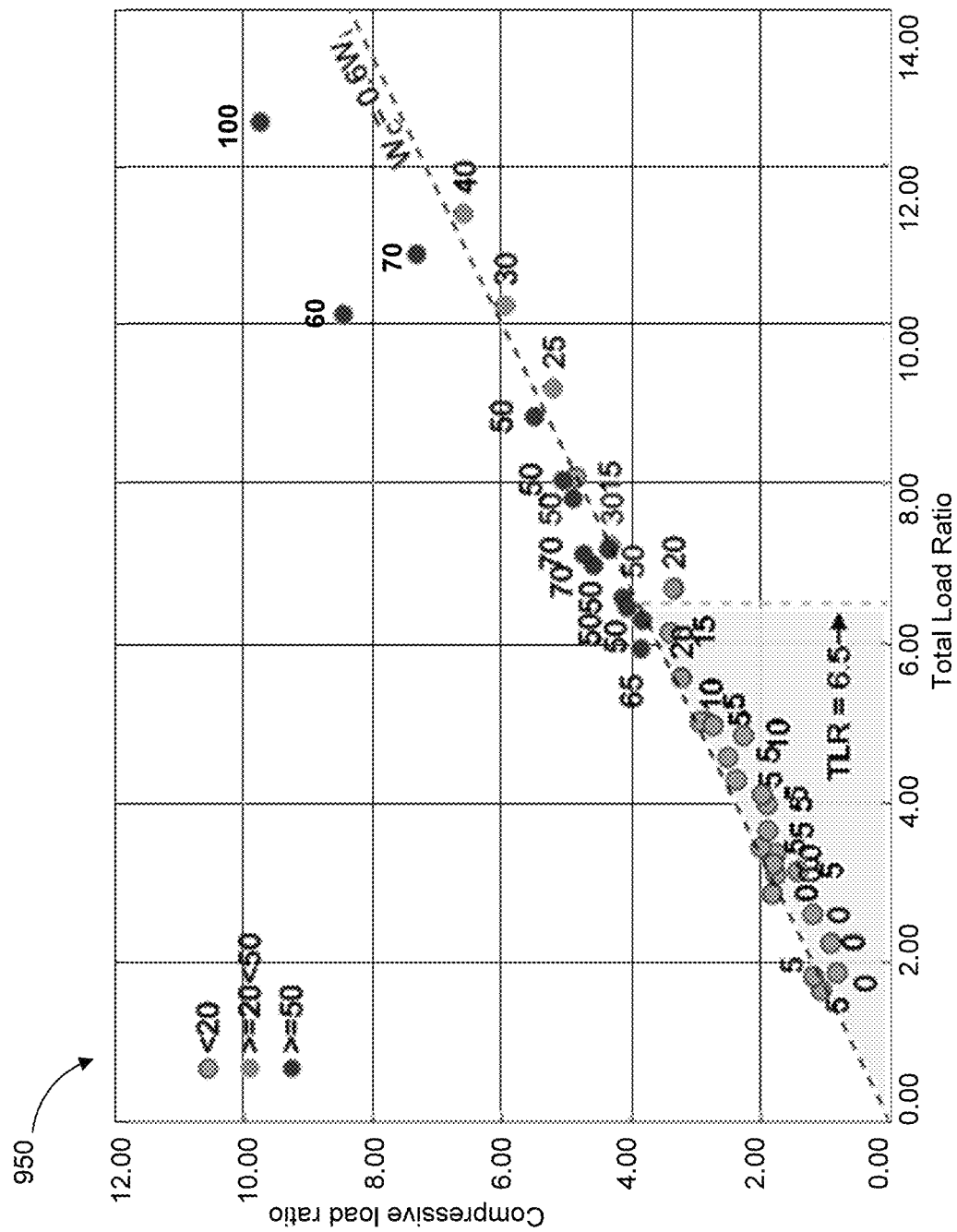
FIG. 9B is a graph of compressive load ratio versus total load ratio populated with probability of glass particle ejection scores.

Graph 950 in FIG. 9B also plots the probability of ejection scores for the tested glass articles in the compressive load ratio-total load ratio space. Graph 950 shows that glass articles with a probability of ejection score that falls into the "low" category consistently have a (i) total load ratio ($W_t/G_D$) less than 6.5 and (ii) a total elastic compressive stress energy per unit area of glass ($W_C$) less than 60% of a total load ($W_t$) and, optionally, also (iii) a compressive load ratio ($W_C/G_D$) less than 3.9. These features can thus be used to evaluate whether or not a glass article with a particular stress profile can resist or significantly mitigate glass particle ejection during the "Glass Fracture Test."

Numerical simulations were used to demonstrate the ability of glass articles with a probability of ejection score that falls into the "low" category to exhibit little or no particle ejection upon fracture when adhesively attached to an adhesive tape and/or adhesively attached to a substrate. The numerical simulations were performed using peridynamics, which is a meshless method that can be used to solve complex dynamic fracture problems. FIGS. 10A-10D show images of modeled fracture patterns for a small sheet of glass having a residual stress profile through its thickness with non-annealed (parabolic) profile shown in FIG. 2 and fractured according to the "Glass Fracture Test." FIGS. 11A-11D show images of modeled fracture patterns in a small sheet of glass having a residual stress profile through its thickness with an annealed (offset error function) profile shown in FIG. 2 and fractured according to the "Glass Fracture Test."

Images 1000 and 1100 in FIGS. 10A and 11A show a modeled fracture patterns for the glass sheet having a fracture initiated at a fracture initiation point 1002 with a first tensile load ratio $$\left(\frac{W_T}{G_D}\right)$$

of 6.81. Images 1020 and 1120 in FIGS. 10B and 11B show modeled fracture patterns for the glass sheet having a fracture initiated at a fracture initiation point 1002 with a second tensile load ratio greater than the first tensile load ratio. Images 1040 and 1140 in FIGS. 10C and 11C show modeled fracture patterns for the glass sheet having a fracture initiated at a fracture initiation point 1002 with a third tensile load ratio greater than the second tensile load ratio. Images 1060 and 1160 in FIGS. 10D and 11D show modeled fracture patterns for the glass sheet having a fracture initiated at a fracture initiation point 1002 with a fourth tensile load ratio greater than the third tensile load ratio. The images show an increasing number of secondary fractures and surface roughening with increasing tensile load ratio. The annealed profile showed lesser crack curving, which is less likely to cause out of plane cracks, and thus can result in a lesser amount of glass particle ejection. The images corroborate the experimental findings.

Figure 12:
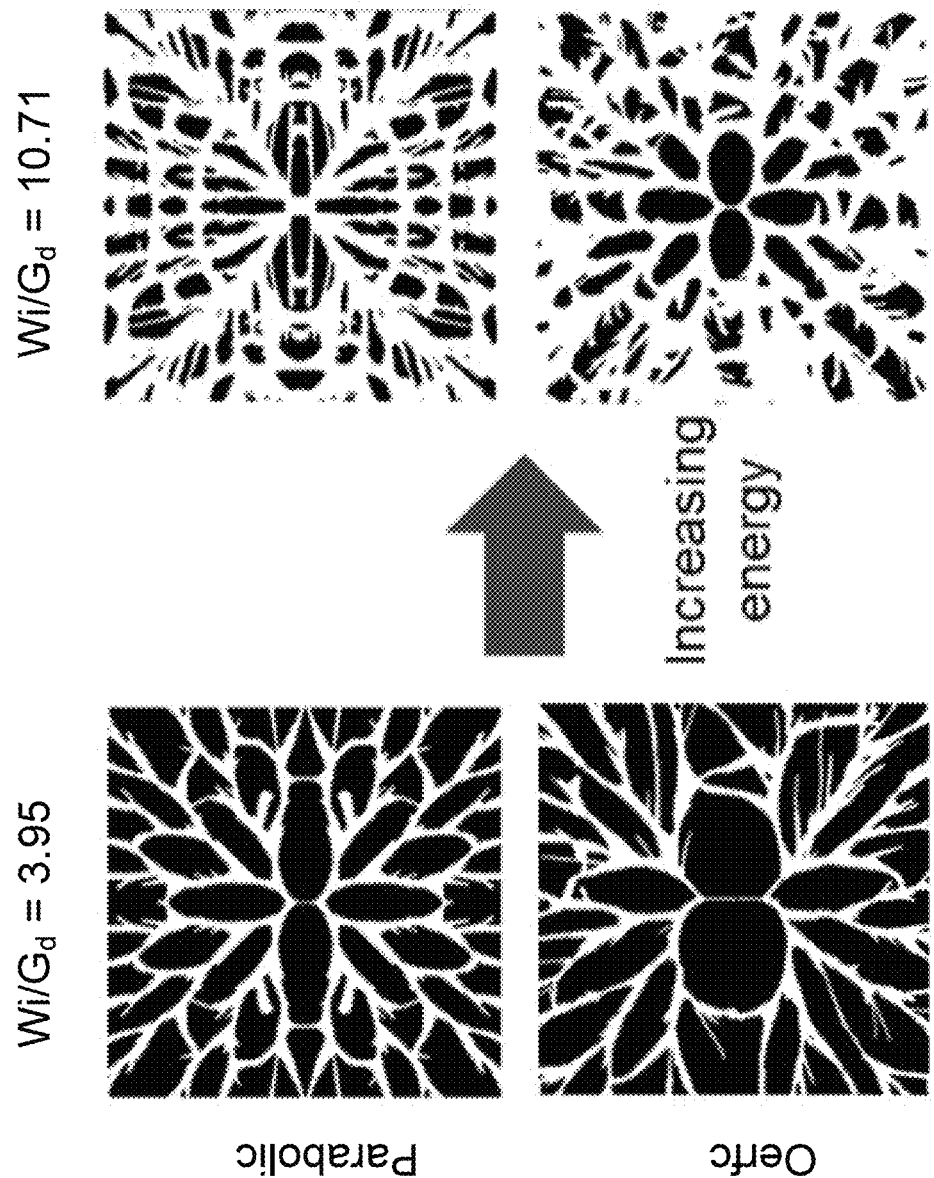
FIG. 12 is a comparison of modeled fracture patterns for parabolic (non-annealed) and offset error function (annealed) stress profiles.

To further corroborate the experimental findings, the various images in FIGS. 10A-11D, as well as others at different load ratios were analyzed using image analysis software to evaluate their fracture patterns. The image analysis software was used to calculate the percentage area of columnar fragments in the fracture patterns. FIG. 12 shows binary images of the fracture patterns for the non-annealed (parabolic) stress profile shown in FIG. 2 and the annealed (offset error function) stress profile shown in FIG. 2 at two different load ratios. The fracture initiation point in FIG. 12 is located at the center of each image. At higher load ratios, the percentage of columnar fragments decreases, which implies an increase in percentage of non-columnar fragments. The white area in the images represents non-columnar fracture area. Without wishing to be bound by theory, it is believed this decrease is due to extensive crack curving and possibly out of plane cracks.

Figure 13:
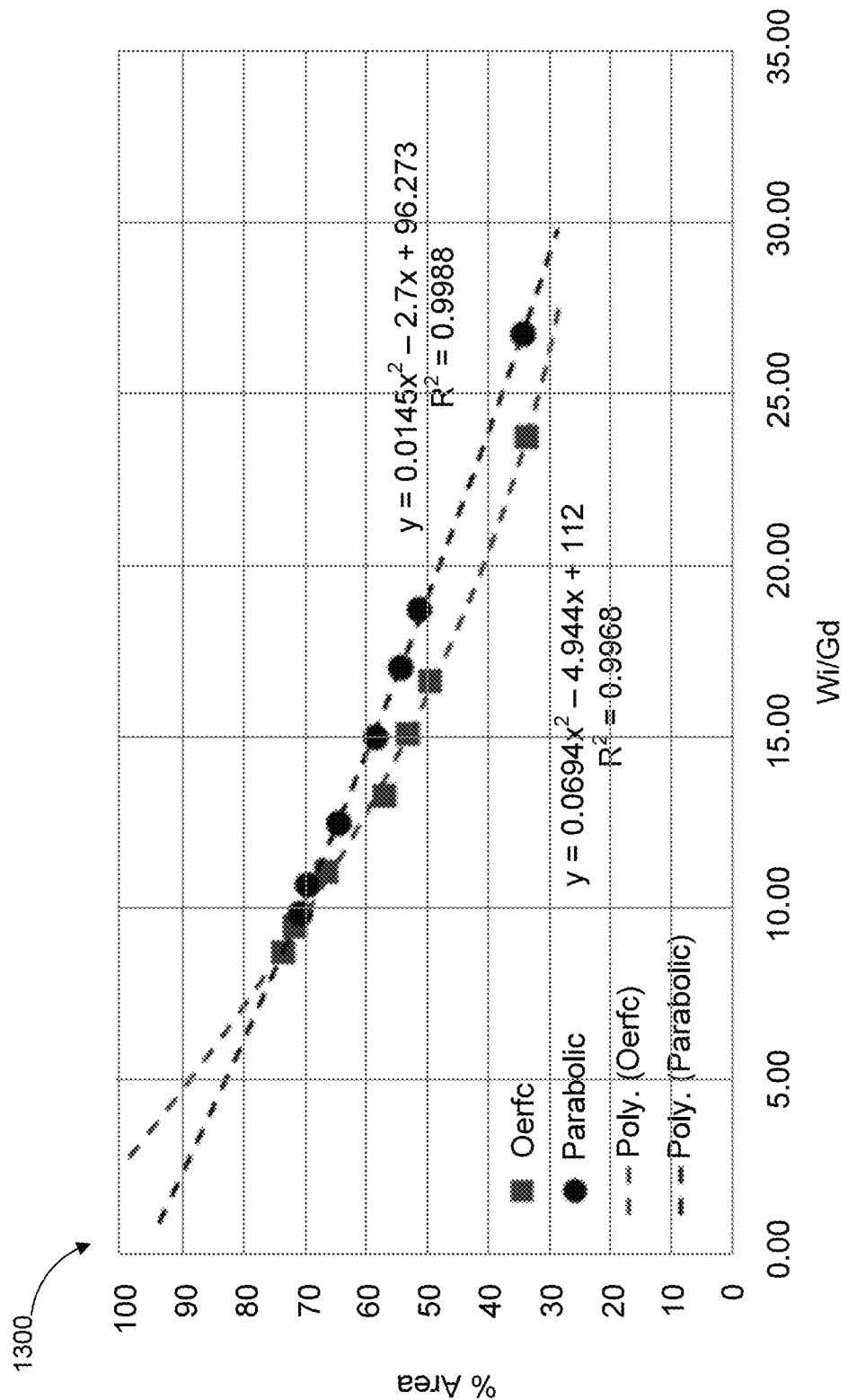
FIG. 13 is a graph of the modeled columnar fragment area versus the total load ratio for an offset error function (annealed) stress profile and a parabolic (non-annealed) stress profile.

The trend in percentage area of columnar fragments was calculated and plotted against the total load ratio in graph 1300 of FIG. 13. At low total load ratios less than 10, the annealed profile performs better and shows higher percentage of columnar fragment area. However, at total load ratios greater than 10, the annealed profile appears to perform poorer with lower columnar fragment area. This indicates a change in behavior of the annealed and non-annealed profiles relative to each other as a function of the total load ratio. The modeling results and data analysis from experiments converge to the same conclusion—above a total load ratio between 10 and 12, the glass will likely fragment and eject particles for both non-annealed and annealed stress profiles.

The model used to simulate the glass fracture process and thus enable the calculation of the percentage area of columnar fragments is a branch of continuum mechanics, namely peridynamics, which is useful for modeling fracture initiation and propagation. The software used was a program to solve a three-dimensional set of peridynamic equations of motion for linear elastic materials written in Fortran. See Silling S A (2000) Reformulation of elasticity theory for discontinuities and long-range forces, J Mech Phys Solids 48(1):175-209; and Silling S, Askari E (2005) A meshfree method based on the peridynamic model of solid mechanics, Comput Struct 83(17):1526-1535). First, the frangible glass was modeled by simulating an ion-exchange process that imparts residual stresses to the glass (as described here: Jeon B, Stewart R J, Ahmed I Z (2015) Peridynamic simulations of brittle structures with thermal residual deformation: strengthening and structural reactivity of glasses under impacts. Proc. R. Soc. A471: 20150231). Second, fracture and fragmentation in the ion-exchanged frangible glass was simulated by allowing a crack to grow and propagate within the glass according to the equations of motion within peridynamics complemented by the principles of fracture mechanics. Input properties of the modeled glass material include the Young's modulus and Poisson's ratio of the frangible glass, and the critical strain energy release rate corresponding to the total load ratio of the frangible glass article, which produces the desired tensile load ratio.

In some embodiments, frangible glass article 300 can have a modeled columnar fragment area of 75% or more. In some embodiments, frangible glass article 300 can have a modeled columnar fragment area of 80% or more. In some embodiments, frangible glass article 300 can have a modeled columnar fragment area of 75% to 100%, 80% to 100%, or 90% to 100%.

In some embodiments, frangible glass article 300 can be made by a method that includes introducing, into a glass article, a total elastic compressive stress energy per unit area of glass ($W_C$) and an elastic tensile stress energy per unit area of glass ($W_T$) to transform the glass article into frangible glass article 300 having a total load ratio ($W_t/G_D$) less than 6.5 and a total elastic compressive stress energy per unit area of glass ($W_C$) less than 60% of a total load ($W_t$). In some embodiments, the method can include transforming the glass article into frangible glass article 300 having a compressive load ratio ($W_C/G_D$) less than 3.9.

In some embodiments, introducing $W_C$ and $W_T$ can include immersing the glass article in one or more ion-exchange solutions. In embodiments that include immersing the glass article in two or more ion-exchange solutions, the glass article can be (i) immersed in a first ion-exchange solution at a temperature and for a time sufficient to cause ion-exchange in surface regions of the glass article, (ii) removed from the first ion-exchange solution, (iii) immersed in a second ion-exchange solution at a temperature and for a time sufficient to cause ion-exchange in surface regions of the glass article, (iv) removed from the second ion-exchange solution, and so on.

In some embodiments, introducing $W_C$ and $W_T$ can include immersing the glass article in one or more ion-exchange solutions, and annealing the glass article after removing the glass article from the one or more ion-exchange solutions. In embodiments that include immersing the glass article in two or more ion-exchange solutions, the glass article can be annealed after being removed from the last ion-exchange solution.

In some embodiments, frangible glass article 300 can have a differential load ratio ($W_d/G_{IC}$) less than $$72e^{\left(-12\frac{d1}{t}\right)}.$$

By designing the elastic compressive stress energy per unit area and the elastic tensile stress energy per unit area to satisfy this equation, glass particle ejection can be reduced or eliminated. In particular, by designing frangible glass article 300 to satisfy this equation, frangible glass article 300 can exhibit a fracture pattern that reduces or eliminates ejection of glass particles from frangible glass article 300 when frangible glass article is adhesively attached to an adhesive tape and/or adhesively attached to a substrate. Relatedly, by designing frangible glass article 300 to satisfy this equation, frangible glass article 300 can exhibit a columnar or quasi-columnar fracture pattern which, when adhesively attached to an adhesive tape and/or a substrate, is desirable for reducing or eliminating ejection of glass particles from frangible glass article 300 during fracture.

In the process of fragmentation, due to non-columnar fracture, a piece of a glass fragment near the surface of a glass article can be free to move, and thus can be ejected from the surface during the release of stored energy within the glass caused by crack propagation. This occurs preferentially at high values of total stored strain energy, which can result in a high degree of fragmentation.

As discussed herein, fragmentation of a glass article is directly or indirectly proportional to total load ratio ($W_t/G_D$), which is the ratio of the total stored energy to the dynamic fracture energy. As also discussed above, the number of estimated fragments per unit surface area for a frangible glass sheet may be written as:

$$N_e = \frac{m}{4t^2}\left[\left(\frac{W_i}{G_D}\right)^2 - \left(\frac{W_o}{G_D}\right)^2\right]$$

where $$\frac{W_o}{G_D}$$

is the frangibility limit of the glass article, t is the thickness of the glass article, and m is a constant representing the fraction of the fragment density that is realized. The number of estimated fragments per unit surface area for a frangible glass sheet can also be written as follows:

$$N_e = \left(\frac{\Delta W}{2tG_D}\right)^2 = \frac{m}{4t^2}\left[\left(\frac{W_i}{G_D}\right)^2 - \left(\frac{W_0}{G_D}\right)^2\right] \quad \text{(Equation 18)}$$

where $$\frac{\Delta W}{G_D}$$

is the change in energy per unit area per fracture energy after fragmentation.

For simplicity, m can be considered to be equal to 1, and therefor Equation 18 can be written as follows.

$$N_e = \left(\frac{\Delta W}{2tG_D}\right)^2 = \frac{1}{4t^2}\left[\left(\frac{W_i}{G_D}\right)^2 - \left(\frac{W_o}{G_D}\right)^2\right] \quad \text{(Equation 19)}$$

Further, assumptions can be made about the fragmentation pattern to get analytical estimates about the total load ratio required to produce a fracture pattern. For example, consider a 1-layer diced fragmentation pattern that assumes that all fragments are cubes of side length equal to the thickness of the glass. Using this assumption, the energy required per unit area to create a cube fragment with a side length equal to the thickness (t) of the glass can be written as follows.

$$\Delta W = \frac{1}{2}(4t^2)G_D N_e = 2t^2 G_D N_e \quad \text{(Equation 20)}$$

And the fragment density ($N_e$) can be related to the thickness of the glass (t) as follows.

$$N_e = \frac{1}{t^2} \quad \text{(Equation 21)}$$

Then, by substituting Equation 21 in Equation 20, $\Delta W$ can be written as follows.

$$\Delta W = 2G_D \quad \text{(Equation 22)}$$

By further substituting Equation 22 into Equation 19, the following expression can be obtained for the total load ratio at or above which a 1-layer diced fragmentation pattern is possible.

$$\left(\frac{W_i}{G_D}\right)_{1LD} = \sqrt{4 + \left(\frac{W_o}{G_D}\right)^2} \quad \text{(Equation 23)}$$

Similarly, for a 2-layer diced fragmentation pattern that assumes all fragments are cubes of side length equal to the half thickness of the glass (t/2), the total energy required to create this fragmentation pattern can be written as follows.

$$\Delta W = \frac{1}{2}\left(4\frac{t^2}{4} + \frac{t^2}{4}\right)G_D N_e = \frac{5t^2}{8}G_D N_e \quad \text{(Equation 24)}$$

In the case of a 2-layer diced fragmentation pattern, the fragment density ($N_e$) can be related to the thickness of the glass (t) as follows.

$$N_e = \frac{8}{t^2} \quad \text{(Equation 25)}$$

This means that, for a 2-layer diced fragmentation pattern $\Delta W$ can be written as follows.

$$\Delta W = 5G_D \quad \text{(Equation 26)}$$

Using this same methodology for a 4-layer diced fragmentation pattern, 8-layer diced fragmentation pattern, and 16-layer diced fragmentation pattern, $\Delta W$ can be written as follows for each of these patterns, respectively.

$$\Delta W = 11G_D \quad \text{(Equation 27)}$$

$$\Delta W = 24G_D \quad \text{(Equation 28)}$$

$$\Delta W = 49G_D \quad \text{(Equation 29)}$$

Using these equations and the definitions for "columnar," "quasi-columnar," and "non-columnar" fracture described above, an analytical expression for the total load ratio necessary to produce a certain fragmentation pattern can be derived.

Assuming that a "columnar" fragmentation pattern consists of 1-layer diced fragments with particles in the shape of a cube with a side length equal to the thickness (t) of the glass, the criterion for the total load ratio required, i.e., the total load ratio limit, for this pattern can be written as follows.

$$\left(\frac{W_i}{G_D}\right)_C = \sqrt{4 + \left(\frac{W_o}{G_D}\right)^2} \quad \text{(Equation 30)}$$

For a "quasi-columnar" fracture pattern having 75% of the fragments in the form of diced fragments having an edge length t and the remaining 25% of the fragments in the form of diced fragments that are t/2, the change in energy per unit area can be written as follows.

$$\Delta W = 0.75(2G_D) + 0.25(5G_D)$$

$$\Rightarrow \Delta W = 2.75 G_D \quad \text{(Equation 31)}$$

Using this definition and substituting into Equation 19, the limit for quasi-columnar fragmentation behavior can be written as follows.

$$\left(\frac{W_i}{G_D}\right)_{QC} = \sqrt{7.5625 + \left(\frac{W_o}{G_D}\right)^2} \quad \text{(Equation 32)}$$

For a "non-columnar" fracture pattern composed of 25% columnar fragments (which are 1-layer diced fragments) and 75% non-columnar 2-layer diced fragments, the change in energy per unit are can be written as follows.

$$\Delta W = 0.25(2G_D) + 0.75(5G_D)$$

$$\Rightarrow \Delta W = 4.25 G_D \quad \text{(Equation 33)}$$

Using this definition and substituting into Equation 19, the limit for quasi-columnar fragmentation behavior can be written as follows.

$$\left(\frac{W_i}{G_D}\right)_{NC} = \sqrt{18.0625 + \left(\frac{W_o}{G_D}\right)^2} \quad \text{(Equation 34)}$$

Using Equations 30, 32, and 34, and estimates for the frangibility limit as a function of DOC/t according to Equation 1b, the total load ratios required for columnar, quasi-columnar, and non-columnar fracture patterns can be plotted against the frangibility limit ($W_o/G_D$). Equation 1b estimates for the frangibility limit as a function of the DOC/t for single ion-exchanged profiles. These approximate estimates for Equation 1b are derived based on numerical modeling of tunnel crack growth in simple monomial stress profiles of different powers, which generate stress profiles of varying DOC/t and varying shapes. Since the DOC/t ratio for each monomial stress profile is known, the split of the total stored strain energy into its tensile and compressive parts is also known. Based on this knowledge, certain ratios in terms of the stored energies and load ratios can be derived as a function of DOC/t, for example the ratio of differential energy to the total energy $$\left(\frac{W_d}{W_i}\right).$$

This differential ratio is a function of DOC/t and dictates how the total stored energy is split into its tensile and compressive parts.

Using this ratio of $$\frac{W_d}{W_i},$$

the differential load ratio can be defined in terms of the total load ratio as follows.

$$\frac{W_d}{G_D} = \frac{W_d}{W_i}\frac{W_i}{G_D} \quad \text{(Equation 35)}$$

Also, these ratios can be used to change the frangibility limit criteria from being a function of the total load ratio to the differential ratio. For example, the columnar fragmentation limit of Equation 30 can be rewritten as follows.

$$\left(\frac{W_d}{G_D}\right)_C = \frac{W_d}{W_i}\left(\frac{W_i}{G_D}\right)_C = \frac{W_d}{W_i}\sqrt{4 + \left(\frac{W_o}{G_D}\right)^2} \quad \text{(Equation 36)}$$

Using a factor of 3.9 to covert from dynamic fracture energy $G_D$ to the critical strain energy release rate $G_{IC}$, Equation 36 can be updated as follows.

$$\left(\frac{W_d}{3.9G_{IC}}\right)_C = \frac{W_d}{W_i}\sqrt{4 + \left(\frac{W_o}{3.9G_{IC}}\right)^2} \quad \text{(Equation 37)}$$

$$\Rightarrow \left(\frac{W_d}{G_{IC}}\right)_C = 3.9\frac{W_d}{W_i}\sqrt{4 + \left(\frac{W_o}{3.9G_{IC}}\right)^2}$$

Then, Equation 37 can be modified to express the frangibility limit for columnar facture in terms of tensile frangibility limit as follows.

$$\Rightarrow \left(\frac{W_d}{G_{IC}}\right)_C = 3.9\frac{W_d}{W_i}\sqrt{4 + \left(\frac{W_i}{W_t}\frac{W_{ot}}{3.9G_{IC}}\right)^2} \quad \text{(Equation 38)}$$

Similar equations can be written for quasi-columnar and non-columnar fragmentation patterns as follows.

$$\left(\frac{W_d}{G_{IC}}\right)_{QC} = 3.9\frac{W_d}{W_i}\sqrt{7.5625 + \left(\frac{W_i}{W_t}\frac{W_{ot}}{3.9G_{IC}}\right)^2} \quad \text{(Equation 39)}$$

$$\left(\frac{W_d}{G_{IC}}\right)_{NC} = 3.9\frac{W_d}{W_i}\sqrt{18.0625 + \left(\frac{W_i}{W_t}\frac{W_{ot}}{3.9G_{IC}}\right)^2} \quad \text{(Equation 40)}$$

Figure 37:
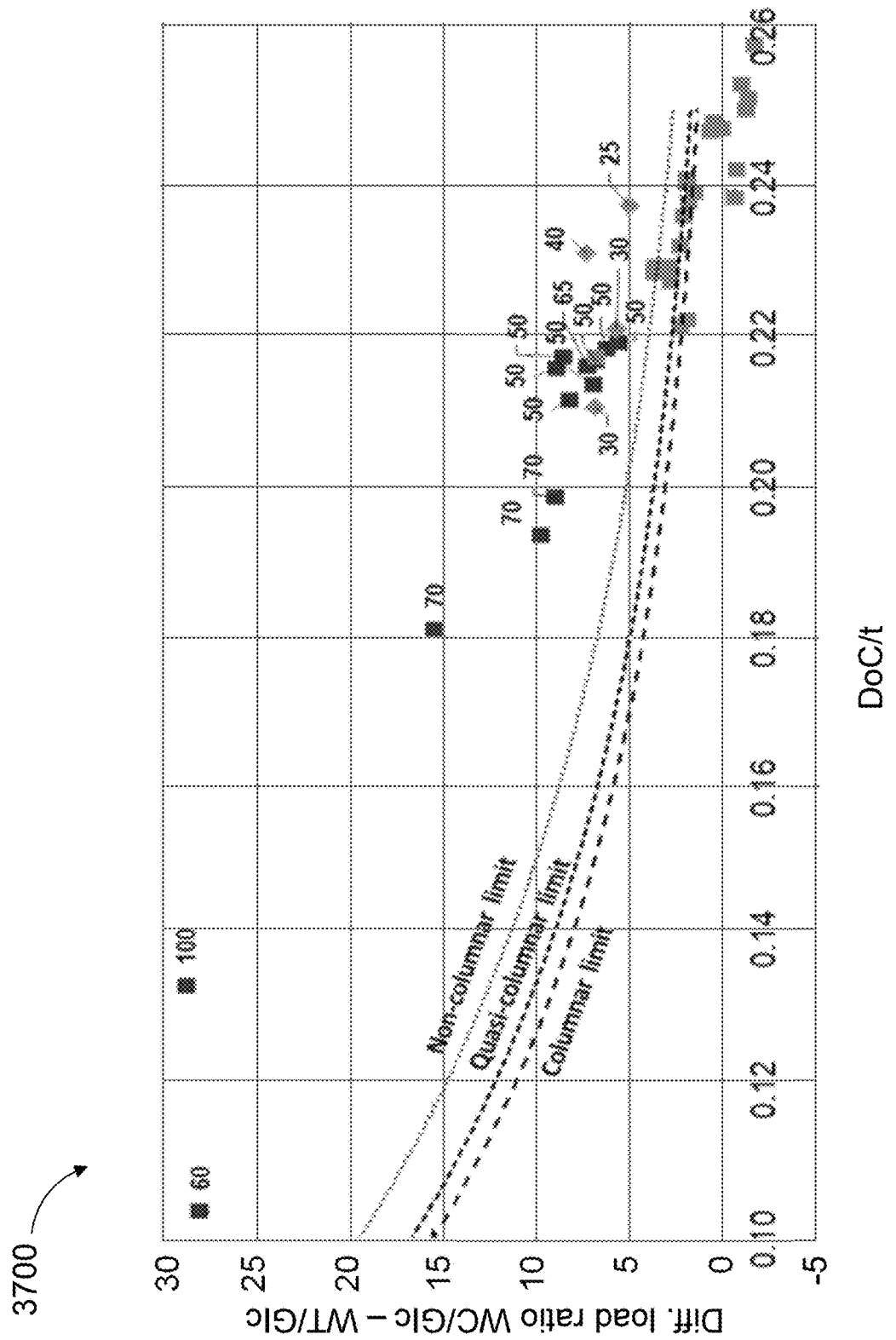
FIG. 37 is a graph of differential load ratio versus percent depth of compression for various glass articles plotted with the differential load limit Equations 38, 39, and 40.

These Equations 38, 39, and 40 express the frangibility limit for columnar, quasi-columnar, and non-columnar fracture in relation to the stress profile of a frangible glass article. Accordingly, using the numerically obtained frangibility limits for monomial stress profiles with DOC/t ratios ranging from 0.03 to 0.21, limits can be established for columnar, non-columnar, and quasi-columnar fragmentation behavior in terms of the differential load ratio along with experimental data points. The experimental fits for the limits as a function of DOC/t are shown in graph 3700 in FIG. 37 along with the probability of glass particle ejection scores for the glass articles tested according to the "Glass Fracture Test".

As shown in graph 3700, the non-columnar limit generally demarcates "low" scores from "moderate" and "high" scores, which indicates the experimental results are generally consistent with the differential load ratio frangibility limit Equations 38, 39, and 40. However, some of the "low" score experimental data points that did not exhibit particle ejection are very close to the non-columnar limit, and even above the limit. Without wishing to be bound by theory, it is believed this is a result of the non-columnar differential load fragmentation limit of Equation 40 assuming fragment sizes of only t and t/2, whereas videos of the "Glass Fracture Tests" suggest that fragment sizes can be much smaller than t/2. The experimental data for percent mass loss reported in Table 10 below shows that the mass loss due to particle ejection can be less than 1%. This means that at least some particles have to be small enough to account for less than 1% of the mass, and are therefore likely smaller than t/2.

Figure 38:
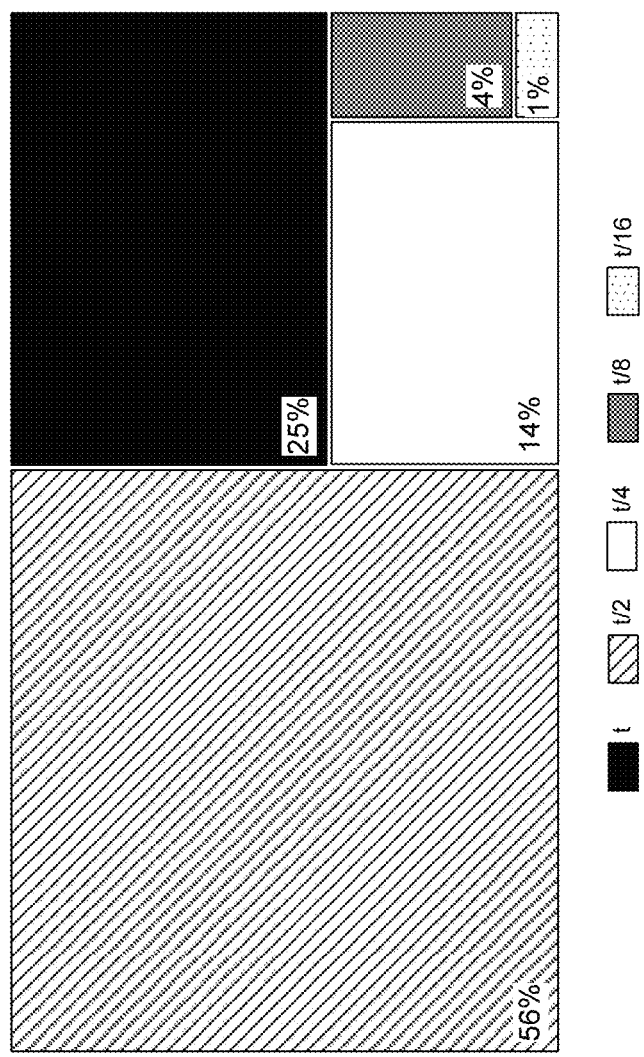
FIG. 38 is a schematic representation of fragment size distribution.

To account for the presence of smaller particles and the complex fracture patterns observed in the "Glass Fracture Tests," the following attributes for the fragment particle size distribution can be hypothesized for fracture of a frangible glass article. (1) 25% of the fragments of the glass are columnar with cubic fragments of edge length t with the remaining 75% being non-columnar. (2) Of the non-columnar fragments in #1, 75% are cubic fragments of edge length t/2 and the remaining 25% are cubic fragments of edge length smaller than t/2. (3) Of the remaining 25% in #2, 75% are cubic fragments of edge length t/4 and the remaining 25% are cubic fragments of edge length smaller than t/4. (4) Of the remaining 25% in #3, 75% are cubic fragments of edge length t/8 and the remaining 25% are cubic fragments of edge length smaller than t/8. (5) Of the remaining 25% in #4, 75% are cubic fragments of edge length t/16 and the remaining 25% are cubic fragments of edge length smaller than t/16. This distribution of these hypothesized fragment particle sizes is shown schematically in FIG. 38.

Knowing the energy required to create fragmentation pattern of various fragment sizes (i.e. t, t/2, t/4, etc.) based on Equations 22 and 26-29, the total energy required to create the hypothesized fragmentation pattern can be written as follows.

$$\Delta W = 0.25(2G_D) + 0.5625(5G_D) + 0.140625(11G_D) + \quad \text{(Equation 41)}$$
$$0.035156(24G_D) + 0.008789(49G_D) \Rightarrow \Delta W =$$
$$0.125G_D + 2.8G_D + 1.55G_D + 0.84G_D + 0.43G_D \Rightarrow$$
$$\Delta W \approx 6\beta G_D$$

Then, by substituting Equation 41 into Equation 19, the frangibility limit in terms of the total load ratio can be written as follows.

$$\left(\frac{W_i}{G_D}\right)_{PE} = \sqrt{37.6 + \left(\frac{W_o}{G_D}\right)^2} \quad \text{(Equation 42)}$$

Further, in terms of the differential limit and the tensile frangibility limit, Equation 42 equation can be rewritten as follows.

$$\left(\frac{W_d}{G_{IC}}\right)_{PE} = 3.9\frac{W_d}{W_i}\sqrt{37.6 + \left(\frac{W_i}{W_t}\frac{W_{ot}}{3.9G_{IC}}\right)^2} \quad \text{(Equation 43)}$$

Figure 39:
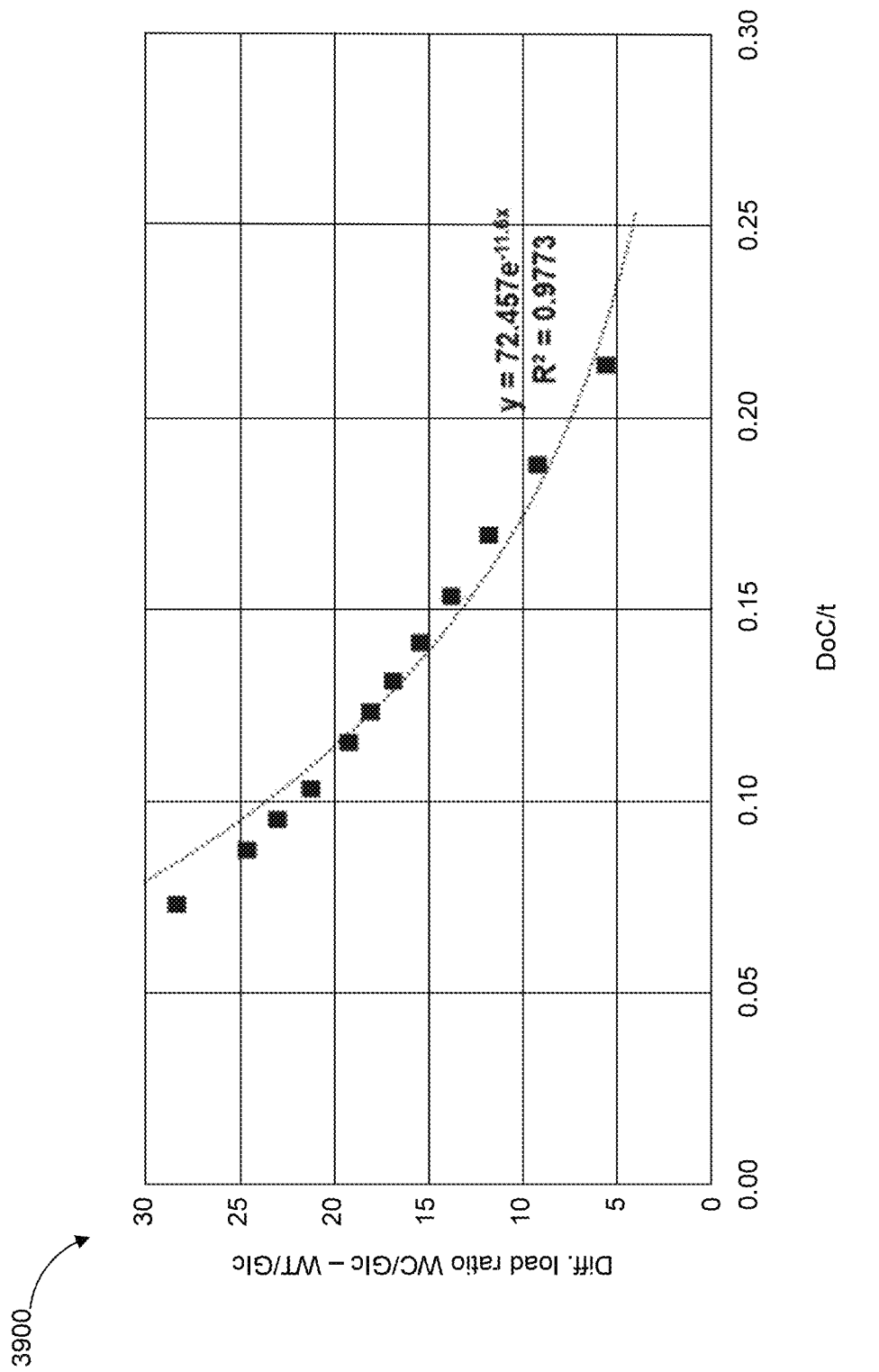
FIG. 39 is a graph of the experimental fit for differential load limit ratio Equation 44.

Using the tensile frangibility limit estimates from Equation 43 for various monomial stress profiles with a DOC/t between 0.03 and 0.21, the differential particle ejection limit can be obtained as a function of DOC/t. Graph 3900 in FIG. 39 shows tensile frangibility limit estimates plotted as a function of DOC/t. The experimental fit for graph 3900 is the differential load limit ratio required to create a fragmentation pattern that results in particle ejection. Varying the fit constants slightly to make the equation simpler and a better fit to the data, the following equation can be used to estimate the differential load limit ratio required to create a fragmentation pattern that results in particle ejection.

$$\left(\frac{W_d}{G_{IC}}\right)_{PE} = 72\exp\left(-12\frac{DoC}{t}\right) \quad \text{(Equation 44)}$$

Figure 40:
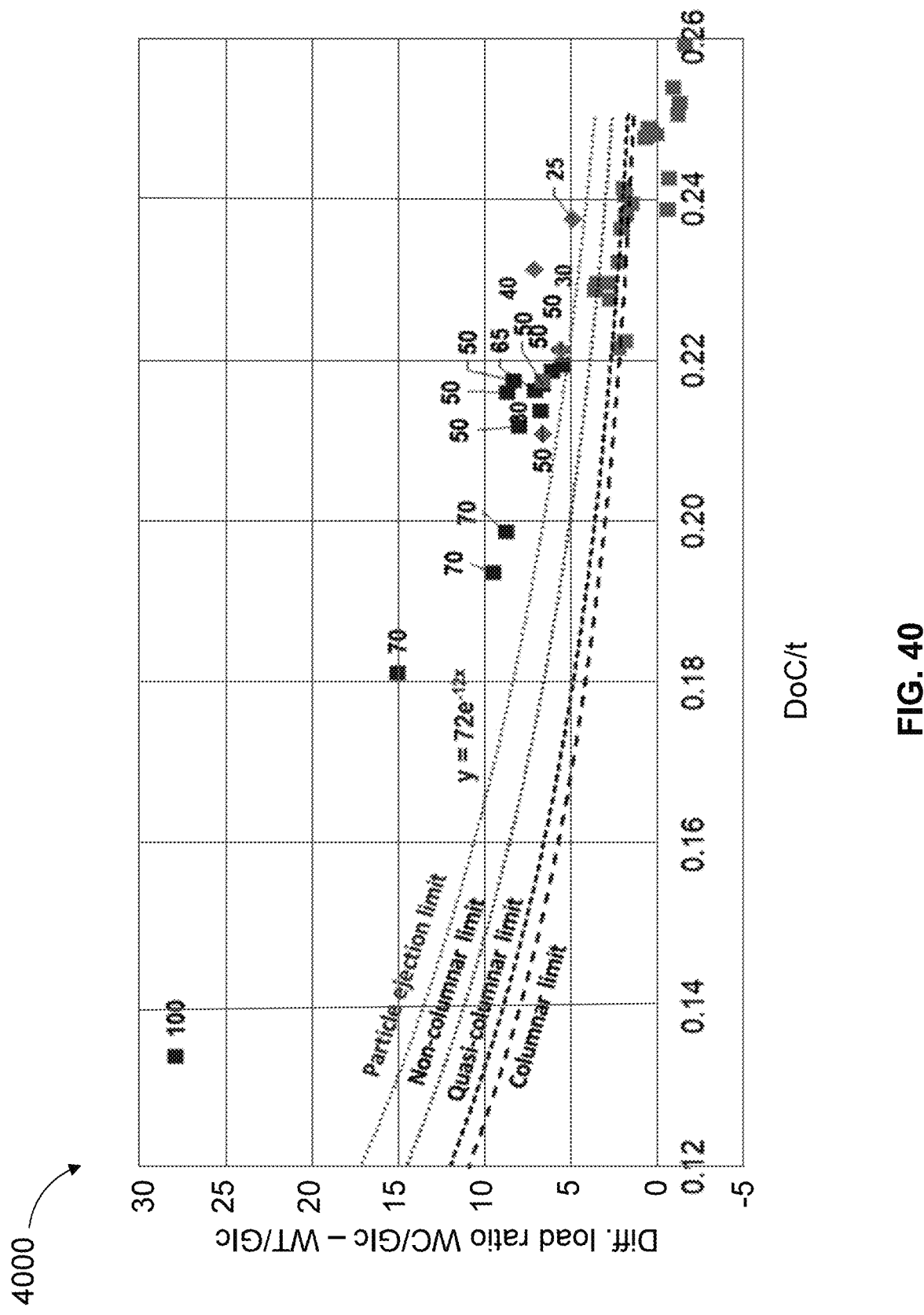
FIG. 40 is graph of differential load ratio versus percent depth of compression for various glass articles plotted with the differential load limit Equations 38, 39, 40, and 44.

This means that a frangible glass article designed to have elastic compressive stress energy per unit area and elastic tensile stress energy per unit area that satisfy this equation can resist or avoid glass particle ejection during fracture. Graph 4000 in FIG. 40 shows Equation 44 plotted with the differential load frangibility limit Equations 38-40, and the probability of glass particle ejection scores for the glass articles tested according to the "Glass Fracture Test." Graph 4000 shows that Equation 44 more accurately demarcates "low" scores from "moderate" and "high" scores compared to Equations 38-40.

In some embodiments, frangible glass article 300 can be made by a method that includes introducing, into a glass article, a total elastic compressive stress energy per unit area of glass ($W_C$) and an elastic tensile stress energy per unit area of glass ($W_T$) to transform the glass article into frangible glass article 300 having a differential load ratio ($W_d/G_{IC}$) less than $$72e^{\left(-12\frac{d1}{r}\right)}.$$

In some embodiments, introducing $W_C$ and $W_T$ can include immersing the glass article in one or more ion-exchange solutions. In embodiments that include immersing the glass article in two or more ion-exchange solutions, the glass article can be (i) immersed in a first ion-exchange solution at a temperature and for a time sufficient to cause ion-exchange in surface regions of the glass article, (ii) removed from the first ion-exchange solution, (iii) immersed in a second ion-exchange solution at a temperature and for a time sufficient to cause ion-exchange in surface regions of the glass article, (iv) removed from the second ion-exchange solution, and so on.

In some embodiments, introducing $W_C$ and $W_T$ can include immersing the glass article in one or more ion-exchange solutions, and annealing the glass article after removing the glass article from the one or more ion-exchange solutions. In embodiments that include immersing the glass article in two or more ion-exchange solutions, the glass article can be annealed after being removed from the last ion-exchange solution.

Figure 14:
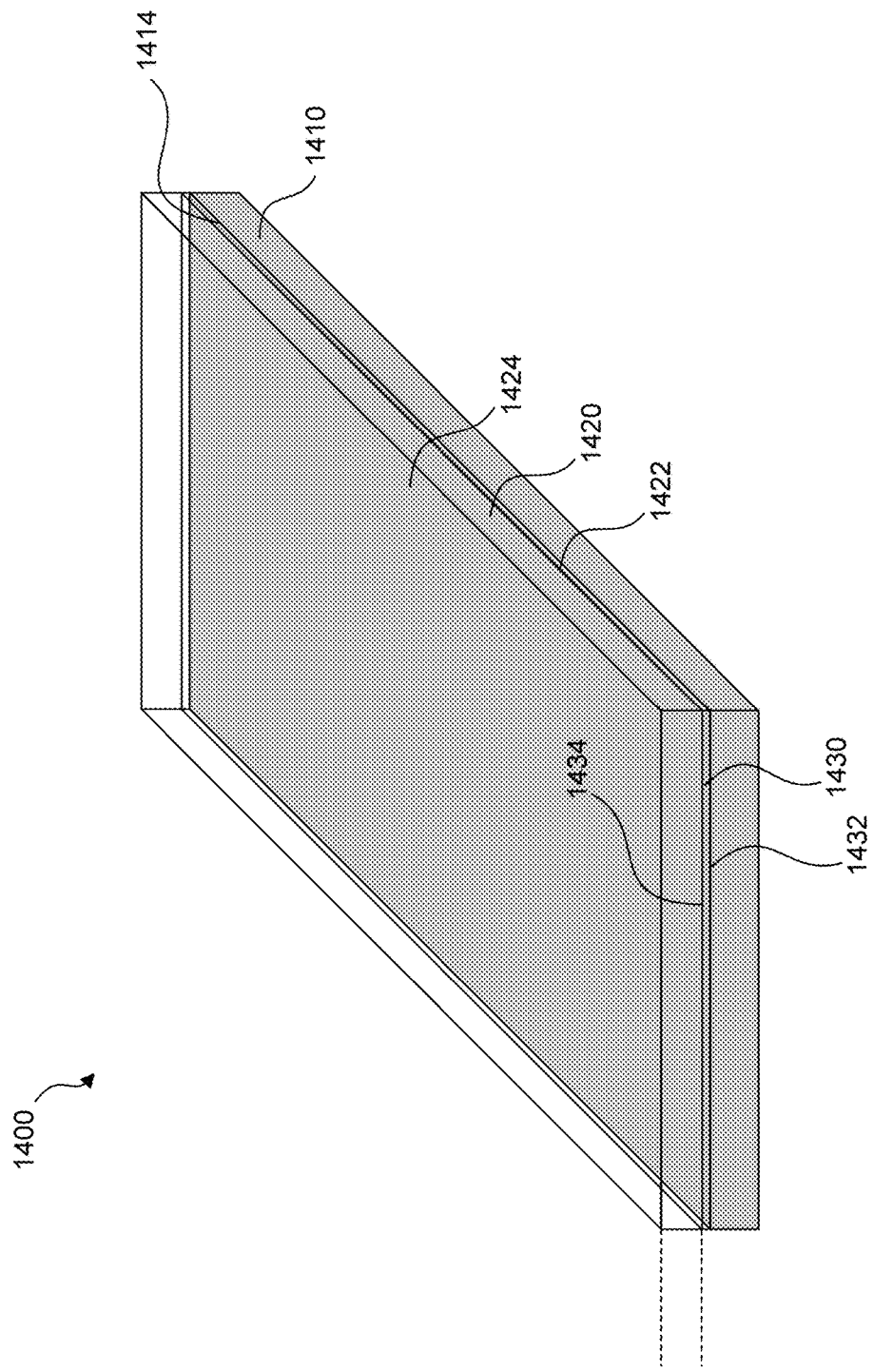
FIG. 14 illustrates an article according to some embodiments.

FIG. 14 illustrates an article 1400 including a frangible glass article according to some embodiments. Article 1400 includes a substrate 1410 and a cover glass layer 1420 attached to substrate 1410 with an adhesive layer 1430. Cover glass layer 1420 can be disposed over all or a portion of a top surface 1414 of substrate 1410. Cover glass layer 1420 can cover all or a portion of substrate 1410. Cover glass layer 1420 can cover all or a portion of top surface 1414 of substrate 1410. In some embodiments, cover glass layer 1420 can cover the entirety of top surface 1414. In such embodiments, cover glass layer 1420 can cover top surface 1414 of substrate 1410 between all opposing edges of top surface 1414. In some embodiments, cover glass layer 1420 can be attached to top surface 1414 of substrate 1410 with adhesive layer 1430. In some embodiments, cover glass layer 1420 can be directly attached to top surface 1414 of substrate 1410 with adhesive layer 1430.

Cover glass layer 1420 can be the frangible glass article 300 as described herein. In such embodiments, top surface 1424 of cover glass layer 1420 can be first surface 310 of frangible glass article 300 and bottom surface 1422 of cover glass layer 1420 can be second surface 312 of frangible glass article.

Adhesive layer 1430 is disposed between bottom surface 1422 of cover glass layer 1420 and top surface 1414 of substrate 1410 and attaches cover glass layer 1420 to substrate 1410. In some embodiments, adhesive layer 1430 can be disposed on top surface 1414 of substrate 1410. In such embodiments, a bottom surface 1432 of adhesive layer 1430 is in direct contact with top surface 1414 of substrate 1410. In some embodiments, adhesive layer 1430 can be disposed on bottom surface 1422 of cover glass layer 1420. In such embodiments, atop surface 1434 of adhesive layer 1430 is in direct contact with bottom surface 1422 of cover glass layer 1420.

In some embodiments, adhesive layer 1430 can be an optically clear adhesive layer. Suitable optically clear adhesive materials for adhesive layer 1430 include, but are not limited to, 3M™ OCA 471 optically clear adhesive tape, 3M™ 8146 optically clear adhesive tape, 3M™ 8215 optically clear adhesive tape, and 3M™ Contrast Enhancement Films (CEFs).

In some embodiments, adhesive layer 1430 can have an adhesive strength of 15 N/100 mm or more. In some embodiments, adhesive layer 1430 can have a peel adhesive strength ranging from 15 N/100 mm to 80 N/100 mm. The peel strength of an adhesive layer is measured according to ASTM D3330 modified (180 degree peel, 12 in./min., 2.0 mil polyester to various surfaces, 20 min RT dwell).

As used herein, "disposed on" means that a first layer and/or component is in direct contact with a second layer and/or component. A first layer and/or component "disposed on" a second layer and/or component may be deposited, formed, placed, or otherwise applied directly onto the second layer and/or component. In other words, if a first layer and/or component is disposed on a second layer and/or component, there are no layers disposed between the first layer and/or component and the second layer and/or component. A first layer and/or component described as "attached to" a second layer and/or component means that the layers and/or components are attached to each other via an adhesive layer. A first layer and/or component described as "directly attached to" a second layer and/or component means that the layers and/or components are directly attached to each other via an adhesive layer with no intervening layers. If a first layer and/or component is described as "disposed over" a second layer and/or component, other layers may or may not be present between the first layer and/or component and the second layer and/or component.

In some embodiments, substrate 1410 can be an electronic display or electronic display component including an electronic display. In such embodiments, all or a portion of top surface 1414 of substrate 1410 can be a display surface of the electronic display or electronic display component. In other words, the display surface can define all or a portion of top surface 1414 of substrate 1410. Exemplary electronic displays include a light emitting diode (LED) display or an organic light emitting diode (OLED) display. In some embodiments, substrate 1410 can be a non-electronic display device. For example, substrate 1410 can be a display device that displays static or printed indicia. In some embodiments, substrate 1410 can be or can include a touch sensor, such as a capacitive touch sensor, a polarizer, or a battery.

In some embodiments, top surface 1424 of cover glass layer 1420 can be a topmost exterior, user-facing surface of article 1400. As used herein, the terms "top surface" or "topmost surface" and "bottom surface" or "bottommost surface" reference the top and bottom surface of a layer, component, or article as is would be oriented during its normal and intended use with the top surface being the user-facing surface. For example, when incorporated into a hand-held consumer electronic product having an electronic display, the "top surface" of an article or layer refers to the top surface of that article or layer as it would be oriented when held by a user viewing the electronic display through the article or layer.

FIGS. 15A and 15B show a consumer electronic product 1500 including a housing 1502 having a front surface 1504, a back surface 1506, and side surfaces 1508. Electrical components that are at least partially inside or entirely within housing 1502 can include at least a controller 1520, a memory 1522, and a display 1510 at or adjacent to front surface 1506 of housing 1502. Display 1510 can be, for example, a light emitting diode (LED) display or an organic light emitting diode (OLED) display.

A cover substrate 1512 can be disposed at or over front surface 1504 of housing 1502 such that it is disposed over display 1510. Cover substrate 1512 can be or include any of frangible glass article 300 as disclosed herein and may be referred to as a "cover glass." Cover substrate 1512 can serve to protect display 1510 and other components of consumer electronic product 1500 (for example, controller 1520 and memory 1522) from damage. In some embodiments, cover substrate 1512 can be attached to display 1510 with an adhesive (for example, adhesive layer 1430). In some embodiments, cover substrate 1512 can define all or a portion of front surface 1504 of housing 1502. In some embodiments, cover substrate 1512 can define front surface 1504 of housing 1502 and all or a portion of side surfaces 1508 of housing 1502. In some embodiments, consumer electronic product 1500 can include a cover substrate defining all or a portion of back surface 1506 of housing 1502.

Glass Compositions

For glass compositions described herein, the concentration of constituent components (e.g., $SiO_2$, $Al_2O_3$, $Na_2O$, and the like) are given in mole percent (mol %) on an oxide basis, unless otherwise specified. Components of the glass compositions according to embodiments are discussed individually below. It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits. As used herein, a composition described as including an oxide within a range defined by 0 mol % as the lower bound means that the composition includes the oxide at any amount above 0 mol % (e.g., 0.01 mol % or 0.1 mol %) and up to the upper bound of the range.

As used herein, the term "substantially free" means that the component is not added as a component of the batch material even though the component may be present in the final glass in very small amounts as a contaminant. As a result of the raw materials and/or equipment used to produce a glass composition of the present disclosure, certain impurities or components that are not intentionally added, can be present in the final glass composition. Such materials are present in the glass composition in minor amounts, referred to "tramp materials." A composition that is "substantially free" of a component means that the component was not purposefully added to the composition, but the composition may still comprise the component in tramp or trace amounts. A composition that is "substantially free" of an oxide means that the oxide is present at an amount less than or equal to 0.1 mol %, for example 0 mol % to less than or equal to 0.1 mol %. As used herein, a glass composition that is "free" of a component, is defined as meaning that the component (e.g., oxide) is not present in the composition, even in tramp or trace amounts.

$SiO_2$ can be the largest constituent in the glass composition and, as such, is the primary constituent of the glass network formed from the glass composition. Pure $SiO_2$ has a relatively low coefficient of thermal expansion (CTE—as used herein this property is measured at a temperature from 0° C. to 300° C.) and is alkali free. However, pure $SiO_2$ has a high melting point. Accordingly, if the concentration of $SiO_2$ in the glass composition is too high, the formability of the glass composition can be diminished as higher concentrations of $SiO_2$ increase the difficulty of melting the glass, which, in turn, adversely impacts the formability of the glass.

In some embodiments, the glass composition can include $SiO_2$ in an amount from 55 mol % or more to 70 mol % or less, and all ranges and subranges between the foregoing values. In some embodiments, the glass composition can include $SiO_2$ in an amount of 56 mol % or more, 57 mol % or more, 58 mol % or more, 59 mol % or more, 60 mol % or more, 61 mol % or more, 62 mol % or more, 63 mol % or more, 64 mol % or more, 65 mol % or more, 66 mol % or more, 67 mol % or more, 68 mol % or more, 69 mol % or more, or 70 mol %. In some embodiments, the glass composition can include $SiO_2$ in an amount of 69 mol % or less, 68 mol % or less, 67 mol % or less, 66 mol % or less, 65 mol % or less, 64 mol % or less, 63 mol % or less, 62 mol % or less, 61 mol % or less, 60 mol % or less, 59 mol % or less, 58 mol % or less, 57 mol % or less, 56 mol % or less, or 55 mol %.

Any of the above $SiO_2$ ranges can be combined with any other range. For example, in some embodiments, the glass composition can include $SiO_2$ in an amount of 55 mol % to 70 mol %, 56 mol % to 69 mol %, 57 mol % to 68 mol %, 58 mol % to 67 mol %, 59 mol % to 66 mol %, 60 mol % to 65 mol %, 61 mol % to 64 mol %, or 62 mol % to 63 mol %, and all ranges and sub-ranges between the foregoing values having any two of the above-listed $SiO_2$ values as endpoints, including the endpoints. In some embodiments, the glass composition can include $SiO_2$ in a range of 57 mol % to 65 mol %.

In some embodiments, the glass composition can include $Al_2O_3$. The addition of $Al_2O_3$ can serve as a glass network former. Furthermore, when the concentration of $Al_2O_3$ is balanced against the concentration of $SiO_2$ and the concentration of alkali oxides in the composition, it can reduce the liquidus temperature of the glass melt, thereby enhancing the liquidus viscosity.

In some embodiments, the glass composition can include $Al_2O_3$ in a concentration of 13 mol % or more to 20 mol % or less, and all ranges and sub-ranges between the foregoing values. In some embodiments, the glass composition can include $Al_2O_3$ in an amount of 13 mol % or more, 13.5 mol % or more, 14 mol % or more, 14.5 mol % or more, 15 mol % or more, 15.5 mol % or more, 16 mol % or more, 16.5 mol % or more, 17 mol % or more, 17.5 mol % or more, 18 mol % or more, 18.5 mol % or more, 19 mol % or more, 19.5 mol % or more, or 20 mol %. In some embodiments, the glass composition can include $Al_2O_3$ in an amount of 20 mol % or less, 19.5 mol % or less, 19 mol % or less, 18.5 mol % or less, 18 mol % or less, 17.5 mol % or less, 17 mol % or less, 16.5 mol % or less, 16 mol % or less, 15.5 mol % or less, 15 mol % or less, 14.5 mol % or less, 14 mol % or less, 13.5 mol % or less, or 13 mol %.

Any of the above $Al_2O_3$ ranges can be combined with any other range. For example, in some embodiments, the glass composition can include $Al_2O_3$ in an amount of 13 mol % to 20 mol %, 13.5 mol % to 19.5 mol %, 14 mol % to 19 mol %, 14.5 mol % to 18.5 mol %, 15 mol % to 18 mol %, 15.5 mol % to 17.5 mol %, or 16 mol % to 17 mol %, and all ranges and sub-ranges between the foregoing values having any two of the above-listed $Al_2O_3$ values as endpoints, including the endpoints. In some embodiments, the glass composition can include $Al_2O_3$ in an amount of 15 mol % to 19 mol %.

In some embodiments the glass composition can include $Na_2O$. $Na_2O$ can aid in the ion-exchangeability of the glass composition, and improve the formability, and thereby manufacturability, of the glass composition. However, if too much $Na_2O$ is added to the glass composition, the CTE may be too low, and the melting point may be too high. In some embodiments, the glass composition can include $Na_2O$ in a concentration of 1 mol % or more to 18 mol % or less, and all ranges and sub-ranges between the foregoing values having any two of the above-listed values as endpoints, including the endpoints. In some embodiments, the glass composition can include $Na_2O$ in an amount of 1 mol % or more, 2 mol % or more, 4 mol % or more, 5 mol % or more, 10 mol % or more, 15 mol % or more, or 18 mol %. In some embodiments, the glass composition can include $Na_2O$ in an amount of 18 mol % or less, 15 mol % or less, 10 mol % or less, 5 mol % or less, 4 mol % or less, 2 mol % or less, or 1 mol %.

Any of the above $Na_2O$ ranges can be combined with any other range. For example, in some embodiments, the glass composition can include $Na_2O$ in an amount from 1 mol % to 18 mol %, 1 mol % to 15 mol %, 1 mol % to 10 mol %, 1 mol % to 5 mol %, 1 mol % to 4 mol %, 1 mol % to 2 mol %, 2 mol % to 18 mol %, 4 mol % to 18 mol %, 5 mol % to 18 mol %, 10 mol % to 18 mol %, or 15 mol % to 18 mol %, and all ranges and sub-ranges between the foregoing values having any two of the above-listed $Na_2O$ values as endpoints, including the endpoints.

In some embodiments, the glass composition can include MgO. MgO can lower the viscosity of a glass, which enhances the formability and manufacturability of the glass. The inclusion of MgO in a glass composition can also improve the strain point and the Young's modulus of the glass composition as well as the ion-exchange-ability of the glass. However, if too much MgO is added to the glass composition, the density and the CTE of the glass composition may increase to undesirable levels.

In some embodiments, the glass composition can include MgO in a concentration of from 0.1 mol % or more to 5 mol % or less, and all ranges and sub-ranges between the foregoing values. In some embodiments, the glass composition can include MgO in an amount of 0.1 mol % or more, 1 mol % or more, 2 mol % or more, 3 mol % or more, 4 mol % or more, or 5 mol %. In some embodiments, the glass composition can include MgO in an amount of 5 mol % or less, 4 mol % or less, 3 mol % or less, 2 mol % or less, 1 mol % or less, or 0.1 mol %.

Any of the above MgO ranges can be combined with any other range. For example, in some embodiments, the glass composition can include MgO in an amount of 0.1 mol % to 5 mol %, 0.1 mol % to 4 mol %, 0.1 mol % to 3 mol %, 0.1 mol % to 2 mol %, 0.1 mol % to 1 mol %, 1 mol % to 5 mol %, 1 mol % to 4 mol %, 1 mol % to 3 mol %, or 1 mol % to 2 mol %, and all ranges and sub-ranges between the foregoing values having any two of the above-listed MgO values as endpoints, including the endpoints.

In some embodiments, the glass composition can include CaO. CaO can lower the viscosity of a glass, which may enhance the formability, the strain point and the Young's modulus, and may improve the ion-exchange-ability of the glass. However, if too much CaO is added to the glass composition, the density and the CTE of the glass composition may increase to undesirable levels.

In some embodiments, the glass composition can include CaO in a concentration of 0.1 mol % or more to 2 mol % or less, and all ranges and sub-ranges between the foregoing values. In some embodiments, the glass composition can include CaO in an amount of 0.1 mol % or more, 0.5 mol % or more, 1 mol % or more, 1.5 mol % or more, or 2 mol %. In some embodiments, the glass composition can include CaO in amount of 2 mol % or less, 1.5 mol % or less, 1 mol % or less, 0.5 mol % or less, or 0.1 mol %.

Any of the above ranges can be combined with any other range. For example, in some embodiments, the glass composition can include CaO in an amount of 0.1 mol % to 2 mol %, 0.1 mol % 1.5 mol %, 0.1 mol % to 1 mol %, 0.1 mol % to 0.5 mol %, 0.5 mol % to 2 mol %, 1 mol % to 2 mol %, or 1.5 mol % to 2 mol %, and all ranges and sub-ranges between the foregoing values having any two of the above-listed CaO values as endpoints, including the endpoints. In some embodiments, the glass composition can include CaO in a range of 0.1 mol % to 1 mol %. In some embodiments, the glass composition can be free of or substantially free of MgO.

In some embodiments, the glass composition can include $B_2O_3$. $B_2O_3$ can be included to improve the fracture toughness of the composition. In some embodiments, the glass composition can include $B_2O_3$ in a concentration of 0.1 mol % or more to 7 mol % or less, and all ranges and sub-ranges between the foregoing values. In some embodiments, the glass composition can include $B_2O_3$ in an amount of 0.1 mol % or more, 1 mol % or more, 2 mol % or more, 5 mol % or more, or 7 mol %. In some embodiments, the glass composition can include $B_2O_3$ in amount of 7 mol % or less, 5 mol % or less, 2 mol % or less, 1 mol % or less, or 0.1 mol %.

Any of the above ranges can be combined with any other range. For example, in some embodiments, the glass composition can include $B_2O_3$ in an amount of 0.1 mol % to 7 mol %, 0.1 mol % 5 mol %, 0.1 mol % to 2 mol %, 0.1 mol % to 1 mol %, 1 mol % to 7 mol %, 2 mol % to 7 mol %, or 5 mol % to 7 mol %, and all ranges and sub-ranges between the foregoing values having any two of the above-listed $B_2O_3$ values as endpoints, including the endpoints. In some embodiments, the glass composition can be free of or substantially free of $B_2O_3$.

In some embodiments, glass composition can include $Li_2O$. $Li_2O$ can be included in the glass composition to improve the control of the ion-exchange process and further reduce the softening point of the glass, thereby increasing the manufacturability of the glass. In some embodiments, the glass composition can include $Li_2O$ in an amount of 0.2 mol % or more. In some embodiments, the glass composition can include $Li_2O$ in an amount from greater than 8 mol % to less than or equal to 14 mol %, and all ranges and sub-ranges between the foregoing values. For example, the glass composition can include $Li_2O$ in amounts greater than or equal to 8 mol %, such as greater than or equal to 8 mol %, greater than or equal to 8.5 mol %, greater than or equal to 9 mol %, greater than or equal to 9.5 mol %, greater than or equal to 10 mol %, greater than or equal to 10.5 mol %, greater than or equal to 11 mol %, greater than or equal to 11.5 mol %, greater than or equal to 12 mol %, greater than or equal to 12.5 mol %, greater than or equal to 13 mol %, or greater than or equal to 13.5 mol %.

In some embodiments, the glass composition can include $Li_2O$ in amounts less than or equal to 14 mol %, such as less than or equal to 14 mol %, less than or equal to 13.5 mol %, less than or equal to 13 mol %, less than or equal to 12.5 mol %, less than or equal to 12 mol %, less than or equal to 11.5 mol %, less than or equal to 11 mol %, less than or equal to 10.5 mol %, less than or equal to 10 mol %, less than or equal to 9.5 mol %, less than or equal to 9 mol %, or less than or equal to 8.5 mol %.

Any of the above ranges can be combined with any other range. For example, in some embodiments, the glass composition can include $Li_2O$ in an amount from greater than or equal to 8 mol % to less than or equal to 14 mol %, such as from greater than or equal to 8.5 mol % to less than or equal to 13.5 mol %, from greater than or equal to 9 mol % to less than or equal to 13 mol %, from greater than or equal to 9.5 mol % to less than or equal to 12.5 mol %, from greater than or equal to 10 mol % to less than or equal to 12 mol %, or from greater than or equal to 10.5 mol % to less than or equal to 11.5 mol %, and all ranges and sub-ranges between the foregoing values having any two of the above-listed $Li_2O$ values as endpoints, including the endpoints. In some embodiments, the glass composition can include $Li_2O$ in an amount of 10 mol % to 12 mol %. In some embodiments, the glass composition can be free of or substantially free of $Li_2O$.

In some embodiments, the glass composition can include $K_2O$. Like $Na_2O$, $K_2O$ promotes ion-exchange and increases the DOC of a compressive stress layer. However, adding $K_2O$ can cause the CTE to be too low, and the melting point may be too high.

In some embodiments, the glass composition can include $K_2O$ in a concentration of 0.1 mol % or more to 3 mol % or less, and all ranges and sub-ranges between the foregoing values. In some embodiments, the glass composition can include $K_2O$ in an amount of 0.1 mol % or more, 0.5 mol % or more, 1 mol % or more, 2 mol % or more, or 3 mol %. In some embodiments, the glass composition can include $K_2O$ in amount of 3 mol % or less, 2 mol % or less, 1 mol % or less, 0.5 mol % or less, or 0.1 mol %.

Any of the above ranges can be combined with any other range. For example, in some embodiments, the glass composition can include $K_2O$ in an amount of 0.1 mol % to 3 mol %, 0.1 mol % 2 mol %, 0.1 mol % to 1 mol %, 0.1 mol % to 0.5 mol %, 0.5 mol % to 3 mol %, 1 mol % to 3 mol %, or 2 mol % to 3 mol %, and all ranges and sub-ranges between the foregoing values having any two of the above-listed $K_2O$ values as endpoints, including the endpoints. In some embodiments, the glass composition can be free of or substantially free of $K_2O$.

In some embodiments, the glass composition can include $P_2O_5$. The inclusion of $P_2O_5$ in the glass composition can enhance the speed of an ion-exchange process, such as by decreasing the ion-exchange treatment time required to produce a desired compressive stress or depth of compression. In some embodiments, the glass composition can include $P_2O_5$ in a concentration of 0.1 mol % or more to 6 mol % or less, and all ranges and sub-ranges between the foregoing values. In some embodiments, the glass composition can include $P_2O_5$ in an amount of 0.1 mol % or more, 1 mol % or more, 2 mol % or more, 5 mol % or more, or 6 mol %. In some embodiments, the glass composition can include $P_2O_5$ in amount of 6 mol % or less, 5 mol % or less, 2 mol % or less, 1 mol % or less, or 0.1 mol %.

Any of the above ranges can be combined with any other range. For example, in some embodiments, the glass composition can include $P_2O_5$ in an amount of 0.1 mol % to 6 mol %, 0.1 mol % 5 mol %, 0.1 mol % to 2 mol %, 0.1 mol % to 1 mol %, 1 mol % to 6 mol %, 2 mol % to 6 mol %, or 5 mol % to 6 mol %, and all ranges and sub-ranges between the foregoing values having any two of the above-listed $P_2O_5$ values as endpoints, including the endpoints. In some embodiments, the glass composition $P_2O_5$ in an amount of 5 mol % to 6 mol %. In some embodiments, the glass composition can be free of or substantially free of $P_2O_5$.

In some embodiments, the glass composition can include one or more fining agents. In some embodiments, the fining agents can include, for example, $SnO_2$. In such embodiments, $SnO_2$ can be present in the glass composition in an amount less than or equal to 2 mol %, such as from greater than 0.1 mol % to less than or equal to 2 mol %, and all ranges and sub-ranges between the foregoing values. In some embodiments, $SnO_2$ can be present in the glass composition in an amount from greater than 0.1 mol % to less than or equal to 1.5 mol %, or greater than or equal to 0.1 mol % to less than or equal to 1 mol %, and all ranges and sub-ranges between the foregoing values. In some embodiments, the glass composition can be free of or substantially free of $SnO_2$.

In some embodiments, the fining agents can include, for example $Fe_2O_3$. In such embodiments, $Fe_2O_3$ can be present in the glass composition in an amount less than or equal to 0.1 mol %, such as from greater than 0 mol % to less than or equal to 0.1 mol %. In some embodiments, the glass composition can be free of or substantially free of $Fe_2O_3$.

In some embodiments, the glass composition can be substantially free or free of SrO. In some embodiments, the glass composition can be substantially free or free of $ZrO_2$.

From the above compositions, glass articles according to embodiments can be formed by any suitable method, for example slot forming, float forming, rolling processes, fusion forming processes, etc. The glass composition and the articles produced therefrom can be characterized by the manner in which it may be formed. For instance, the glass composition can be characterized as float-formable (i.e., formed by a float process), down-drawable and, in particular, fusion-formable or slot-drawable (for example, formed by a down draw process, for example a fusion draw process or a slot draw process).

EXAMPLES

Embodiments will be further clarified by the following examples. It should be understood that these examples are not limiting to the embodiments described above. Glass compositions having components listed in Table 1 below were prepared by conventional glass forming methods. In Table 1, all oxide amounts are in mol %.

TABLE 1

|  | Composition 1 | Composition 2 | Composition 3 | Composition 4 |
|---|---|---|---|---|
| $SiO_2$ | 57.43 | 58.17 | 58.37 | 64.12 |
| $Al_2O_3$ | 16.10 | 15.32 | 17.82 | 18.36 |
| $B_2O_3$ | 0.00 | 0.00 | 6.07 | 0.29 |
| $P_2O_5$ | 6.54 | 6.55 | 0.00 | 0.00 |
| $Li_2O$ | 0.00 | 0.00 | 10.70 | 12.05 |
| $Na_2O$ | 17.05 | 16.51 | 1.73 | 4.81 |
| $K_2O$ | 0.00 | 2.28 | 0.20 | 0.12 |
| MgO | 2.81 | 1.07 | 4.43 | 0.19 |
| CaO | 0.00 | 0.00 | 0.57 | 0.00 |
| SrO | 0.00 | 0.00 | 0.00 | 0.00 |
| $ZrO_2$ | 0.00 | 0.00 | 0.00 | 0.00 |
| $SnO_2$ | 0.07 | 0.10 | 0.09 | 0.03 |
| $Fe_2O_3$ | 0.00 | 0.00 | 0.02 | 0.03 |

Example 1

Figure 16:
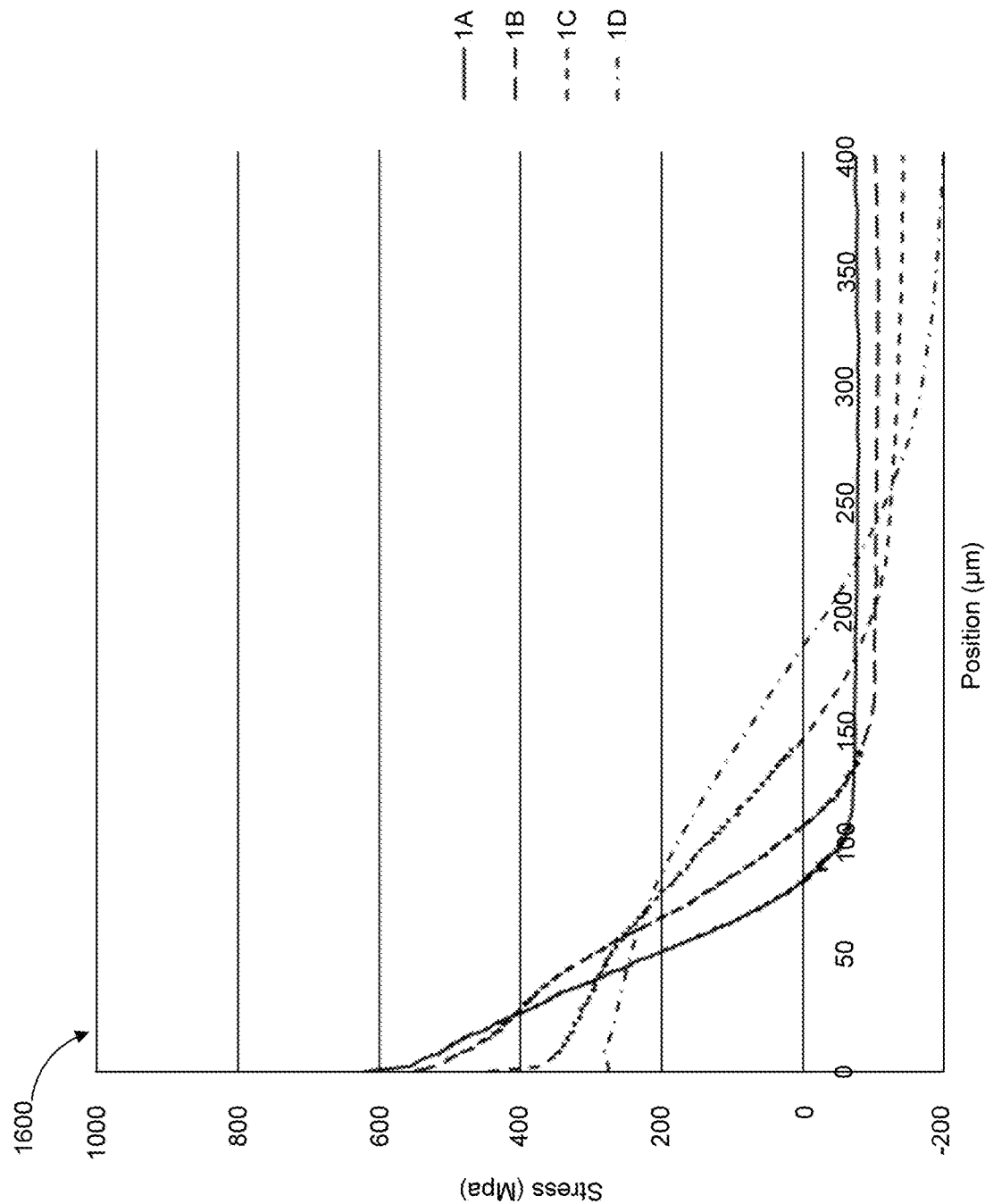
FIG. 16 is a graph of stress profiles for various glass articles made from Composition #1.

Four 2 inch by 2 inch glass articles made from Composition #1 and having a thickness of 0.8 mm were tested according to the "Glass Fracture Test." Graph 1600 in FIG. 16 shows the stress profiles for the four glass articles. The stress profiles in the four glass articles were created with an ion-exchange process. Each glass article was immersed in a salt bath composed of 100 wt % potassium nitrate salt at 500° C. The first glass article ("1A") was immersed in the salt bath for 2 hours. The second glass article ("1B") was immersed in the salt bath for 4 hours. The third glass article ("1C") was immersed in the salt bath for 9 hours. The fourth glass article ("1D") was immersed in the salt bath for 16 hours. A silica acid concentration of about 0.5 wt % in the bath was maintained during ion-exchange.

Measurement of the stress profiles shown in graph 1600 was done with a refractive near filed instrument (RNF). The RNF instrument can be inaccurate over the first two microns of the glass article's depth. So the stress at the surface of the glass article was measured with a FSM-6000 LE instrument from Orihara Industrial Co., Ltd., and extrapolated from the rest of the curve measured by RNF. The stress at the middle of the articles, the CT, was measured with a scattering polarimeter SCALP-05 from GlassStress Ltd. The stress profiles matched the CT of the SCALP instrument at the center of the glass articles. Graph 1600 shows that stress relaxation increases at longer ion-exchange times for Articles 1A-1D. This stress relaxation led to different curvatures in the stress profiles.

Measured stress parameters for the glass articles are reported in Table 2. Measured and calculated energy parameters for the glass articles are reported in Table 3.

TABLE 2

| Article No. | CS (MPa) | CT (MPa) | DOC (μm) |
| --- | --- | --- | --- |
| 1A | 621 | 77 | 83 |
| 1B | 551 | 104 | 107 |
| 1C | 445 | 150 | 145 |
| 1D | 277 | 202 | 185 |

TABLE 3

| Art. | E (GPa) | v | $W_{el}^{tens}$ (J/m$^2$) | $W_{norm}^{tens}$ (MPa$^2$·m) | $WT_{norm}^{tens}$ (MPa$^2$·m$^{0.5}$) | $W_{el}^{comp}$ (J/m$^2$) | $W_{norm}^{comp}$ (MPa$^2$·m) | $WT_{norm}^{comp}$ (MPa$^2$·m$^{0.5}$) | $W_{el}^{comp}$ − $W_{el}^{tens}$ (J/m$^2$) | $W_{el}^{comp}$ + $W_{el}^{tens}$ (J/m$^2$) | ($W_{el}^{comp}$ − $W_{el}^{tens}$)/($W_{el}^{comp}$ + $W_{el}^{tens}$) |
| --- | --- | --- | --- | --- | --- | --- | --- | --- | --- | --- | --- |
| 1A | 65 | 0.215 | 41.68 | 3.45 | 122.03 | 209.52 | 17.34 | 613.4 | 167.84 | 251.2 | 0.668153 |
| 1B | 65 | 0.215 | 69.39 | 5.75 | 203.14 | 241.47 | 19.99 | 706.9 | 172.08 | 310.86 | 0.553561 |
| 1C | 65 | 0.215 | 88.59 | 7.33 | 259.37 | 181.22 | 15 | 530.52 | 92.63 | 269.81 | 0.343316 |
| 1D | 65 | 0.215 | 119.36 | 9.88 | 349.42 | 163.23 | 13.51 | 477.86 | 43.87 | 282.59 | 0.155243 |

All of Articles 1A-1D were highly frangible, including Article 1A, which had a complementary error-function like profile and a CT of about 77 MPa. Such CT values would be borderline frangible if the stress profile were parabolic, but in the case of an error-function like stress profile such values lead to a highly frangible glass as the DOC is about 0.10t.

During the "Glass Fracture Test," images of each Article 1A-1D were taken with a PHANTOM® v2511 high-speed camera a 0.026 ms (milliseconds), 0.13 ms, and 0.26 ms after impact. Each Article 1A-1D exhibited significant particle ejection in the high-speed camera images. Counterintuitively, articles with higher CT and longer diffusion times did not necessarily have significantly more particle ejection. Actually, the opposite trend was observed. The amount of glass particle ejection observed tracked the Differential Elastic Energy ($W_{el}^{comp}$−$W_{el}^{tens}$), with lesser amounts of glass particle ejection observed for lower Differential Elastic Energy values. This trend is opposite the trends in CT and $W_{el}^{tens}$. The data also shows that the energy in compression $W_{el}^{comp}$ seems to follow a similar trend to Differential Elastic Energy, in this particular case.

Figure 17B:
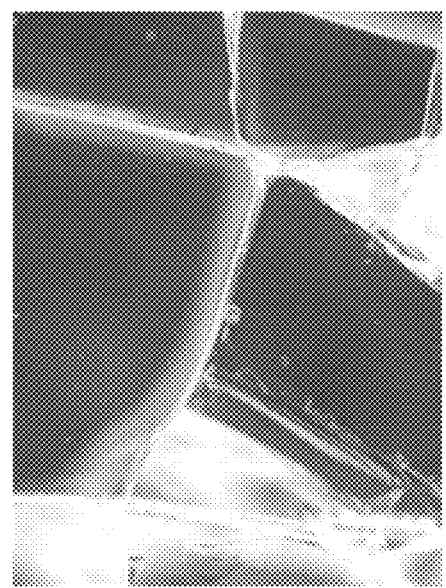
FIGS. 17A and 17B are microscope images of the fracture pattern for a glass article made from Composition #1 and having a first stress profile.
Figure 17A:
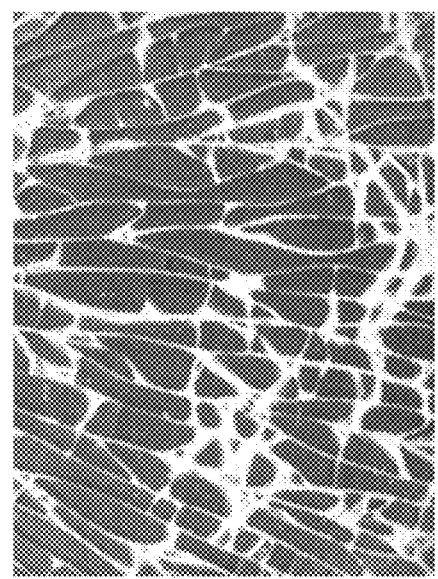
Figure 18B:
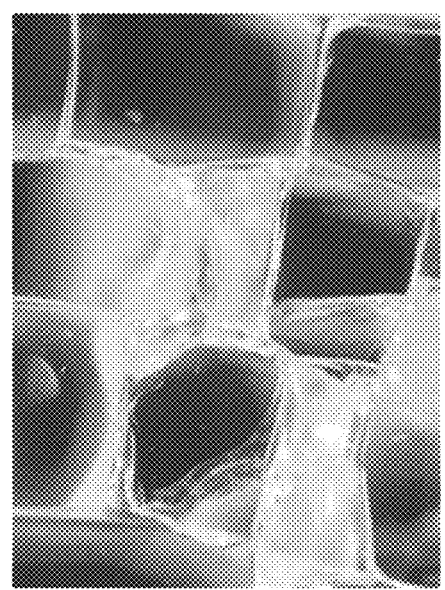
FIGS. 18A and 18B are microscope images of the fracture pattern for a glass article made from Composition #1 and having a second stress profile.
Figure 18A:
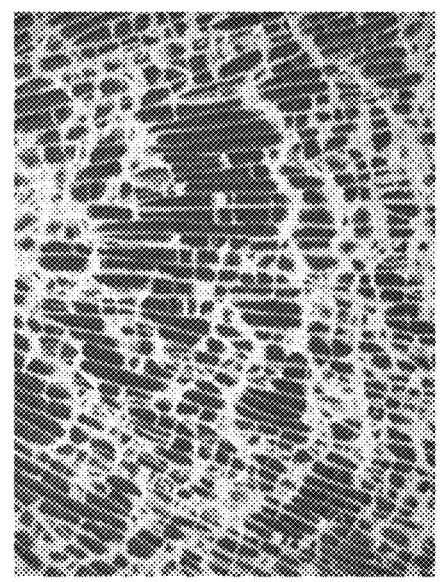
Figure 19B:
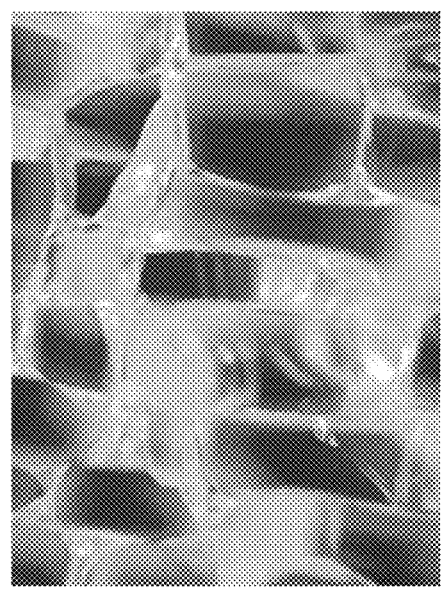
FIGS. 19A and 19B are microscope images of the fracture pattern for a glass article made from Composition #1 and having a third stress profile.
Figure 19A:
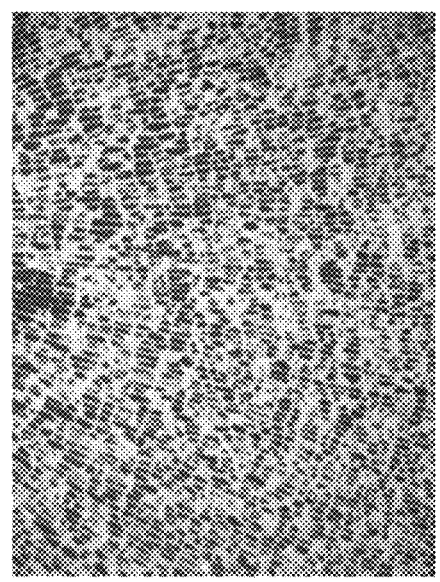
Figure 20B:
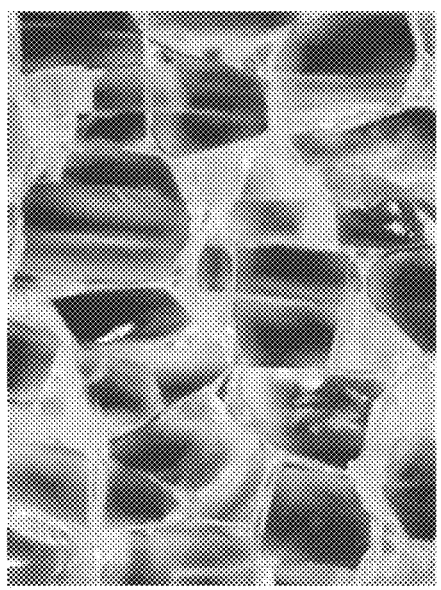
FIGS. 20A and 20B are microscope images of the fracture pattern for a glass article made from Composition #1 and having a fourth stress profile.
Figure 20A:
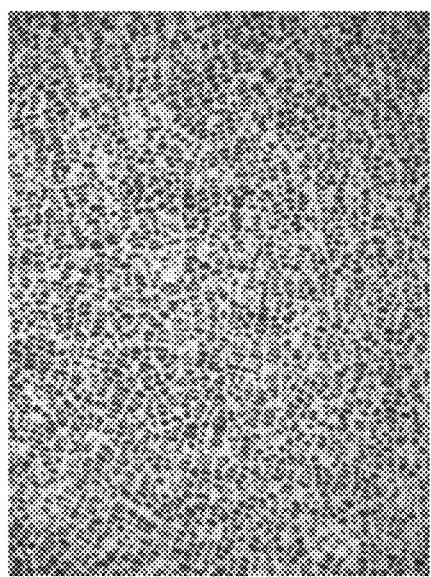

Images 1700 and 1750 in FIGS. 17A and 17B show 20× and 200× microscope images of Article 1A after being fractured according to the "Glass Fracture Test." Images 1800 and 1850 in FIGS. 18A and 18B show 20× and 200× microscope images of Article 1B after being fractured according to the "Glass Fracture Test." Images 1900 and 1950 in FIGS. 19A and 19B show 20× and 200× microscope images of Article 1C after being fractured according to the "Glass Fracture Test." Images 2000 and 2050 in FIGS. 20A and 20B show 20× and 200× microscope images of Article 1D after being fractured according to the "Glass Fracture Test." These microscope images were taken using a VHX-6000 digital microscope made by Keyence. All of Articles 1A-1D exhibited non-columnar (random) fracture patterns. The non-columnar (random) fracture patterns are apparent from the large amount of white area in the images, which indicates angular fracture planes and fragments having a thickness less than the thickness of the glass article.

These fracture patterns are consistent with high-speed camera image results, indicating that all of Articles 1A-1D ejected a significant amount of glass particles. As shown in Table 3, each of Articles 1A-1D had a Differential Elastic Energy ($W_{el}^{comp}$−$W_{el}^{tens}$) well above 25 J/m$^2$.

Example 2

Figure 21:
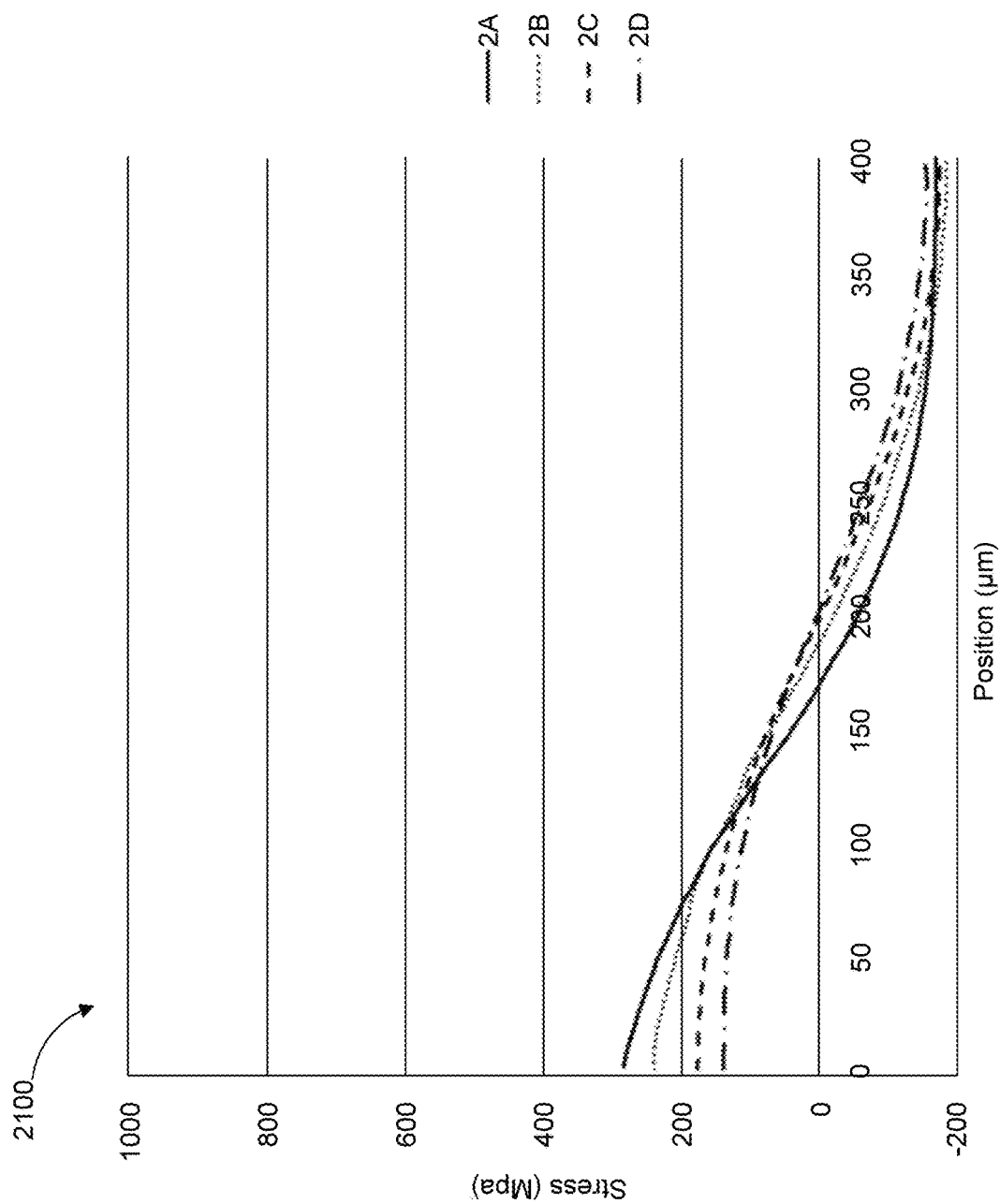
FIG. 21 is a graph of stress profiles for various glass articles made from Composition #2.

Four 2 inch by 2 inch glass articles made from Composition #2 and having a thickness of 0.8 mm were tested according to the "Glass Fracture Test." Graph 2100 in FIG. 21 shows the stress profiles for the four glass articles. The stress profiles in the four glass articles were created with an ion-exchange process. Each glass article was immersed in a salt bath composed of 100 wt % potassium nitrate salt at 500° C. The first glass article ("2A") was immersed in the salt bath for 6 hours. The second glass article ("2B") was immersed in the salt bath for 9 hours. The third glass article ("2C") was immersed in the salt bath for 12 hours. The fourth glass article ("2D") was immersed in the salt bath for 15 hours. A silica acid concentration of about 0.5 wt % in the bath was maintained during ion-exchange.

Measurement of the stress profiles in graph 2100 was done using the same methods as described above for Example 1. Measured stress parameters for the glass articles are reported in Table 4. Measured and calculated energy parameters for the glass articles are reported in Table 5. The data shows a stress relaxation increase for longer ion-exchange times, which was similar for Example 1. But, at similar times and temperature, the stress profiles for Example 2 are deeper and different from Example 1.

TABLE 4

| Article No. | CS (MPa) | CT (MPa) | DOC (μm) |
| --- | --- | --- | --- |
| 2A | 286 | 169.23 | 168.7 |
| 2B | 241 | 182 | 190 |

TABLE 4-continued

| Article No. | CS (MPa) | CT (MPa) | DOC (μm) |
|---|---|---|---|
| 2C | 177 | 174.24 | 198.3 |
| 2D | 139 | 155.36 | 201.5 |

TABLE 5

| Art. | E (GPa) | v | $W_{el}^{tens}$ (J/m²) | $W_{norm}^{tens}$ (MPa²·m) | $WT_{norm}^{tens}$ (MPa²·m$^{0.5}$) | $W_{el}^{comp}$ (J/m²) | $W_{norm}^{comp}$ (MPa²·m) | $WT_{norm}^{comp}$ (MPa²·m$^{0.5}$) | $W_{el}^{comp} - W_{el}^{tens}$ (J/m²) | $W_{el}^{comp} - W_{el}^{tens} +$ $W_{el}^{tens}$ (J/m²) | $(W_{el}^{comp} - W_{el}^{tens})/$ $(W_{el}^{comp} + W_{el}^{tens})$ |
|---|---|---|---|---|---|---|---|---|---|---|---|
| 2A | 65 | 0.22 | 99.82 | 8.32 | 294.1 | 140.32 | 11.7 | 413.40 | 40.49 | 240.14 | 0.168626 |
| 2B | 65 | 0.22 | 92.75 | 7.72 | 273.27 | 121.02 | 10.08 | 356.57 | 28.27 | 213.77 | 0.132245 |
| 2C | 65 | 0.22 | 77.59 | 6.47 | 228.61 | 78.78 | 6.56 | 232.09 | 1.18 | 156.37 | 0.007539 |
| 2D | 65 | 0.22 | 60.07 | 5.01 | 177.0 | 53.04 | 4.42 | 156.26 | −7.04 | 113.11 | −0.06221 |

All of Articles 2A-2D were frangible and all had high CT values in the 155-182 MPa range. During the "Glass Fracture Test," images of Articles 2A-2D were taken with a high-speed camera a 0.026 ms (milliseconds), 0.13 ms, and 0.26 ms after impact, using the same camera as used in Example 1. The images showed a change in glass particle ejection with increasing ion-exchange time. As the ion-exchange time increased, the amount of glass particle ejection for Articles 2A-2D decreased. Articles 2A and 2B showed some glass particle ejection. However, glass particle ejection vanished for Articles 2C and 2D.

As in Example 1, this decrease in glass particle ejection tracked the Differential Elastic Energy ($W_{el}^{comp}-W_{el}^{tens}$). As the Differential Elastic Energy ($W_{el}^{comp}-W_{el}^{tens}$) decreased, so did the amount of glass particle ejection. The data shows that the elastic compressive energy $W_{el}^{comp}$ followed the same trend as Example 1. However, like Example 1, these values should have led to particle ejection. The elastic tensile energy $W_{el}^{tens}$ decreased as ion-exchange time increased, which was opposite the trend seen for Example 1. The results show that a change in behavior from particle ejection to non-particle ejection for the same glass composition can be based on different stress profiles achieved by ion-exchanging at different durations.

Figure 22B:
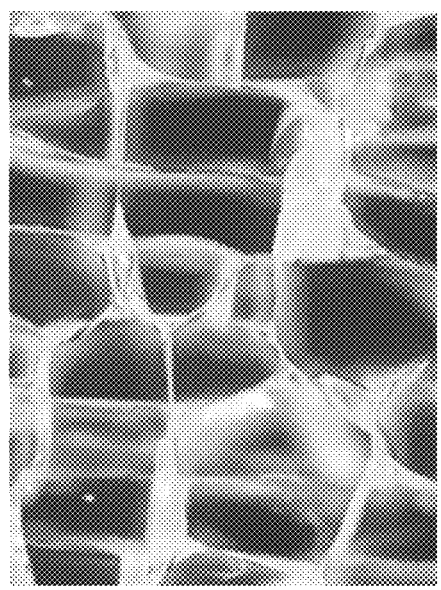
FIGS. 22A and 22B are microscope images of the fracture pattern for a glass article made from Composition #2 and having a first stress profile.
Figure 22A:
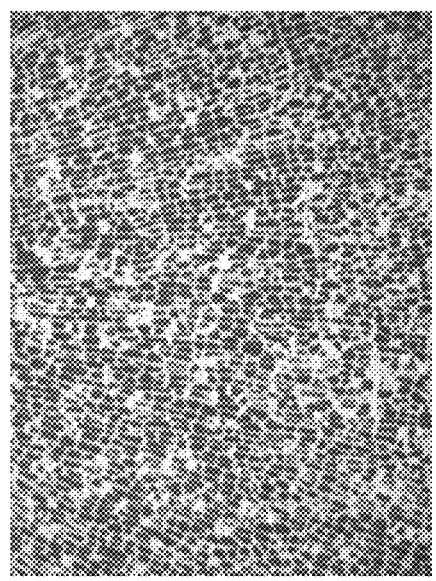
Figure 23B:
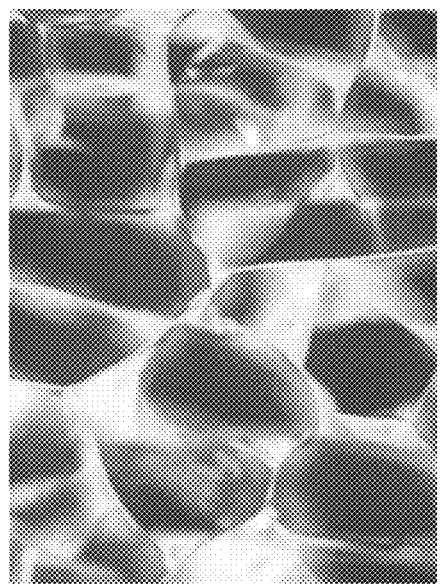
FIGS. 23A and 23B are microscope images of the fracture pattern for a glass article made from Composition #2 and having a second stress profile.
Figure 23A:
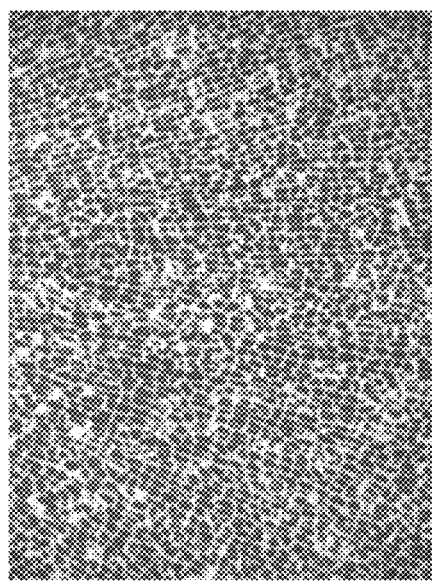
Figure 24B:
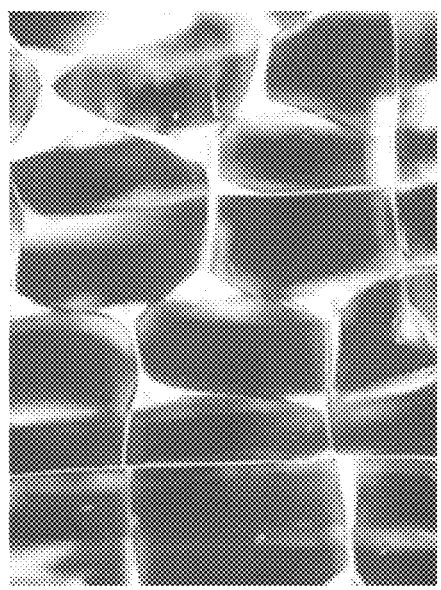
FIGS. 24A and 24B are microscope images of the fracture pattern for a glass article made from Composition #2 and having a third stress profile.
Figure 24A:
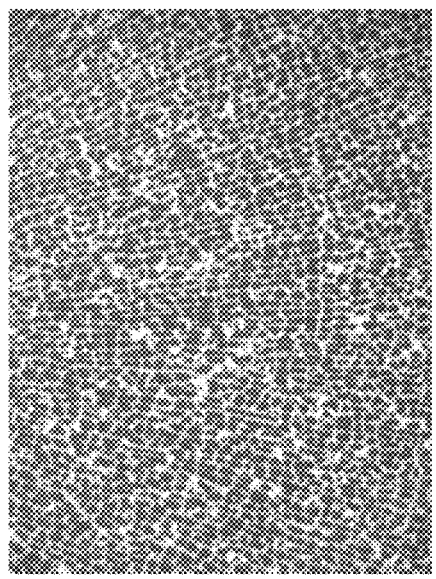
Figure 25B:
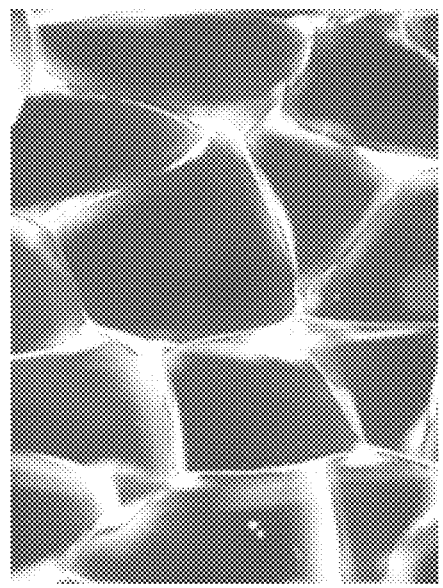
FIGS. 25A and 25B are microscope images of the fracture pattern for a glass article made from Composition #2 and having a fourth stress profile.
Figure 25A:
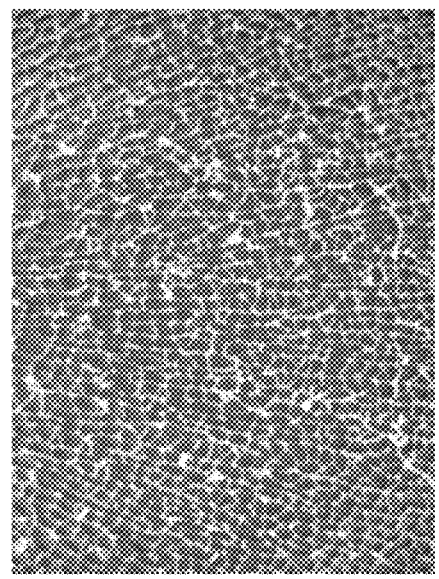

Images 2200 and 2250 in FIGS. 22A and 22B show 20× and 200× microscope images of Article 2A after being fractured according to the "Glass Fracture Test." Images 2300 and 2350 in FIGS. 23A and 23B show 20× and 200× microscope images of Article 2B after being fractured according to the "Glass Fracture Test." Images 2400 and 2450 in FIGS. 24A and 24B show 20× and 200× microscope images of Article 2C after being fractured according to the "Glass Fracture Test." Images 2500 and 2550 in FIGS. 25A and 25B show 20× and 200× microscope images of Article 2D after being fractured according to the "Glass Fracture Test." These microscope images were taken using a VHX-6000 digital microscope made by Keyence.

Articles 2A and 2B exhibited non-columnar (random) fracture patterns. However, Articles 2C and 2D exhibited quasi-columnar fracture patterns. The degree of non-columnar (random) fracture pattern is apparent from the large amount of white area in the images, which indicates angular fracture planes and fragments having a thickness less than the thickness of the glass article. The transition from a non-columnar to a quasi-columnar fracture pattern explains the change in glass particle ejection behavior observed in the high-speed camera images.

It can be seen that for both Example 1 and Example 2, the stress profiles do not present a spike region that could be the cause of the change in behavior. Different stress profiles can have similar or different energies and energy balances with or without a spike present.

Based on the results of Example 1 and Example 2, it appears that the Differential Elastic Energy ($W_{el}^{comp}-W_{el}^{tens}$) of a frangible glass article tracks the article's glass particle ejection behavior. Articles 2A and 2B had a Differential Elastic Energy of above 25 J/m². Articles 2C and 2D had a Differential Elastic Energy of below 25 J/m², and even below 20 J/m². Article 2D had a Differential Elastic Energy of less than 0 J/m².

Example 3

Figure 26:
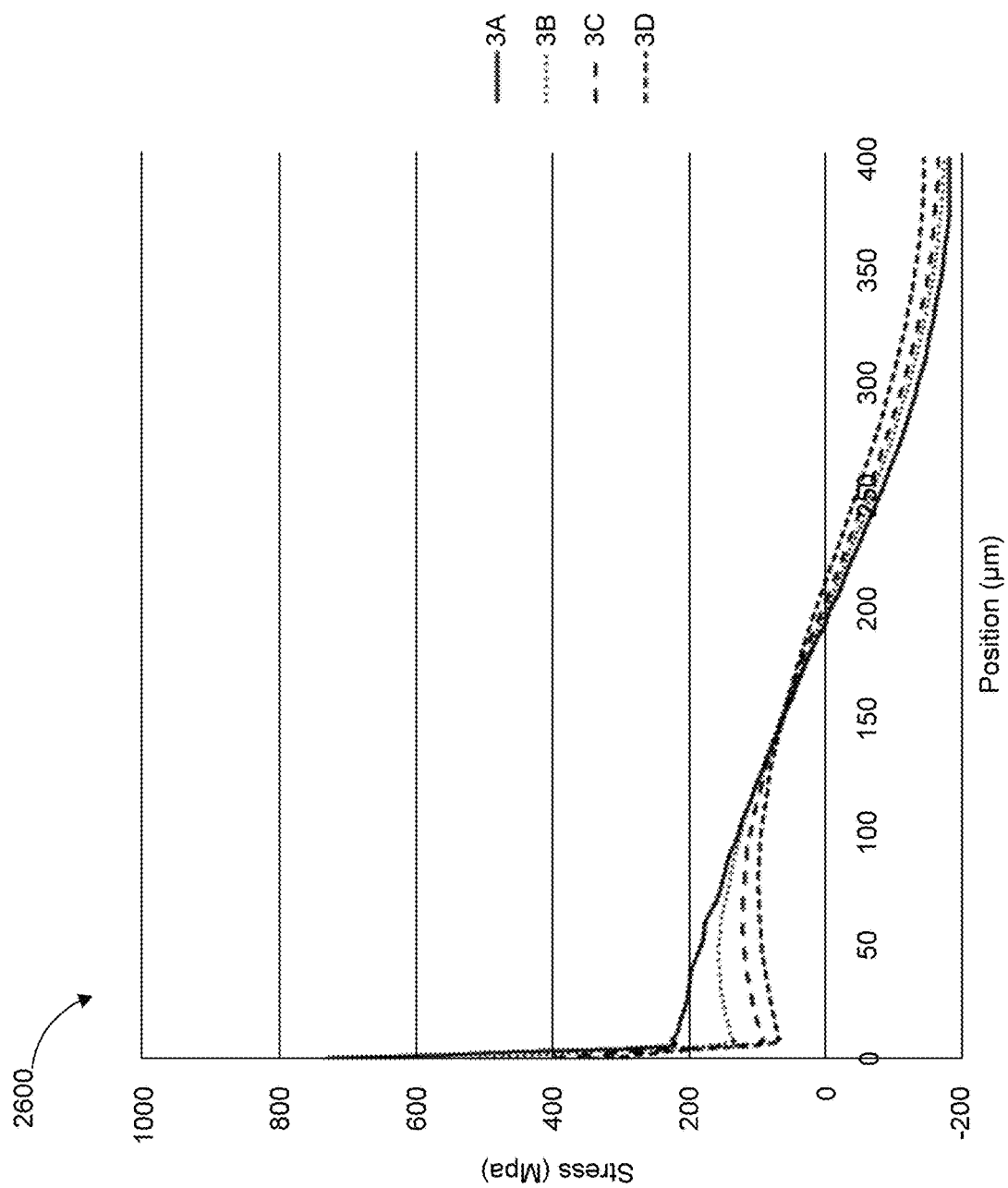
FIG. 26 is a graph of stress profiles for various glass articles made from Composition #3.

Four 2 inch by 2 inch glass articles made from Composition #3 and having a thickness of 0.8 mm were tested according to the "Glass Fracture Test." Graph 2600 in FIG. 26 shows the stress profiles for the four glass articles. The stress profiles in the four glass articles were created with a two-step ion-exchange process. First, each glass article was immersed in a salt bath composed of 50 wt % potassium nitrate salt and 50 wt % sodium nitrate salt at 450° C. for 10 hours. Second, each glass article was immersed in a salt bath composed of 90 wt % potassium nitrate salt and 10 wt % sodium nitrate salt at 450° C. for 2 hours. A silica acid concentration of about 0.5 wt % in the baths was maintained during ion-exchange.

Then, three of the four articles were annealed in an oven at a temperature of 450° C. The first glass article ("3A") as not annealed. The second glass article ("3B") was annealed for 1 hour. The third glass article ("3C") was annealed for 2 hours. The fourth glass article ("3D") was annealed for 4 hours.

Measurement of the stress profiles in graph 2600 was done using the same methods as described above for Example 1. Measured stress parameters for the glass articles are reported in Table 6. DOLk is the depth within the glass article at which the compressive stress spike at the surface of the glass article begins and CSk is the compressive stress at the DOLk. DOLk and CSk are measured using FSM and RNF. Measured and calculated energy parameters for the glass articles are reported in Table 7.

TABLE 6

| Article No. | CS (MPa) | CSk (MPa) | DOLk (μm) | CT (MPa) | DOC (μm) |
|---|---|---|---|---|---|
| 3A | 731 | 224 | 4.8 | 178 | 193 |
| 3B | 517 | 150 | 5.3 | 172.3 | 198 |
| 3C | 399 | 109 | 6.8 | 163.7 | 203 |
| 3D | 344 | 113 | 7.2 | 143.4 | 212 |

TABLE 7

| Art. | E (GPa) | v | $W_{el}^{tens}$ (J/m²) | $W_{norm}^{tens}$ (MPa²·m) | $WT_{norm}^{tens}$ (MPa²·m^0.5) | $W_{el}^{comp}$ (J/m²) | $W_{norm}^{comp}$ (MPa²·m) | $WT_{norm}^{comp}$ (MPa²·m^0.5) | $W_{el}^{comp} - W_{el}^{tens}$ (J/m²) | $W_{el}^{comp} + W_{el}^{tens}$ (J/m²) | $(W_{el}^{comp} - W_{el}^{tens})/(W_{el}^{comp} + W_{el}^{tens})$ |
|---|---|---|---|---|---|---|---|---|---|---|---|
| 3A | 83.2 | 0.236 | 63.99 | 6.96 | 246.37 | 79.84 | 8.69 | 307.43 | 15.85 | 143.83 | 0.11020 |
| 3B | 83.2 | 0.236 | 53.85 | 5.86 | 207.35 | 59.45 | 6.47 | 228.91 | 5.60 | 113.31 | 0.04943 |
| 3C | 83.2 | 0.236 | 47.66 | 5.19 | 183.50 | 39.97 | 4.35 | 153.91 | -7.69 | 87.63 | -0.08771 |
| 3D | 83.2 | 0.236 | 35.13 | 3.83 | 135.25 | 27.66 | 3.01 | 106.49 | -7.47 | 62.79 | -0.11896 |

All of Articles 3A-3D were frangible and all had CT values in the range of 143-178 MPa. As expected, the articles made from Composition #3, which includes both lithium and sodium, had stress profiles with a relatively deep DOC and a spike in compressive stress near the surface. Without wishing to be bound by theory, it is believed the reason for is that, in an ion-exchange bath having both potassium and sodium, the sodium will diffuse faster to create a deep tail region in the profile while the potassium will diffuse slower to create a spike near the surface.

The effect of the annealing time for Articles 3A-3D can been seen in the stress profiles of graph 2600. Increasing annealing time leads to a significant change in the curvature of the stress profile. As such, annealing can be used to control the Differential Elastic Energy ($W_{el}^{comp} - W_{el}^{tens}$) of a frangible glass article. The results show that increasing the annealing time leads to an increase in DOC and a reduction in CT and CS, but at different rates.

During the "Glass Fracture Test," images of Articles 3A-3D were taken with a high-speed camera a 0.026 ms (milliseconds), 0.13 ms, and 0.26 ms after impact, using the same camera as used in Example 1. The images showed that all four Articles 3A-3D exhibited little to no glass particle ejection.

Figure 27B:
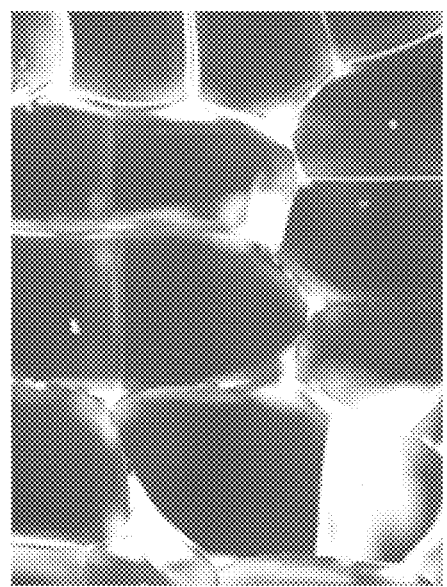
FIGS. 27A and 27B are microscope images of the fracture pattern for a glass article made from Composition #3 and having a first stress profile.
Figure 27A:
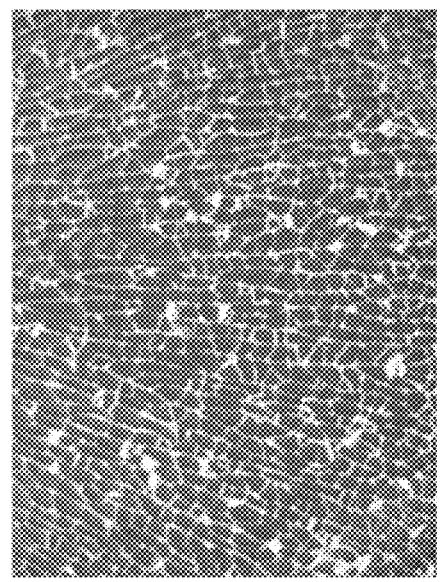
Figure 28B:
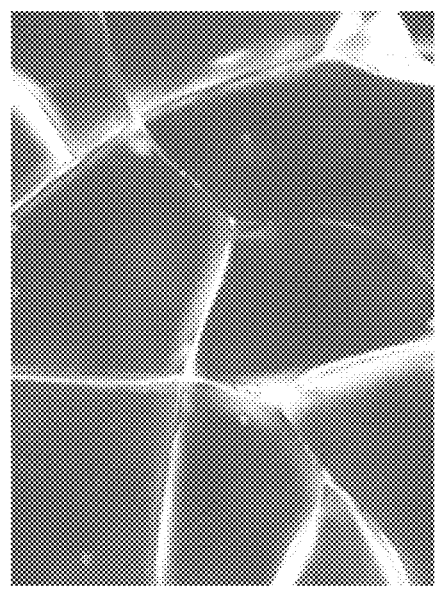
FIGS. 28A and 28B are microscope images of the fracture pattern for a glass article made from Composition #3 and having a second stress profile.
Figure 28A:
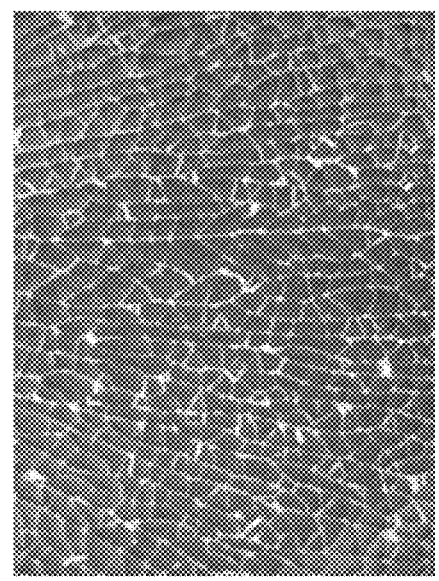
Figure 29B:
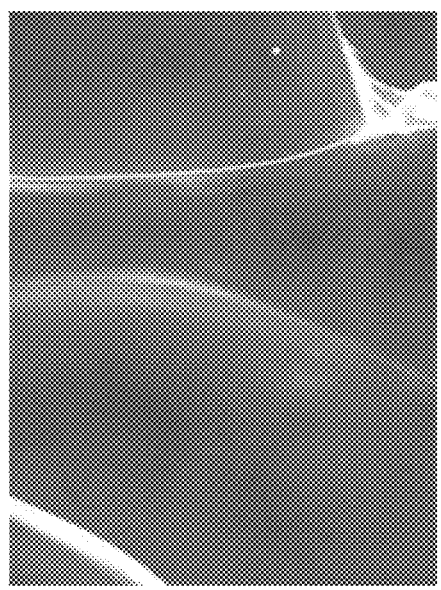
FIGS. 29A and 29B are microscope images of the fracture pattern for a glass article made from Composition #3 and having a third stress profile.
Figure 29A:
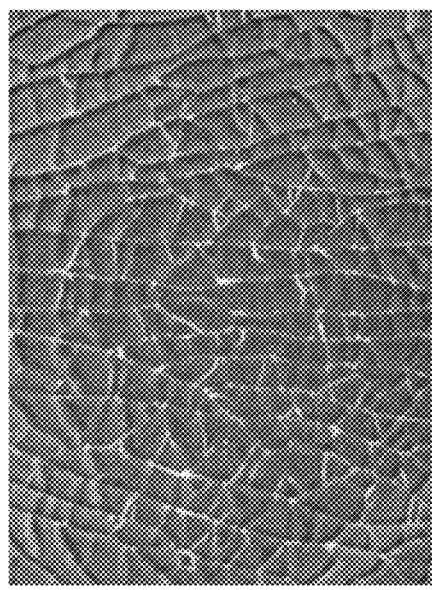
Figure 30B:
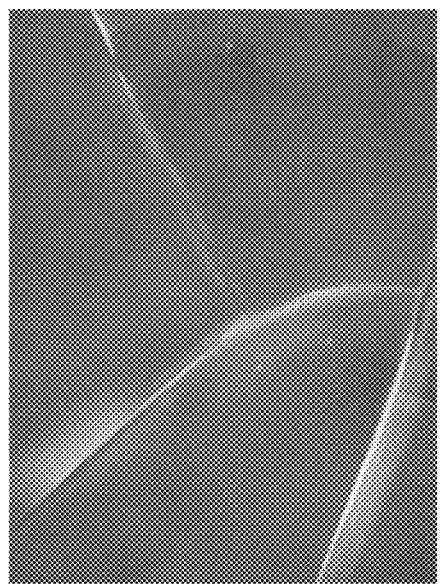
FIGS. 30A and 30B are microscope images of the fracture pattern for a glass article made from Composition #3 and having a fourth stress profile.
Figure 30A:
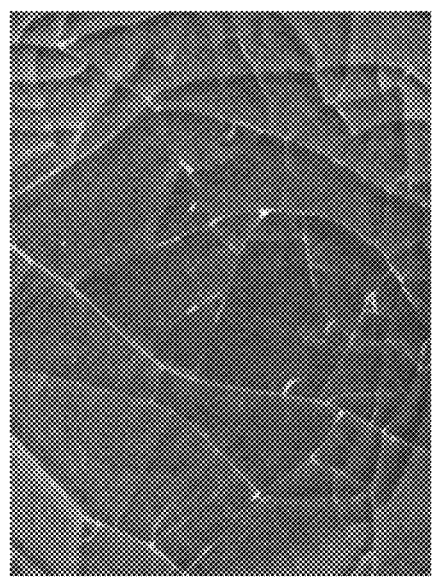

Images 2700 and 2750 in FIGS. 27A and 27B show 20× and 200× microscope images of Article 3A after being fractured according to the "Glass Fracture Test." Images 2800 and 2850 in FIGS. 28A and 28B show 20× and 200× microscope images of Article 3B after being fractured according to the "Glass Fracture Test." Images 2900 and 2950 in FIGS. 29A and 29B show 20× and 200× microscope images of Article 3C after being fractured according to the "Glass Fracture Test." Images 3000 and 3050 in FIGS. 30A and 30B show 20× and 200× microscope images of Article 3D after being fractured according to the "Glass Fracture Test." These microscope images were taken using a VHX-6000 digital microscope made by Keyence.

The microscope images show that all of Articles 3A-3D exhibited quasi-columnar or columnar fracture patterns. These fracture patterns are consistent with high-speed camera image results, indicating that all of Articles 3A-3D ejected little to no glass particles. Each article had a Differential Elastic Energy of below 25 J/m², and even below 20 J/m². Articles 3C and 3D had a Differential Elastic Energy of less than 0 J/m². Based on the results in Examples 1-3, it appears that frangible glass articles can transition non-columnar fracture to quasi-columnar fracture at a Differential Elastic Energy somewhere between 15.85 J/m² and 28.27 J/m².

Example 4

Figure 31:
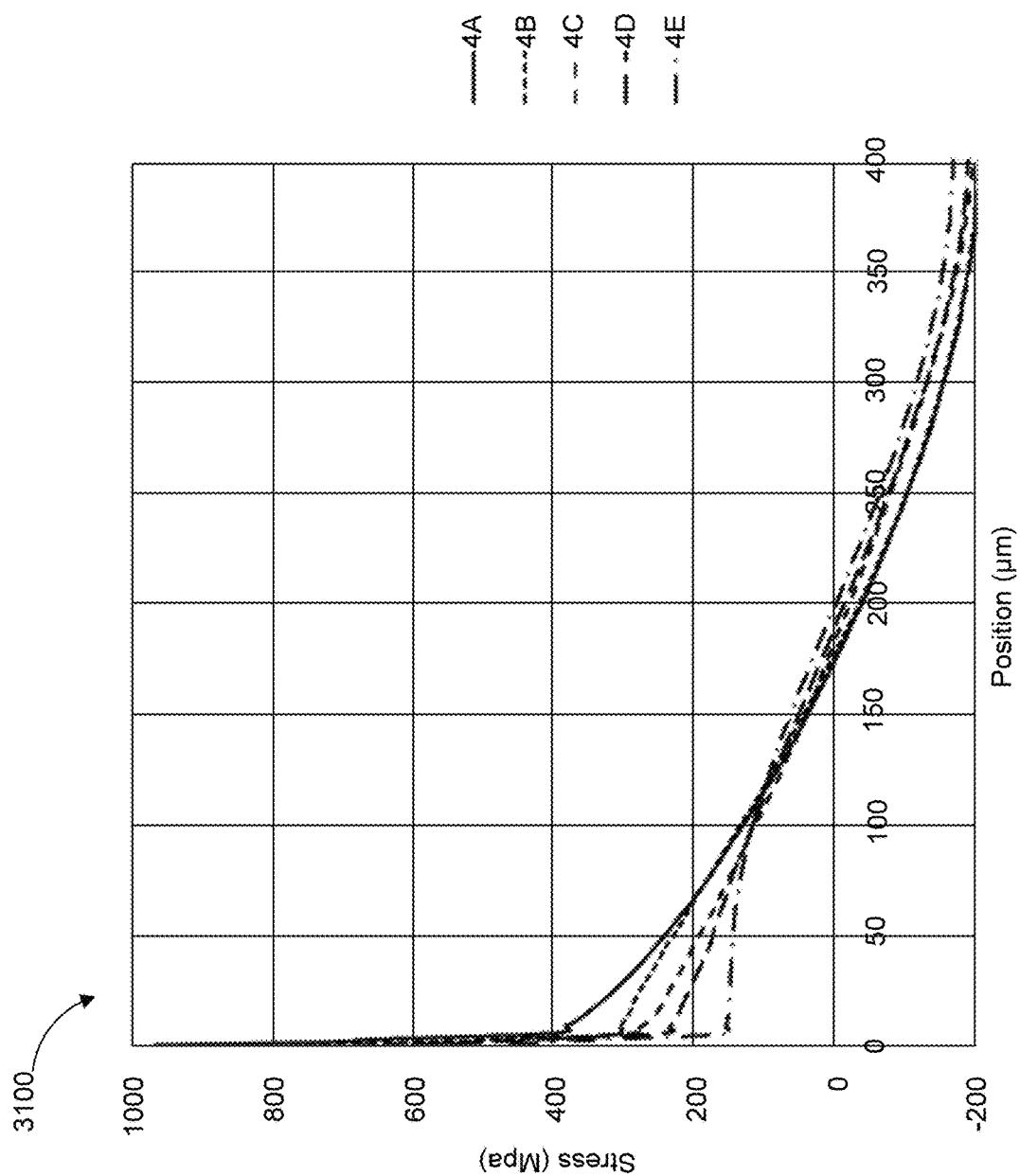
FIG. 31 is a graph of stress profiles for various glass articles made from Composition #4.

Five 2 inch by 2 inch glass articles made from Composition #4 and having a thickness of 0.8 mm were tested according to the "Glass Fracture Test." Graph 3100 in FIG. 31 shows the stress profiles for the five glass articles. The stress profiles for the five glass articles were created with a two-step ion-exchange process. First, each glass article was immersed in a salt bath composed of 50 wt % potassium nitrate salt and 50 wt % sodium nitrate salt at 400° C. for 4 hours. Second, each glass article was immersed in a salt bath composed of 90 wt % potassium nitrate salt and 10 wt % sodium nitrate salt at 400° C. for 30 minutes. A silica acid concentration of about 0.5 wt % in the baths was maintained during ion-exchange.

Then, four out of the five glass articles were annealed in an oven at a temperature of 400° C. The first glass article ("4A") was not annealed. The second glass article ("4B") was annealed for 30 minutes. The third glass article ("4C") was annealed for 1 hour. The fourth glass article ("4D") was annealed for 1.5 hours. The fifth glass article ("4E") was annealed for 2 hours.

Measurement of the stress profiles in graph 3100 was done using the same methods as described above for Examples 1 and 3. Measured stress parameters for the glass articles are reported in Table 8. Measured and calculated energy parameters for the glass articles are reported in Table 9.

TABLE 8

| Article No. | CS (MPa) | CSk (MPa) | DOLk (μm) | CT (MPa) | DOC (μm) |
|---|---|---|---|---|---|
| 4A | 973 | 387 | 3.9 | 205 | 174 |
| 4B | 778 | 317 | 3.8 | 204.3 | 177 |
| 4C | 679 | 274 | 4.0 | 197.6 | 183 |
| 4D | 607 | 231 | 4..3 | 189.8 | 189 |
| 4E | 464 | 148 | 4.7 | 167.8 | 199 |

TABLE 9

| Art. | E (GPa) | v | $W_{el}^{tens}$ (J/m²) | $W_{norm}^{tens}$ (MPa²·m) | $WT_{norm}^{tens}$ (MPa²·m^0.5) | $W_{el}^{comp}$ (J/m²) | $W_{norm}^{comp}$ (MPa²·m) | $WT_{norm}^{comp}$ (MPa²·m^0.5) | $W_{el}^{comp} - W_{el}^{tens}$ (J/m²) | $W_{el}^{comp} + W_{el}^{tens}$ (J/m²) | $(W_{el}^{comp} - W_{el}^{tens})/(W_{el}^{comp} + W_{el}^{tens})$ |
|---|---|---|---|---|---|---|---|---|---|---|---|
| 4A | 84.3 | 0.22 | 86.57 | 9.35 | 330.82 | 145.87 | 15.76 | 557.39 | 59.30 | 232.44 | 0.2551196 |
| 4B | 84.3 | 0.22 | 84.60 | 9.14 | 323.27 | 124.37 | 13.44 | 475.24 | 39.77 | 208.97 | 0.19032 |
| 4C | 84.3 | 0.22 | 67.58 | 7.30 | 258.23 | 93.29 | 10.08 | 356.47 | 25.71 | 160.87 | 0.15982 |

TABLE 9-continued

| Art. | E (GPa) | v | $W_{el}^{tens}$ (J/m²) | $W_{norm}^{tens}$ (MPa²·m) | $WT_{norm}^{tens}$ (MPa²·m^{0.5}) | $W_{el}^{comp}$ (J/m²) | $W_{norm}^{comp}$ (MPa²·m) | $WT_{norm}^{comp}$ (MPa²·m^{0.5}) | $W_{el}^{comp} - W_{el}^{tens}$ (J/m²) | $W_{el}^{comp} + W_{el}^{tens}$ (J/m²) | $(W_{el}^{comp} - W_{el}^{tens})/(W_{el}^{comp} + W_{el}^{tens})$ |
|---|---|---|---|---|---|---|---|---|---|---|---|
| 4D | 84.3 | 0.22 | 64.41 | 6.96 | 246.13 | 79.17 | 8.56 | 302.51 | 14.76 | 143.58 | 0.10276 |
| 4E | 84.3 | 0.22 | 50.96 | 5.51 | 194.72 | 54.50 | 5.89 | 208.25 | 3.54 | 105.46 | 0.03358 |

All of Articles 4A-4E were frangible and all had CT values in the range of 167-205 MPa. Similar to Articles 3A-3D in Example 3, Articles 4A-4E have stress profiles with a relatively deep DOC and a spike in compressive stress near the surface.

The effect of the annealing time for Articles 4A-4E can been seen in the stress profiles of graph 3100. Increasing annealing time leads to a significant change in the curvature of the stress profile. An increase in annealing time increased DOC and reduced CT and CS. As such, like Example 3, Example 4 shows that annealing can be used to control the Differential Elastic Energy ($W_{el}^{comp} - W_{el}^{tens}$) of a frangible glass article. However, the values for Differential Elastic Energy calculated for Articles 4A-4E are different from those for Articles 3A-3D.

During the "Glass Fracture Test," images of Articles 4A-4E were taken with a high-speed camera a 0.026 ms (milliseconds), 0.13 ms, and 0.26 ms after impact, using the same camera as used in Example 1. The images showed a change in glass particle ejection with increased anneal time. Article 4A exhibit a significant amount of glass particle ejection. But with the increasing anneal time for Articles 4B-4E, the amount of glass particle ejection decreased and eventually vanished for Article 4D (annealing time of 1.5 hours). Article 4E also did not eject glass particles.

Figure 32B:
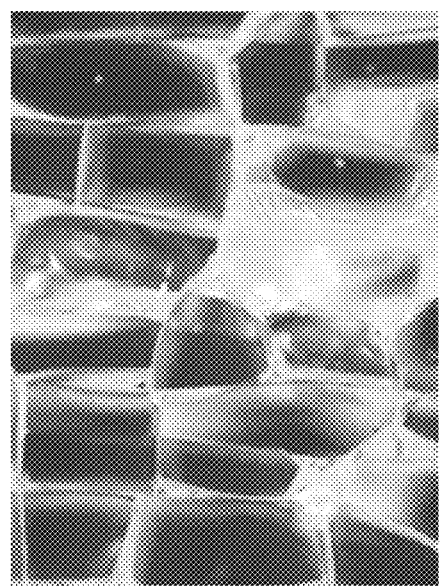
FIGS. 32A and 32B are microscope images of the fracture pattern for a glass article made from Composition #4 and having a first stress profile.
Figure 32A:
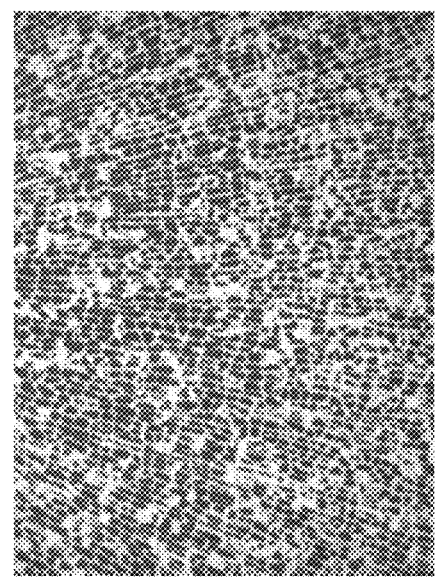
Figure 33B:
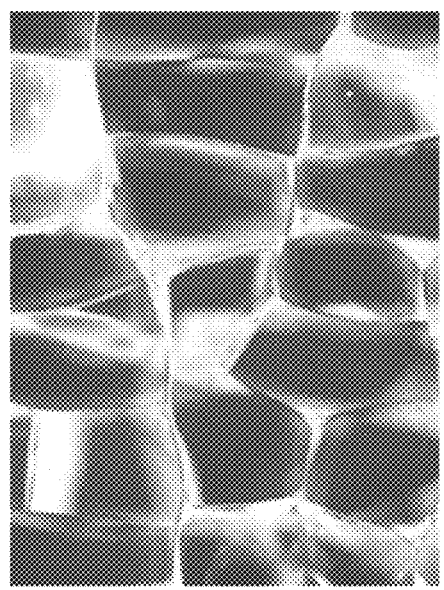
FIGS. 33A and 33B are microscope images of the fracture pattern for a glass article made from Composition #4 and having a second stress profile.
Figure 33A:
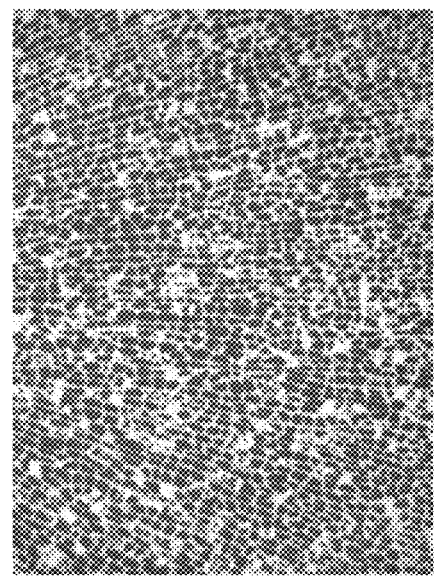
Figure 34B:
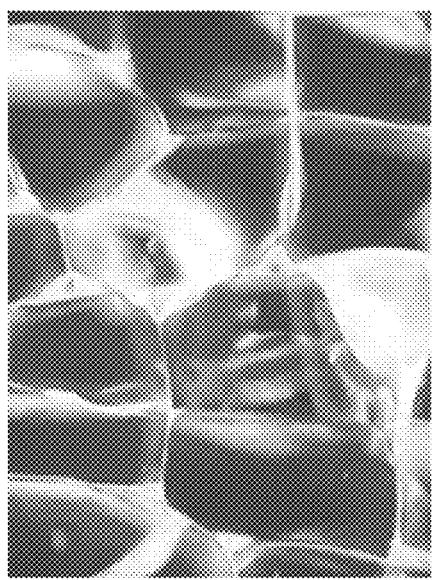
FIGS. 34A and 34B are microscope images of the fracture pattern for a glass article made from Composition #4 and having a third stress profile.
Figure 34A:
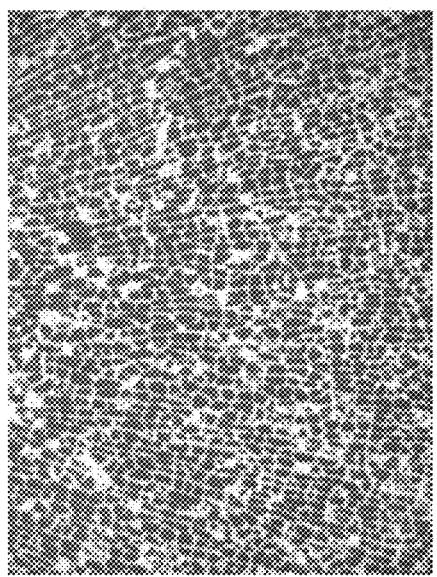
Figure 35B:
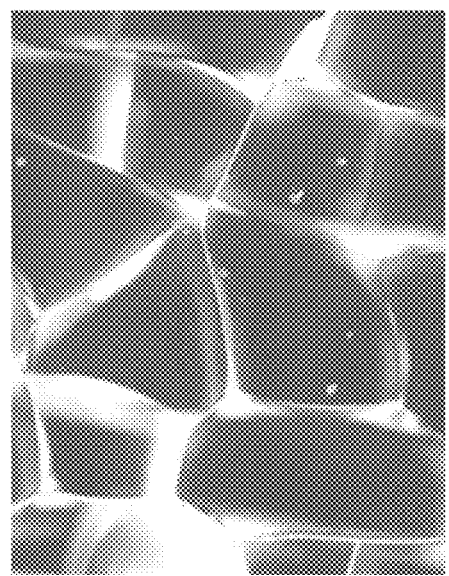
FIGS. 35A and 35B are microscope images of the fracture pattern for a glass article made from Composition #4 and having a fourth stress profile.
Figure 35A:
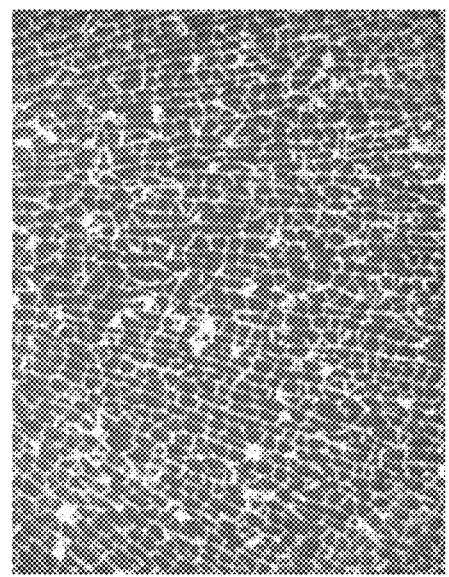
Figure 36B:
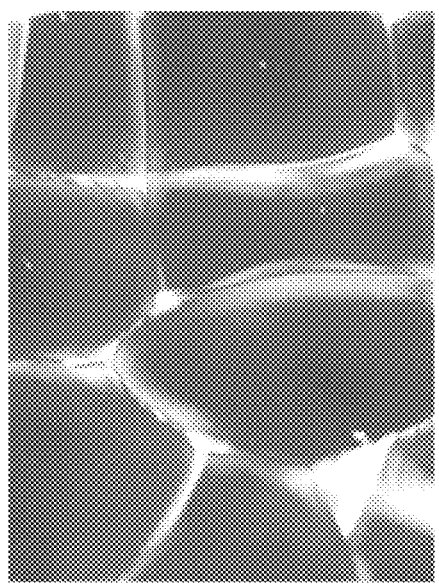
FIGS. 36A and 36B are microscope images of the fracture pattern for a glass article made from Composition #4 and having a fifth stress profile.
Figure 36A:
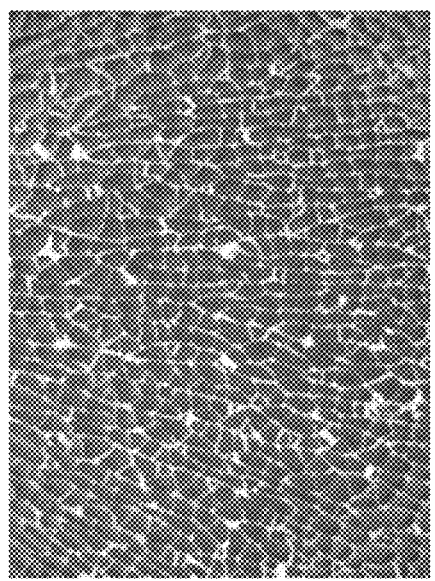

Images 3200 and 3250 in FIGS. 32A and 32B show 20× and 200× microscope images of Article 4A after being fractured according to the "Glass Fracture Test." Images 3300 and 3350 in FIGS. 33A and 33B show 20× and 200× microscope images of Article 4B after being fractured according to the "Glass Fracture Test." Images 3400 and 3450 in FIGS. 34A and 34B show 20× and 200× microscope images of Article 4C after being fractured according to the "Glass Fracture Test." Images 3500 and 3550 in FIGS. 35A and 35B show 20× and 200× microscope images of Article 4D after being fractured according to the "Glass Fracture Test." Images 3600 and 3650 in FIGS. 36A and 36B show 20× and 200× microscope images of Article 4E after being fractured according to the "Glass Fracture Test." These microscope images were taken using a VHX-6000 digital microscope made by Keyence.

Articles 4A, 4B, and 4C exhibited non-columnar (random) fracture patterns. However, Articles 4D and 4E exhibited quasi-columnar fracture patterns. The transition from a non-columnar to a quasi-columnar fracture pattern explains the change in glass particle ejection behavior observed in the high-speed camera images.

These results show that the Differential Elastic Energy ($W_{el}^{comp} - W_{el}^{tens}$) of the frangible glass articles tracks the articles' glass particle ejection behavior. Articles 4A-4C had a Differential Elastic Energy above 25 J/m². Articles 4D and 4E had a Differential Elastic Energy of below 25 J/m², and even below 20 J/m². Based on the results in Examples 1-4, it appears that frangible glass articles can transition non-columnar fracture to quasi-columnar fracture at a Differential Elastic Energy somewhere between 15.85 J/m² and 25.71 J/m².

To further evaluate the fracture behavior of Articles 4A-4E, the percent mass loss resulting from the "Glass Fracture Test" for each article was measured. Table 10 below show the percent mass loss for each glass article.

TABLE 10

| Article | Average original mass (mg) | Average Mass loss (mg) | Percent Mass Loss (%) |
|---|---|---|---|
| 4A | 5465.8 | 18.6 | 0.34 |
| 4B | 5518.5 | 6.61 | 0.12 |
| 4C | 5527.9 | 5.15 | 0.09 |
| 4D | 5444.5 | 1.00 | 0.012 |
| 4E | 5536.8 | 0.35 | 0.006 |

Articles 4A-4C, which exhibited non-columnar fracture patterns, had a percent mass loss above 0.09%. Articles 4D and 4E, which exhibited quasi-columnar fracture patterns, had a percent mass loss significantly below 0.09%. The change in percent mass loss between Article 4C and Article 4D was 0.078, about a 80% decrease from the percent mass loss for Article 4C. The results of these percent mass loss tests indicate that frangible glass articles exhibiting quasi-columnar or columnar fracture patterns result in significantly less mass loss during the "Glass Fracture Test." This supports the Differential Elastic Energy analysis and results of Examples 1-4, which conclude that quasi-columnar or columnar fracture patterns eject significantly less glass particles upon fracture.

In sum, the results of Examples 1-4 indicate that Differential Elastic Energy is a significant parameter in determining a frangible glass article's fracture behavior and tendency to eject glass particles upon fracture. The results show that desirable fracture behavior for frangible glass articles can be designed with significant freedom (for example, in composition and stress profile shape) by using Differential Elastic Energy as the main design parameter. As shown by the results of Examples 1-4, a suitable Differential Elastic Energy leading to quasi-columnar or columnar fracture with low glass particle ejection for a frangible glass article can be achieved for several different stress profile types. For example, a suitable Differential Elastic Energy can be achieved using a stress profile with or without a spike in compressive stress near the surface. Similarly, the results show that a suitable Differential Elastic Energy leading to quasi-columnar or columnar fracture with low glass particle ejection for a frangible glass article can be achieved for glass articles made from lithium based and non-lithium-based glass compositions. Furthermore, the results show that annealing some glasses can achieve a suitable Differential Elastic Energy leading to quasi-columnar or columnar fracture with low glass particle ejection for a frangible glass article. For example, in some glass compositions that do not present strong stress relaxation (for example Composition #4), annealing can be used to achieve a suitable Differential Elastic Energy.

Example 5

Figure 41:
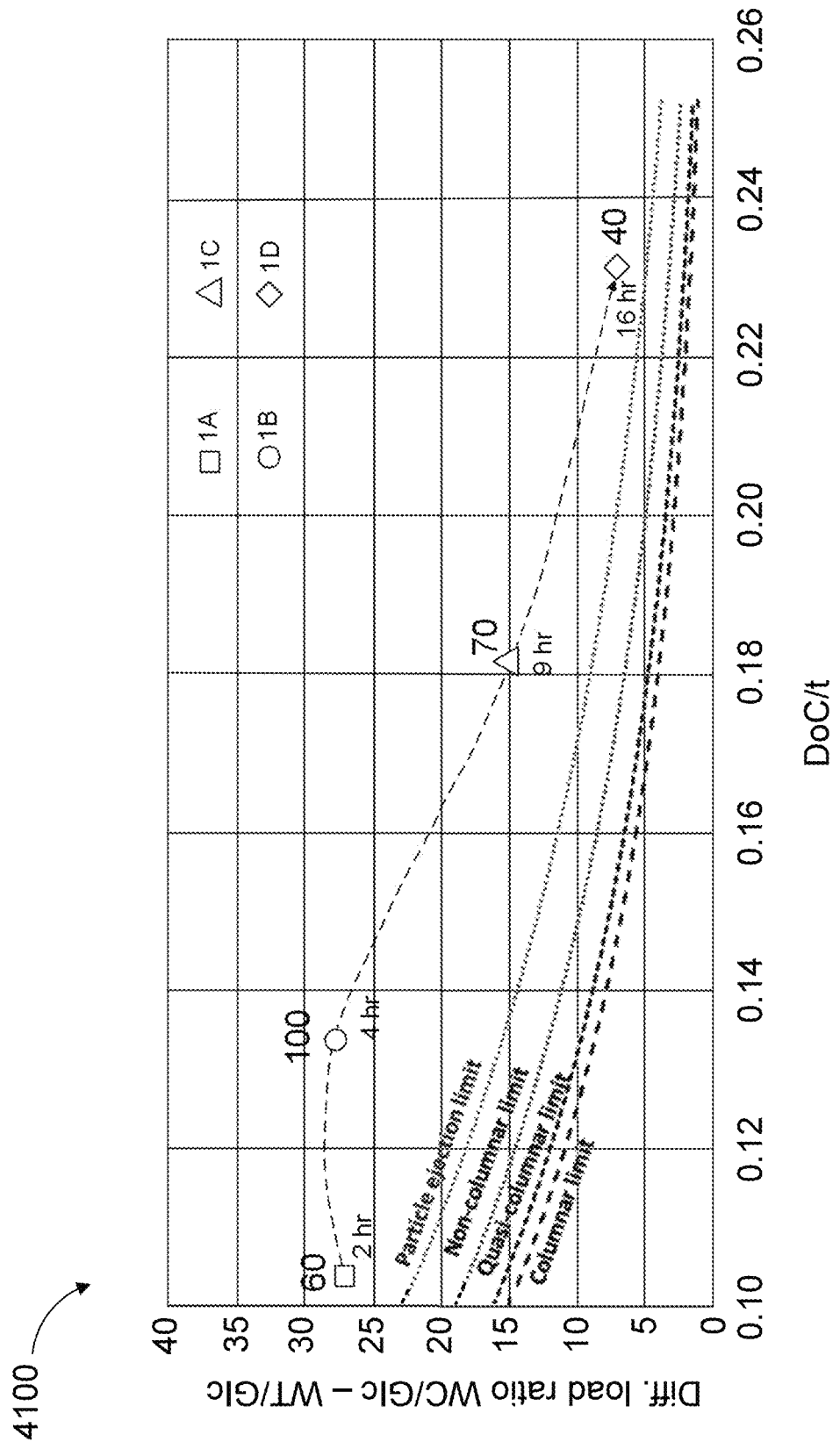
FIG. 41 is a graph of differential load ratio versus percent depth of compression for various glass articles made from Composition #1 plotted with the differential load limit Equations 38, 39, 40, and 44 for glass article made from Composition #1.

Differential load ratio values were measured and calculated for each of Articles 1A-1D using the methods as described above for Example 1. Additionally, the percent depth of compression (expressed as DoC/t) was calculated for each of Articles 1A-1D. Table 11 below shows these calculated and measured values for each glass article, along with each article's particle ejection limit value calculated using Equation 44 ("$(W_d/G_{IC})$ PE Limit") and the particle ejection score each article received in the "Glass Fracture Test." Graph 4100 in FIG. 41 shows the differential load ratio for each article plotted on a graph of differential load ratio versus percent depth of compression, along with the particle ejection limit of Equation 44 for articles made of Composition #1. The numbers 60, 90, 70, and 40 next to the data points in graph 4100 are the particle ejection scores the articles received in the "Glass Fracture Test."

TABLE 11

| Article | DoC/t | $W_d/G_{1C}$ | $(W_d/G_{1C})$ PE Limit | Above Limit? | Ejection Score |
|---|---|---|---|---|---|
| 1A | 0.10 | 27.07 | 20.67 | Yes | 60 |
| 1B | 0.13 | 27.75 | 14.42 | Yes | 100 |
| 1C | 0.18 | 14.94 | 8.20 | Yes | 70 |
| 1D | 0.23 | 7.08 | 4.50 | Yes | 40 |

As shown in graph 4100 and Table 11, each of Articles 1A-1D had a differential load ratio above the particle ejection limit of Equation 44 for articles made of Composition #1. Accordingly, Equation 44 indicates that each of Articles 1A-1D should exhibit significant particle ejection behavior upon fracture. Indeed, as discussed above in Example 1, each of Articles 1A-1D exhibited non-columnar (random) fracture patterns in the "Glass Fracture Test."

Example 6

Figure 42:
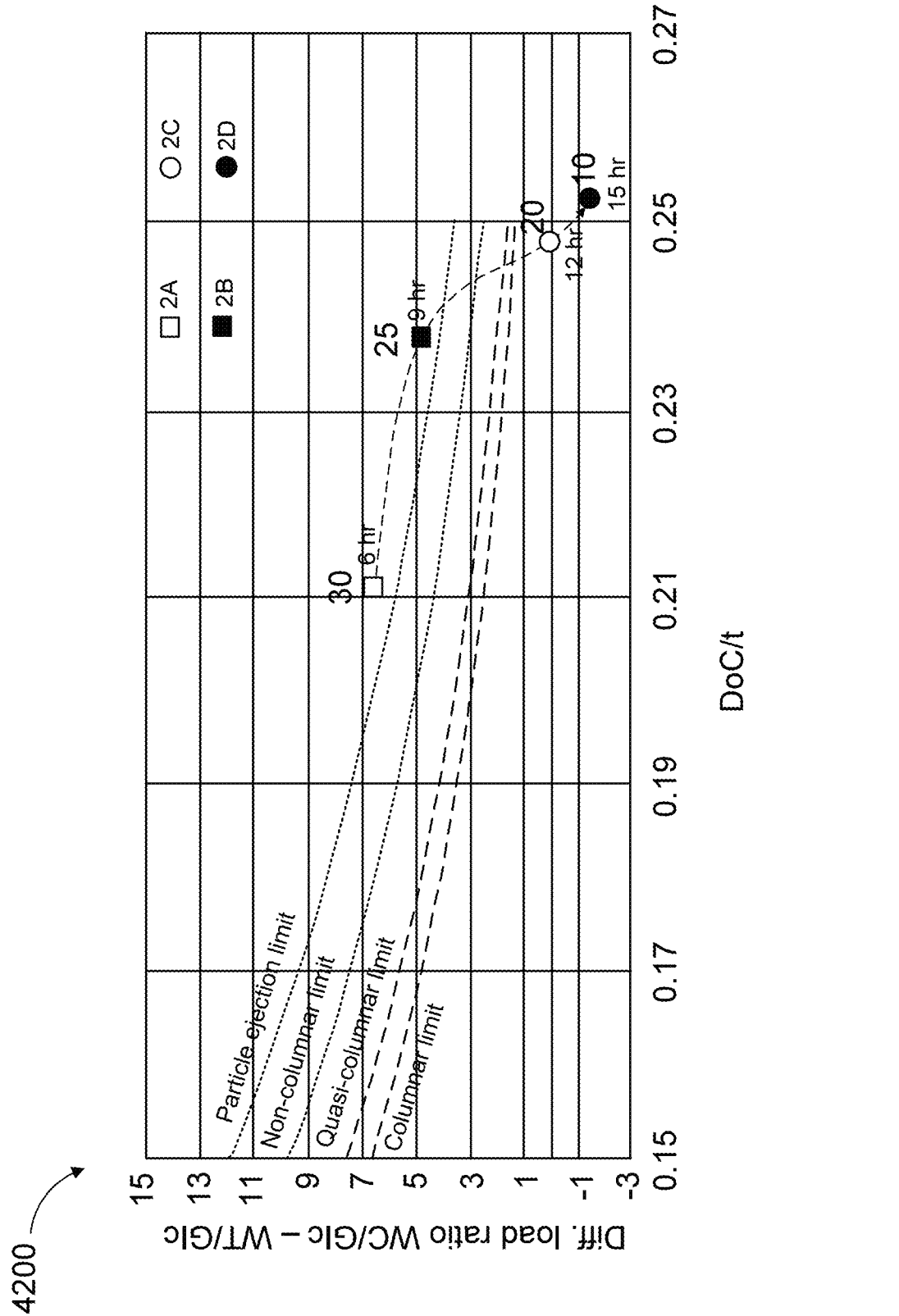
FIG. 42 is a graph of differential load ratio versus percent depth of compression for various glass articles made from Composition #2 plotted with the differential load limit Equations 38, 39, 40, and 44 for glass article made from Composition #2.

Differential load ratio values were measured and calculated for each of Articles 2A-2D using the methods as described above for Example 1. Additionally, the percent depth of compression (expressed as DoC/t) was calculated for each of Articles 2A-2D. Table 12 below shows these calculated and measured values for each glass article, along with each article's particle ejection limit value calculated using Equation 44 ("$(W_d/G_{IC})$ PE Limit") and the particle ejection score each article received in the "Glass Fracture Test." Graph 4200 in FIG. 42 shows the differential load ratio for each article plotted on a graph of differential load ratio versus percent depth of compression, along with the particle ejection limit of Equation 44 for articles made of Composition #2. The numbers 30, 25, 20, and 10 next to the data points in graph 4200 are the particle ejection scores the articles received in the "Glass Fracture Test."

TABLE 12

| Article | DoC/t | $W_d/G_{1C}$ | $(W_d/G_{1C})$ PE Limit | Above Limit? | Ejection Score |
|---|---|---|---|---|---|
| 2A | 0.21 | 6.60 | 5.72 | Yes | 30 |
| 2B | 0.24 | 4.87 | 4.14 | Yes | 25 |
| 2C | 0.25 | 0.05 | 3.67 | No | 20 |
| 2D | 0.25 | −1.31 | 3.50 | No | 10 |

As shown in graph 4200 and Table 12, Articles 2A and 2B had a differential load ratio above the particle ejection limit of Equation 44 for articles made of Composition #2. Conversely, Articles 2C and 2D had a differential load ratio below the particle ejection limit of Equation 44 for articles made of Composition #2. Accordingly, Equation 44 indicates that Articles 2A and 2B should exhibit significant particle ejection behavior upon fracture. Indeed, as discussed above in Example 2, Articles 2A and 2B exhibited non-columnar (random) fracture patterns in the "Glass Fracture Test." Similarly, Equation 44 indicates that Articles 2C and 2D should resist particle ejection upon fracture. Indeed, as discussed above in Example 2, Articles 2C and 2D exhibited quasi-columnar fracture patterns with little to no particle ejection in the "Glass Fracture Test."

Example 7

Figure 43:
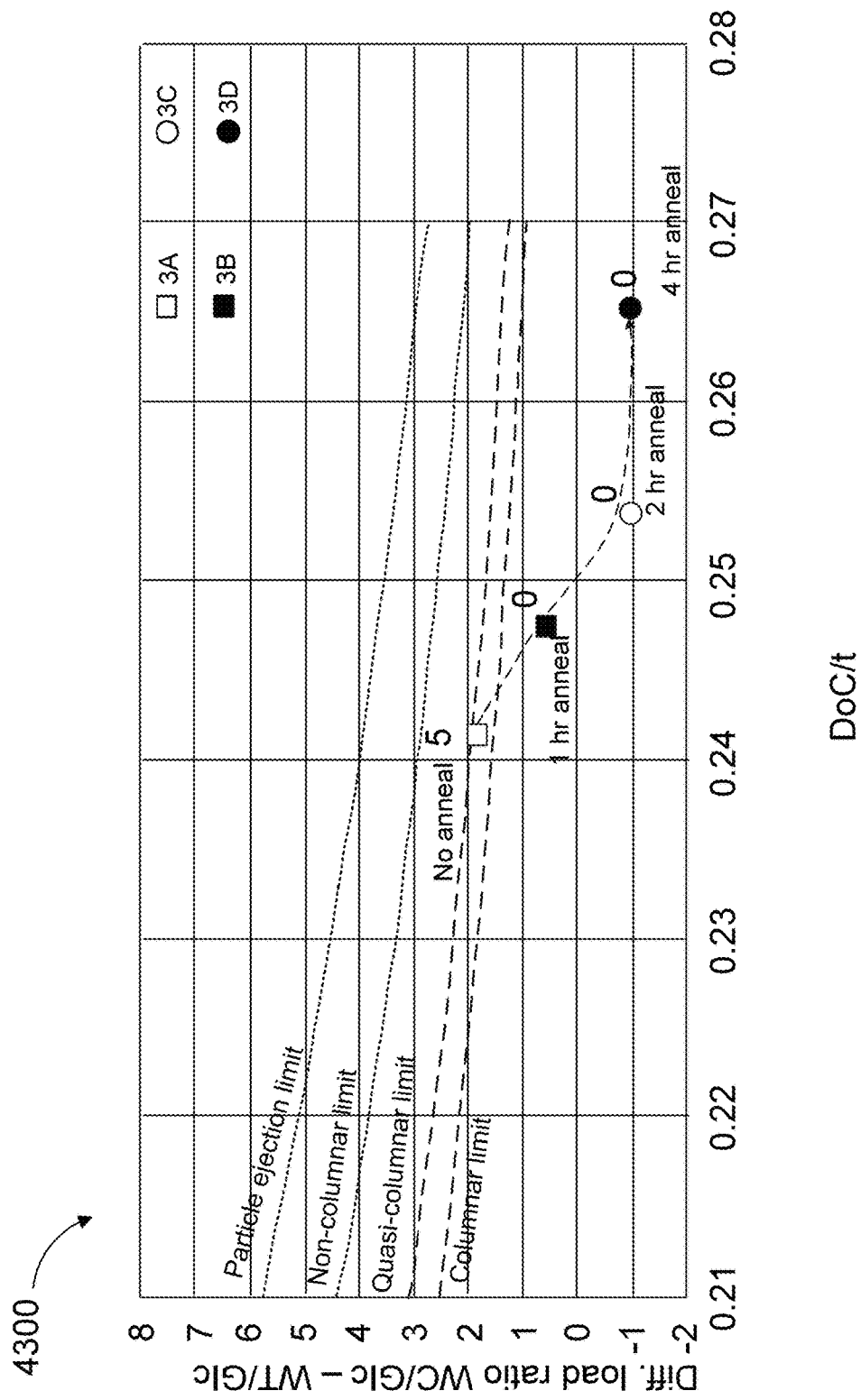
FIG. 43 is a graph of differential load ratio versus percent depth of compression for various glass articles made from Composition #3 plotted with the differential load limit Equations 38, 39, 40, and 44 for glass article made from Composition #3.

Differential load ratio values were measured and calculated for each of Articles 3A-3D using the methods as described above for Example 1. Additionally, the percent depth of compression (expressed as DoC/t) was calculated for each of Articles 3A-3D. Table 13 below shows these calculated and measured values for each glass article, along with each article's particle ejection limit value calculated using Equation 44 ("$(W_d/G_{IC})$ PE Limit") and the particle ejection score each article received in the "Glass Fracture Test." Graph 4300 in FIG. 43 shows the differential load ratio for each article plotted on a graph of differential load ratio versus percent depth of compression, along with the particle ejection limit of Equation 44 for articles made of Composition #3. The numbers 5, 0, 0, and 0 next to the data points in graph 4300 are the particle ejection scores the articles received in the "Glass Fracture Test."

TABLE 13

| Article | DoC/t | $W_d/G_{1C}$ | $(W_d/G_{1C})$ PE Limit | Above Limit? | Ejection Score |
|---|---|---|---|---|---|
| 3A | 0.24 | 1.89 | 3.98 | No | 5 |
| 3B | 0.25 | 0.67 | 3.69 | No | 0 |
| 3C | 0.25 | −0.92 | 3.43 | No | 0 |
| 3D | 0.27 | −0.89 | 2.99 | No | 0 |

As shown in graph 4300 and Table 13, each of Articles 3A-3D had a differential load ratio below the particle ejection limit of Equation 44 for articles made of Composition #3. Accordingly, Equation 44 indicates that each of Articles 3A-3D should resist particle ejection upon fracture. Indeed, as discussed above in Example 3, Articles 3A-3D all exhibited quasi-columnar or columnar fracture patterns with little to no particle ejection in the "Glass Fracture Test."

Example 8

Figure 44:
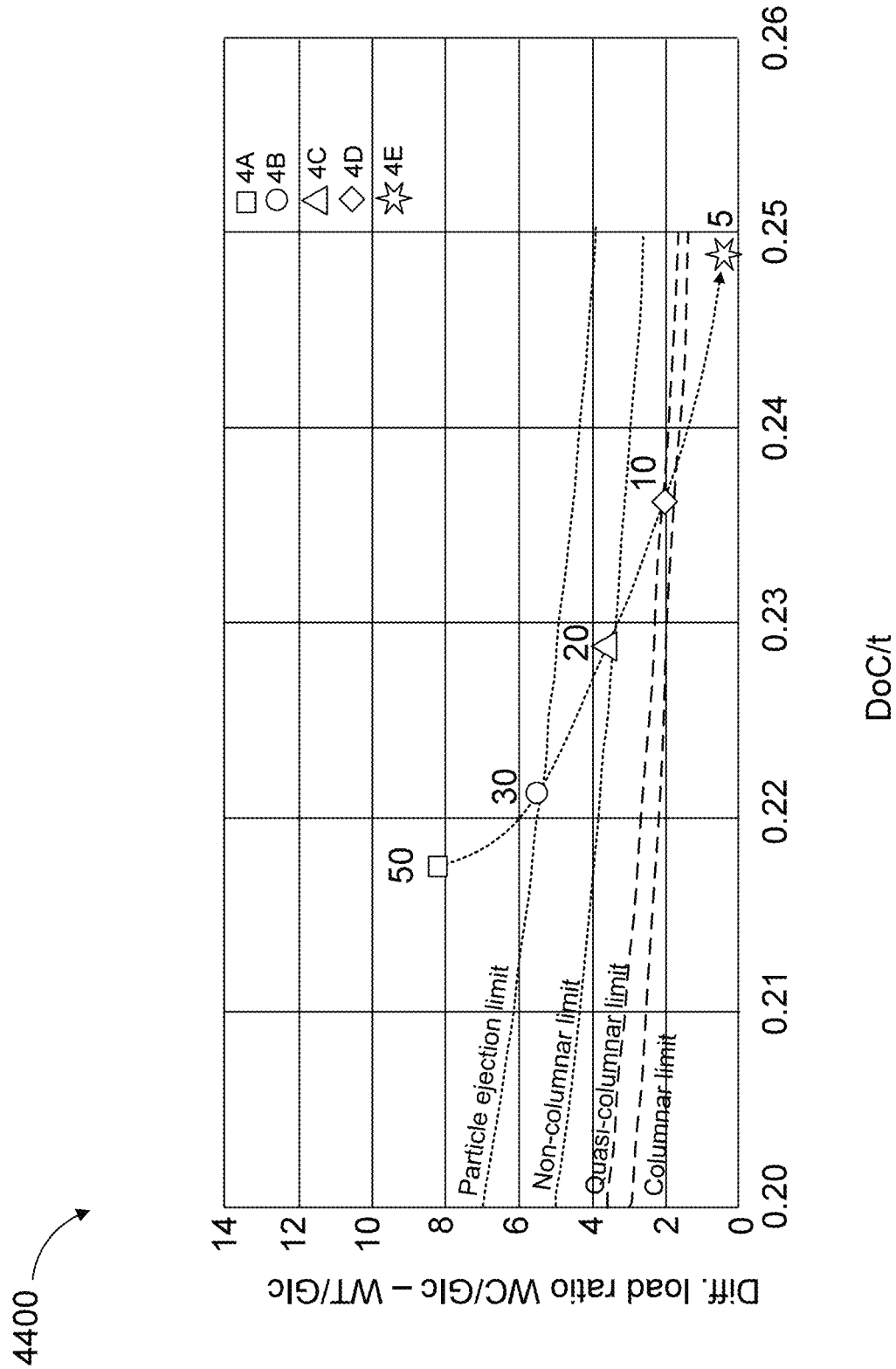
FIG. 44 is a graph of differential load ratio versus percent depth of compression for various glass articles made from Composition #4 plotted with the differential load limit Equations 38, 39, 40, and 44 for glass article made from Composition #4.

Differential load ratio values were measured and calculated for each of Articles 4A-4E using the methods as described above for Example 1. Additionally, the percent depth of compression (expressed as DoC/t) was calculated for each of Articles 4A-4E. Table 14 below shows these calculated and measured values for each glass article, along with each article's particle ejection limit value calculated using Equation 44 ("$(W_d/G_{IC})$ PE Limit") and the particle ejection score each article received in the "Glass Fracture Test." Graph 4400 in FIG. 44 shows the differential load ratio for each article plotted on a graph of differential load ratio versus percent depth of compression, along with the particle ejection limit of Equation 44 for articles made of Composition #4. The numbers 50, 30, 20, 10, and 5 next to the data points in graph 4400 are the particle ejection scores the articles received in the "Glass Fracture Test."

TABLE 14

| Article | DoC/t | $W_d/G_{1C}$ | $(W_d/G_{1C})$ PE Limit | Above Limit? | Ejection Score |
|---------|-------|--------------|-------------------------|--------------|----------------|
| 4A | 0.22 | 8.21 | 5.26 | Yes | 50 |
| 4B | 0.22 | 5.51 | 5.08 | Yes | 30 |
| 4C | 0.23 | 3.56 | 4.61 | No | 20 |
| 4D | 0.24 | 2.04 | 4.24 | No | 10 |
| 4E | 0.25 | 0.49 | 3.63 | No | 5 |

As shown in graph 4400 and Table 14, Articles 4A and 4B had a differential load ratio above the particle ejection limit of Equation 44 for articles made of Composition #4. Conversely, Articles 4C-4E had a differential load ratio below the particle ejection limit of Equation 44 for articles made of Composition #4. Accordingly, Equation 44 indicates that Articles 4A and 4B should exhibit significant particle ejection behavior upon fracture. Indeed, as discussed above in Example 4, Articles 4A and 4B exhibited non-columnar (random) fracture patterns with a significant amount of particle ejection in the "Glass Fracture Test." Similarly, Equation 44 indicates that Articles 4C, 4D, and 4E should resist particle ejection upon fracture. Indeed, as discussed above in Example 4, Articles 4D and 4E exhibited quasi-columnar fracture patterns with little to no particle rejection in the "Glass Fracture Test." As for Article 4C, Example 4 explains that Article 4C exhibited non-columnar (random) fracture patterns. However, as shown in Table 10, Article 4C exhibited less mass loss compared to Articles 4A and 4B, which indicates Article 4C is better able to resist particle ejection upon fracture.

In sum, the results of Examples 5-8 indicate that differential load ratio ($W_d/G_{IC}$) is a significant parameter in determining a frangible glass article's fracture behavior and tendency to eject glass particles upon fracture. The results show that desirable fracture behavior for frangible glass articles can be designed with significant freedom (for example, in composition and stress profile shape) by using differential load ratio ($W_d/G_{IC}$) as the main design parameter. As shown by the results of Examples 5-8, a suitable differential load ratio ($W_d/G_{IC}$) leading to quasi-columnar or columnar fracture with low glass particle ejection for a frangible glass article can be achieved for several different stress profile types. The results also show that a suitable differential load ratio ($W_d/G_{IC}$) leading to quasi-columnar or columnar fracture with low glass particle ejection for a frangible glass article can be achieved for glass articles made from lithium based and non-lithium-based glass compositions. Furthermore, the results show that annealing some glasses can achieve a suitable differential load ratio ($W_d/G_{IC}$) leading to quasi-columnar or columnar fracture with low glass particle ejection for a frangible glass article. For example, in some glass compositions that do not present strong stress relaxation (for example Composition #4), annealing can be used to achieve a suitable differential load ratio ($W_d/G_{IC}$).

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or more than one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Directional terms as used herein—for example up, down, right, left, front, back, top, bottom, inward, outward—are made only with reference to the figures as drawn and are not intended to imply absolute orientation.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" refers to a value that is within ±5% of the value stated. For example, about 3 MPa can include any number between 2.85 MPa and 3.15 MPa.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. An article, comprising:
 a frangible glass article formed of a glass material having a fracture toughness ($K_{1C}$) measured in MPa*m$^{1/2}$, a Young's modulus (E) measured in MPa, and a Poisson's ratio (v), the frangible glass article comprising:
 a first surface;
 a second surface opposite the first surface;
 a thickness (t) measured between the first surface and the second surface;
 a first surface region extending from the first surface of the frangible glass article to a first depth of compression ($d_1$), the first surface region comprising a first elastic compressive stress energy per unit area of glass) ($W_{el}^{comp1}$) measured in J/m$^2$;
 a second surface region extending from the second surface of the frangible glass article to a second depth of compression ($d_2$), the second surface region comprising a second elastic compressive stress energy per unit area of glass ($W_{el}^{comp2}$) measured in J/m$^2$;
 a total elastic compressive stress energy per unit area of glass ($W_C$) equal to the sum of $W_{el}^{comp1}$ and $W_{el}^{comp2}$;
 a central region between the first surface region and the second surface region, the central region comprising an elastic tensile stress energy per unit area of glass ($W_T$) measured in J/m$^2$; and
 a differential load ratio ($W_d/G_{IC}$) less than $$72e^{\left(-12\frac{d1}{t}\right)},$$

wherein: $W_d = W_C - W_T$, and $$G_{1C} = \frac{K_{1C}^2(1-v^2)}{E};$$

and
−100 J/m$^2 \le W_d \le$ 25 J/m$_2$.

2. The article of claim 1, wherein the frangible glass article comprises a total load ratio ($W_i/G_D$) less than 6.5, wherein the total elastic compressive stress energy per unit area of glass ($W_C$) is less than 60% of a total load ($W_i$), and wherein: $W_i = W_C + W_T$, and $G_D = 4G_{1C}$.

3. The article of claim 2, wherein the frangible glass article comprises a compressive load ratio ($W_C/G_D$) less than 3.9.

4. The article of claim 1, wherein the thickness (t) is in a range of 100 microns to 3 millimeters.

5. The article of claim 1, further comprising a substrate and an adhesive layer attaching a top surface of the substrate to the second surface of the frangible glass article.

6. The article of claim 5, wherein the substrate comprises an electronic display comprising a display surface defining at least a portion of the top surface of the substrate.

7. The article of claim 5, wherein the adhesive layer comprises a peel adhesive strength of 15 N/100 mm or more.

8. The article of claim 1, wherein the frangible glass article comprises a percent mass loss of 0.09% or less, wherein the percent mass loss is measured according to a Glass Fracture Test.

9. The article of claim 1, wherein, after a fracture event according to a Glass Fracture Test, the frangible glass article comprises a fracture pattern having a columnar fragment percentage of 75% or more.

10. The article of claim 1, wherein the central region of the frangible glass article is substantially free of lithium oxide.

11. The article of claim 1, wherein the central region of the frangible glass article comprises lithium oxide at a concentration of 0.2 mol % or more.

12. The article of claim 1, wherein the frangible glass article comprises:
 a Young's modulus in a range of 60 GPa to 130 GPa, and
 a Poisson's ratio in a range of 0.15 to 0.30.

13. An electronic device, comprising:
 an electronic display; and
 the article of claim 1 disposed over the electronic display.

14. The electronic device of claim 13, further comprising a housing comprising a front surface, a back surface, and side surfaces; and electrical components at least partially within the housing, the electrical components comprising a controller, a memory, and the electronic display, the electronic display at or adjacent the front surface of the housing,
 wherein the frangible glass article forms at least a portion of the housing.

15. A frangible glass article, comprising:
 a thickness (t) of 3 millimeters or less;
 a first surface region extending from the first surface of the frangible glass article to a first depth of compression ($d_1$), the first surface region comprising a first elastic compressive stress energy per unit area of glass ($W_{el}^{comp1}$) measured in J/m$^2$;
 a second surface region extending from the second surface of the frangible glass article to a second depth of compression ($d_2$) the second surface region comprising a second elastic compressive stress energy per unit area of glass ($W_{el}^{comp2}$) measured in J/m$^2$;
 a total elastic compressive stress energy per unit area of glass ($W_C$) equal to the sum of $W_{el}^{comp1}$ and $W_{el}^{comp2}$;
 a central region between the first surface region and the second surface region, the central region comprising an elastic tensile stress energy per unit area of glass ($W_T$) measured in J/m$^2$; and a differential load ratio ($W_d/G_{IC}$) less than $$72e^{\left(-12\frac{d1}{t}\right)},$$

wherein: $W_d = W_C - W_T$, and $$G_{1C} = \frac{K_{1C}^2(1-v^2)}{E},$$

−100 J/m²≤$W_d$≤25 J/m², and
wherein $K_{1C}$ is the fracture toughness of the glass material forming the frangible glass article measured in MPa*m$^{1/2}$, E is the Young's modulus of the glass material forming the frangible glass article measured in MPa, and v is the Poisson's ratio of the glass material forming the frangible glass article.

16. A method of making a frangible glass article, the method comprising:
introducing a total elastic compressive stress energy per unit area of glass ($W_C$) and an elastic tensile stress energy per unit area of glass ($W_T$) to a glass article to transform the glass article into a frangible glass article comprising a differential load ratio ($W_d/G_{IC}$) less than $$72e^{\left(-12\frac{d1}{t}\right)},$$

wherein the total elastic compressive stress energy per unit area of glass ($W_C$) is equal to the sum of: a first elastic compressive stress energy per unit area of glass ($W_{el}^{comp1}$) measured in J/m² for a first surface region extending from a first surface of the frangible glass article to a first depth of compression ($d_1$) and a second elastic compressive stress energy per unit area of glass ($W_{el}^{comp2}$) measured in J/m² for a second surface region extending from a second surface of the frangible glass article to a second depth of compression ($d_2$),
wherein: $W_d = W_C - W_T$, and $$G_{1C} = \frac{K_{1C}^2(1-v^2)}{E},$$

wherein $K_{1C}$ is the fracture toughness of the glass material forming the frangible glass article measured in MPa*m$^{1/2}$, E is the Young's modulus of the glass material forming the frangible glass article measured in MPa, and v is the Poisson's ratio of the glass material forming the frangible glass article, and
wherein introducing the total elastic compressive stress energy per unit area of glass ($W_C$) and the elastic tensile stress energy per unit area of glass ($W_T$) comprises:
immersing the glass article in an ion-exchange solution, and
annealing the glass article after removing the glass article from the ion-exchange solution.

\* \* \* \* \*

UNITED STATES PATENT AND TRADEMARK OFFICE
CERTIFICATE OF CORRECTION

PATENT NO. : 11,827,559 B2
APPLICATION NO. : 17/354149
DATED : November 28, 2023
INVENTOR(S) : Jason Thomas Harris et al.

Page 1 of 1

It is certified that error appears in the above-identified patent and that said Letters Patent is hereby corrected as shown below:

In the Claims

In Column 59, Line 39, in Claim 1, delete "glass)" and insert -- glass --.

In Column 59, Line 65, in Claim 1, delete "J/m$_2$." and insert -- J/m$^2$. --.

In Column 60, Line 35, in Claim 12, delete "a Young's" and insert -- the Young's --.

In Column 60, Line 36, in Claim 12, delete "a Poisson's" and insert -- the Poisson's --.

In Column 60, Line 58, in Claim 15, delete "(d$_2$)" and insert -- (d$_2$), --.

In Column 61, Line 14, in Claim 15, delete "the fracture" and insert -- a fracture --.

In Column 61, Line 16, in Claim 15, delete "the Young's" and insert -- a Young's --.

In Column 61, Line 18, in Claim 15, delete "the Poisson's" and insert -- a Poisson's --.

In Column 62, Line 22, in Claim 16, delete "and" and insert -- t is a thickness of the frangible glass article, and --.

In Column 62, Line 18, in Claim 15, delete "the fracture" and insert -- a fracture --.

In Column 62, Line 20, in Claim 15, delete "the Young's" and insert -- a Young's --.

In Column 62, Line 22, in Claim 15, delete "the Poisson's" and insert -- a Poisson's --.

Signed and Sealed this
Fourth Day of November, 2025

John A. Squires
*Director of the United States Patent and Trademark Office*